(12) United States Patent
Rubenstein et al.

(10) Patent No.: US 12,452,192 B2
(45) Date of Patent: Oct. 21, 2025

(54) SYSTEMS AND METHODS FOR PROVIDING A GLOBAL VIRTUAL NETWORK (GVN)

(71) Applicant: UMBRA Technologies Ltd., Hong Kong (CN)

(72) Inventors: Joseph E. Rubenstein, Beijing (CN); Carlos Eduardo Ore, Saint-Herblain (FR); Thibaud August Bernard Jean Saint-Martin, Aubignan (FR); Fred Broussard, Indianapolis, IN (US); Jørn Allen Dose Knutsen, Oslo (NO)

(73) Assignee: UMBRA Technologies Ltd., British Virgin Islands (GB)

( * ) Notice: Subject to any disclaimer, the term of this patent is extended or adjusted under 35 U.S.C. 154(b) by 0 days.

(21) Appl. No.: 19/205,114

(22) Filed: May 12, 2025

(65) Prior Publication Data
US 2025/0274308 A1    Aug. 28, 2025

Related U.S. Application Data

(63) Continuation of application No. 18/981,108, filed on Dec. 13, 2024, now Pat. No. 12,309,001, which is a
(Continued)

(51) Int. Cl.
*G06F 15/16* (2006.01)
*G06F 9/4401* (2018.01)
(Continued)

(52) U.S. Cl.
CPC ......... *H04L 12/465* (2013.01); *G06F 9/4401* (2013.01); *G06F 9/4416* (2013.01);
(Continued)

(58) Field of Classification Search
CPC ..... H04L 12/465; H04L 9/08; H04L 12/4633; H04L 45/22; H04L 45/28; H04L 45/302;
(Continued)

(56) References Cited

U.S. PATENT DOCUMENTS 5,828,847 A * 10/1998 Gehr .................. H04L 9/40
709/239
6,374,302 B1    4/2002 Galasso et al.
(Continued)

FOREIGN PATENT DOCUMENTS

CN        1392708 A     1/2003
CN        1754161 A     3/2006
(Continued)

OTHER PUBLICATIONS

Figueiredo, R. J., et al., "Social VPNs: Integrating Overlay and Social Networks for Seamless P2P Networking," 2008 IEEE 17th Workshop on Enabling Technologies: Infrastructure for Collaborative Enterprises, Rome, Italy, 2008, pp. 93-98, doi: 10.1109/WETICE.2008.43, 2008 (6 pages).
(Continued)

*Primary Examiner* — Alicia Baturay
(74) *Attorney, Agent, or Firm* — Gardella Alciati

(57) ABSTRACT

Systems and methods for managing a global virtual network connection between an endpoint device and an access point server are disclosed. In one embodiment the network system may include an endpoint device, an access point server, and a control server. The endpoint device and the access point server may be connected with a first tunnel. The access point server and the control server may be connected with a second tunnel.

20 Claims, 51 Drawing Sheets

Related U.S. Application Data continuation of application No. 18/358,519, filed on Jul. 25, 2023, now Pat. No. 12,184,451, which is a continuation of application No. 17/888,249, filed on Aug. 15, 2022, now Pat. No. 11,750,419, which is a continuation of application No. 17/461,624, filed on Aug. 30, 2021, now Pat. No. 11,418,366, which is a continuation of application No. 17/000,997, filed on Aug. 24, 2020, now Pat. No. 11,108,595, which is a continuation of application No. 15/563,253, filed as application No. PCT/US2016/026489 on Apr. 7, 2016, now Pat. No. 10,756,929.

(60) Provisional application No. 62/151,174, filed on Apr. 22, 2015, provisional application No. 62/144,293, filed on Apr. 7, 2015.

(51) Int. Cl.
*G06F 21/57* (2013.01)
*H04L 9/08* (2006.01)
*H04L 9/40* (2022.01)
*H04L 12/46* (2006.01)
*H04L 45/00* (2022.01)
*H04L 45/28* (2022.01)
*H04L 45/302* (2022.01)
*H04L 45/64* (2022.01)

(52) U.S. Cl.
CPC ............ *G06F 21/575* (2013.01); *H04L 9/08* (2013.01); *H04L 12/4633* (2013.01); *H04L 45/22* (2013.01); *H04L 45/28* (2013.01); *H04L 45/302* (2013.01); *H04L 45/64* (2013.01); *H04L 63/02* (2013.01); *H04L 63/0218* (2013.01); *H04L 63/0236* (2013.01); *H04L 63/0254* (2013.01); *H04L 63/0263* (2013.01); *H04L 63/0272* (2013.01); *H04L 12/4641* (2013.01)

(58) Field of Classification Search
CPC ..... H04L 45/64; H04L 63/02; H04L 63/0218; H04L 63/0236; H04L 63/0254; H04L 63/0263; H04L 63/0272; H04L 12/4641; G06F 9/4401; G06F 9/4416; G06F 21/575
USPC .......................................................... 709/249
See application file for complete search history.

(56) References Cited

U.S. PATENT DOCUMENTS

| | | | |
|---|---|---|---|
| 6,693,876 B1 | 2/2004 | Zey | |
| 7,028,183 B2 | 4/2006 | Simon et al. | |
| 7,039,701 B2* | 5/2006 | Wesley | H04L 61/5084 709/224 |
| 7,069,318 B2* | 6/2006 | Burbeck | H04L 61/00 709/224 |
| 7,143,170 B2* | 11/2006 | Swildens | G06Q 40/00 709/219 |
| 7,161,899 B2 | 1/2007 | Limaye et al. | |
| 7,173,902 B2 | 2/2007 | Daniell et al. | |
| 7,177,929 B2* | 2/2007 | Burbeck | H04L 61/00 709/200 |
| 7,203,762 B2* | 4/2007 | Yamada | H04L 45/22 709/239 |
| 7,508,753 B2* | 3/2009 | Greenspan | H04L 45/125 370/428 |
| 7,584,285 B2* | 9/2009 | Hudson | H04L 67/568 709/228 |
| 7,609,701 B2* | 10/2009 | Yang | H04L 61/2514 370/409 |
| 7,689,722 B1 | 3/2010 | Timms et al. | |
| 7,801,030 B1 | 9/2010 | Aggarwal et al. | |
| 7,870,418 B2* | 1/2011 | Sekaran | H04L 65/1046 709/206 |
| 7,895,204 B1* | 2/2011 | Cooley | G06F 16/972 707/736 |
| 7,908,350 B2* | 3/2011 | Duponchel | H04L 12/4641 709/221 |
| 7,921,225 B2* | 4/2011 | Bonefas | H04L 67/56 709/218 |
| 8,214,505 B2* | 7/2012 | Jagadeeswaran | H04L 67/535 709/227 |
| 8,259,571 B1 | 9/2012 | Raphel et al. | |
| 8,422,397 B2 | 4/2013 | Ansari et al. | |
| 8,458,786 B1 | 6/2013 | Kailash et al. | |
| 8,527,602 B1* | 9/2013 | Rasmussen | H04N 21/4788 715/838 |
| 8,544,065 B2* | 9/2013 | Archer | G06F 12/1416 726/4 |
| 8,611,355 B1* | 12/2013 | Sella | H04L 45/44 370/409 |
| 8,769,156 B2* | 7/2014 | Annamalaisami | H04L 67/563 370/392 |
| 8,838,823 B2* | 9/2014 | Guo | H04L 67/1076 709/205 |
| 8,856,281 B2* | 10/2014 | Van der Merwe | H04L 61/4511 709/219 |
| 8,891,522 B2 | 11/2014 | Fletcher et al. | |
| 8,966,075 B1* | 2/2015 | Chickering | H04L 63/10 709/227 |
| 8,972,602 B2* | 3/2015 | Mithyantha | H04L 45/02 370/235 |
| 8,976,798 B2 | 3/2015 | Border et al. | |
| 9,015,310 B2 | 4/2015 | Ochi | |
| 9,036,589 B2 | 5/2015 | Kakadia et al. | |
| 9,038,151 B1 | 5/2015 | Chua et al. | |
| 9,137,027 B2 | 9/2015 | Matthews et al. | |
| 9,137,200 B2 | 9/2015 | Blau et al. | |
| 9,164,795 B1 | 10/2015 | Vincent | |
| 9,172,603 B2 | 10/2015 | Padmanabhan et al. | |
| 9,231,851 B2 | 1/2016 | Chen | |
| 9,241,004 B1 | 1/2016 | April | |
| 9,253,028 B2 | 2/2016 | DeCusatis et al. | |
| 9,288,233 B2 | 3/2016 | Nakae et al. | |
| 9,294,304 B2 | 3/2016 | Sindhu | |
| 9,344,955 B2 | 5/2016 | Hakola et al. | |
| 9,350,635 B2 | 5/2016 | Vasseur et al. | |
| 9,350,710 B2 | 5/2016 | Herle et al. | |
| 9,351,193 B2 | 5/2016 | Raleigh et al. | |
| 9,432,336 B2 | 8/2016 | Ostrowski | |
| 9,450,817 B1 | 9/2016 | Bahadur et al. | |
| 9,455,924 B2 | 9/2016 | Cicic et al. | |
| 9,485,323 B1 | 11/2016 | Stickle et al. | |
| 9,565,117 B2 | 2/2017 | Dahod et al. | |
| 9,569,587 B2 | 2/2017 | Ansari et al. | |
| 9,614,887 B2* | 4/2017 | Roverso | H04L 63/0227 |
| 9,661,050 B2* | 5/2017 | Killick | H04L 65/611 |
| 9,699,135 B2 | 7/2017 | Dinha | |
| 9,888,042 B2 | 2/2018 | Annamalaisami et al. | |
| 9,898,317 B2 | 2/2018 | Nakil et al. | |
| 9,996,548 B2 | 6/2018 | Grube et al. | |
| 10,070,369 B2 | 9/2018 | Lynn, Jr. et al. | |
| 10,084,838 B2* | 9/2018 | Gordon | H04N 21/8586 |
| 10,091,304 B2 | 10/2018 | Hoffmann | |
| 10,114,828 B2* | 10/2018 | Lee | G06F 16/172 |
| 10,142,390 B2* | 11/2018 | Seedorf | H04L 67/289 |
| 10,177,957 B1 | 1/2019 | Hankins et al. | |
| 10,237,253 B2 | 3/2019 | Chen | |
| 10,331,472 B2* | 6/2019 | Wang | G06F 9/455 |
| 10,423,481 B2* | 9/2019 | Iturralde | H04N 21/8456 |
| 10,659,512 B1* | 5/2020 | Nielsen | H04N 21/252 |
| 10,708,350 B2* | 7/2020 | Huang | H04L 67/06 |
| 10,708,667 B1* | 7/2020 | Waggoner | H04L 65/80 |
| 10,756,929 B2* | 8/2020 | Knutsen | H04L 47/801 |
| 10,841,360 B2* | 11/2020 | Rubenstein | H04L 67/568 |
| 10,958,737 B2* | 3/2021 | Livshits | H04N 21/26258 |
| 11,038,942 B2* | 6/2021 | Nielsen | H04N 21/266 |

(56) References Cited

U.S. PATENT DOCUMENTS

| | | | |
|---|---|---|---|
| 11,076,203 B2* | 7/2021 | LaJoie | G06F 21/10 |
| 11,108,595 B2* | 8/2021 | Knutsen | H04L 45/302 |
| 11,349,658 B2* | 5/2022 | Yang | H04L 9/3239 |
| 11,360,945 B2* | 6/2022 | Rubenstein | G06F 9/4881 |
| 11,403,849 B2* | 8/2022 | Weerasinghe | H04N 21/8358 |
| 11,418,366 B2* | 8/2022 | Rubenstein | H04L 63/0263 |
| 11,503,105 B2* | 11/2022 | Rubenstein | H04N 21/8586 |
| 11,750,419 B2* | 9/2023 | Rubenstein | H04L 45/302 709/249 |
| 11,812,085 B2* | 11/2023 | Utile | H04N 21/2187 |
| 11,824,946 B2* | 11/2023 | Livshits | H04L 67/60 |
| 11,909,805 B1* | 2/2024 | Pachkov | H04L 67/01 |
| 12,184,451 B2* | 12/2024 | Rubenstein | H04L 63/0254 |
| 12,309,001 B2* | 5/2025 | Rubenstein | H04L 9/08 |
| 2002/0007350 A1* | 1/2002 | Yen | G06Q 30/0248 705/52 |
| 2003/0072433 A1 | 4/2003 | Brown et al. | |
| 2003/0147403 A1 | 8/2003 | Border et al. | |
| 2003/0233551 A1 | 12/2003 | Kouznetsov et al. | |
| 2004/0255048 A1* | 12/2004 | Lev Ran | G06F 16/9574 709/201 |
| 2006/0031407 A1 | 2/2006 | Dispensa et al. | |
| 2006/0179150 A1* | 8/2006 | Farley | H04L 67/1034 709/228 |
| 2007/0112812 A1* | 5/2007 | Harvey | H04L 61/4523 |
| 2007/0214283 A1* | 9/2007 | Metke | H04L 61/4511 709/245 |
| 2008/0130891 A1 | 6/2008 | Sun et al. | |
| 2008/0256166 A1 | 10/2008 | Branson et al. | |
| 2008/0260151 A1 | 10/2008 | Fluhrer et al. | |
| 2009/0003223 A1 | 1/2009 | McCallum et al. | |
| 2009/0144443 A1 | 6/2009 | Vasseur et al. | |
| 2009/0193428 A1* | 7/2009 | Dalberg | H04L 67/1019 718/105 |
| 2009/0213754 A1 | 8/2009 | Melamed | |
| 2009/0304003 A1 | 12/2009 | Huynh Van et al. | |
| 2010/0011126 A1* | 1/2010 | Hsu | H04L 67/1008 709/249 |
| 2010/0017603 A1 | 1/2010 | Jones | |
| 2010/0153558 A1 | 6/2010 | Kommula | |
| 2010/0275017 A1 | 10/2010 | Lyer et al. | |
| 2010/0325309 A1 | 12/2010 | Cicic et al. | |
| 2011/0185006 A1* | 7/2011 | Raghav | H04L 67/54 709/201 |
| 2012/0082057 A1 | 4/2012 | Welin et al. | |
| 2012/0188867 A1 | 7/2012 | Fiorone et al. | |
| 2013/0259465 A1 | 10/2013 | Blair | |
| 2014/0086253 A1 | 3/2014 | Yong | |
| 2014/0108665 A1 | 4/2014 | Arora et al. | |
| 2014/0149549 A1 | 5/2014 | Fu | |
| 2014/0226456 A1 | 8/2014 | Khan et al. | |
| 2014/0229945 A1 | 8/2014 | Barkai et al. | |
| 2014/0233577 A1 | 8/2014 | Hatano et al. | |
| 2014/0269712 A1 | 9/2014 | Kidambi | |
| 2014/0304728 A1 | 10/2014 | Wendling | |
| 2014/0324931 A1 | 10/2014 | Grube et al. | |
| 2014/0359704 A1* | 12/2014 | Chen | H04L 63/08 726/3 |
| 2014/0369230 A1 | 12/2014 | Nallur | |
| 2015/0063360 A1 | 3/2015 | Thakkar et al. | |
| 2015/0086018 A1 | 3/2015 | Harjula et al. | |
| 2015/0271104 A1 | 9/2015 | Chikkamath et al. | |
| 2015/0341223 A1 | 11/2015 | Shen et al. | |
| 2016/0006695 A1 | 1/2016 | Prodoehl et al. | |
| 2016/0028586 A1 | 1/2016 | Blair | |
| 2016/0132522 A1* | 5/2016 | Lee | H04L 67/06 707/827 |
| 2016/0134528 A1 | 5/2016 | Lin et al. | |
| 2016/0165463 A1 | 6/2016 | Zhang | |
| 2016/0224460 A1 | 8/2016 | Bryant | |
| 2016/0285977 A1 | 9/2016 | Ng et al. | |
| 2016/0352628 A1 | 12/2016 | Reddy et al. | |
| 2017/0078922 A1 | 3/2017 | Raleigh et al. | |
| 2018/0013583 A1* | 1/2018 | Rubenstein | H04L 45/12 |
| 2021/0345188 A1 | 11/2021 | Shaheen | |

FOREIGN PATENT DOCUMENTS

| | | |
|---|---|---|
| CN | 104320472 A | 1/2015 |
| WO | 2017015667 A1 | 1/2017 |

OTHER PUBLICATIONS

Awduche, D., et al., "Requirements for Traffic Engineering Over MPLS", Network Working Group RFC 2702, Sep. 1999, 29 pages.

Awduche, D., et al., "RSVP-TE: Extensions to RSVP for LSP Tunnels", Network Working Group RFC 3209, Dec. 2001, 61 pages.

Patent Owner UMBRA Technologies Ltd.'s Preliminary Response submitted in IPR2024-00270 on Jun. 17, 2024 (20 pages).

Patent Owner's e-mail forwarding a Request for Director Review of Institution Decision in IPR2024-00270, dated Sep. 19, 2024, 2 pages.

Declaration of Dr. Micah Beck dated Dec. 11, 2024, Ex. 2002 in IPR2024-00270, 12 pages.

Deposition Transcript of Dr. AL. Narasimha Reddy dated Nov. 13, 2024, Ex. 2001 in IPR2024-00270, 28 pages.

Declaration of Dr. AL. Narasimha Reddy dated Feb. 26, 2024, Ex. 1003 in IPR2024-00270, 89 pages.

Oral Hearing Transcript for hearing held Jun. 4, 2025 in IPR2024-00270, dated Jul. 2, 2025, 53 pages.

Patent Owner's Demonstratives, for Oral Argument Hearing, dated Jun. 3, 2025, in IPR2024-00270, 82 pages.

Patent Owner's Sur-Reply, dated Apr. 4, 2025, in IPR2024-00270, 19 pages.

Petitioner's Reply to Patent Owner's Response, dated Feb. 21, 2025, in IPR2024-00270, 20 pages.

Patent Owner's Response, dated Dec. 11, 2024, in IPR2024-00270, 27 pages.

Order Denying Patent Owner's Request for Director Review of Institution Decision, dated Oct. 29, 2024, in IPR2024-00270, 3 pages.

Patent Owner's Request for Director Review of Institution Decision, dated Sep. 19, 2024, in IPR2024-00270, 12 pages.

Board's Decision Granting Institution of Inter Partes Review dated Sep. 5, 2024, Paper 9 in IPR2024-00270, 26 pages.

Cisco Systems, Inc.'s Petition for Inter Partes Review of U.S. Pat. No. 11,108,595, dated Feb. 26, 2024, Paper 2 in IPR2024-00270, 82 pages.

* cited by examiner

Group 1 =   A   B   C   D       F

Group 2 =   A       C   D   E

Comparison:  A       C   D

FIG. 24

SYSTEMS AND METHODS FOR PROVIDING A GLOBAL VIRTUAL NETWORK (GVN)

CROSS-REFERENCE TO RELATED APPLICATIONS

This application is a continuation of U.S. patent application Ser. No. 18/981,108, filed Dec. 13, 2024, which is a continuation of U.S. patent application Ser. No. 18/358,519, filed on Jul. 25, 2023, issued as U.S. Pat. No. 12,184,451, which is a continuation of U.S. patent application Ser. No. 17/888,249, filed on Aug. 15, 2022, issued as U.S. Pat. No. 11,750,419, which is a continuation of U.S. patent application Ser. No. 17/461,624, filed on Aug. 30, 2021, issued as U.S. Pat. No. 11,418,366, which is a continuation of U.S. patent application Ser. No. 17/000,997, filed on Aug. 24, 2020, issued as U.S. Pat. No. 11,108,595, which is a continuation of U.S. patent application Ser. No. 15/563,253, filed Sep. 29, 2017, issued as U.S. Pat. No. 10,756,929, which is a U.S. National Stage application under 35 U.S.C. § 371 of International Patent Application No. PCT/US2016/026489, filed Apr. 7, 2016, which claims the benefit of and priority to U.S. Provisional Application No. 62/144,293, filed on Apr. 7, 2015, and U.S. Provisional Application No. 62/151,174, filed on Apr. 22, 2015, each of which is incorporated herein by reference in its entirety.

BACKGROUND OF THE INVENTION

Technical Field

The present disclosure relates generally to networks, and more particularly, a global virtual network and various associated ancillary modules.

Description of the Related Art

Human beings are able to perceive delays of 200 ms or more as this is typically the average human reaction time to an event. If latency is too high, online systems such as thin-clients to cloud-based servers, customer relationship management (CRM), enterprise resource planning (ERP) and other systems will perform poorly and may even cease functioning due to timeouts. High latency combined with high packet loss can make a connection unusable. Even if data gets through, at a certain point too much slowness results in a poor user experience (UX) and in those instances the result can be refusal by users to accept those conditions in effect rendering poorly delivered services as useless.

To address some of these issues, various technologies have been developed. One such technology is WAN optimization, typically involving a hardware (HW) device at the edge of a local area network (LAN) which builds a tunnel to another WAN optimization HW device at the edge of another LAN, forming a wide area network (WAN) between them. This technology assumes a stable connection through which the two devices connect to each other. A WAN optimizer strives to compress and secure the data flow often resulting in a speed gain. The commercial driver for the adoption of WAN optimization is to save on the volume of data sent in an effort to reduce the cost of data transmission. Disadvantages of this are that it is often point-to-point and can struggle when the connection between the two devices is not good as there is little to no control over the path of the flow of traffic through the Internet between them. To address this, users of WAN optimizers often opt to run their WAN over a Multiprotocol Label Switching (MPLS) or DDN line or other dedicated circuit resulting in an added expense and again usually entailing a rigid, fixed point-to-point connection.

Direct links such as MPLS, DDN, Dedicated Circuits or other types of fixed point-to-point connection offer quality of connection and Quality of Service (QOS) guarantees. They are expensive and often take a significantly long time to install due to the need to physically draw lines from a point of presence (POP) at each side of the connection. The point-to-point topology works well when connecting from within one LAN to the resources of another LAN via this directly connected WAN. However, when the gateway (GW) to the general Internet is located at the LAN of one end, say at the corporate headquarters, then traffic from the remote LAN of a subsidiary country may be routed to the Internet through the GW. A slowdown occurs as traffic flows through the internet back to servers in the same country as the subsidiary. Traffic must then go from the LAN through the WAN to the LAN where the GW is located and then through the Internet back to a server in the origin country, then back through the internet to the GW, and then back down the dedicated line to the client device within the LAN. In essence doubling or tripling (or worse) the global transit time of what should take a small fraction of global latency to access this nearby site. To overcome this, alternative connectivity of another internet line with appropriate configuration changes and added devices can offer local traffic to the internet, at each end of such a system.

Another option for creating WAN links from one LAN to another LAN involves the building of tunnels such as IPSec or other protocol tunnels between two routers, firewalls, or equivalent edge devices. These are usually encrypted and can offer compression and other logic to try to improve connectivity. There is little to no control over the routes between the two points as they rely on the policy of various middle players on the internet who carry their traffic over their network(s) and peer to other carriers and or network operators. Firewalls and routers, switches and other devices from a number of equipment vendors usually have tunneling options built into their firmware.

While last mile connectivity has vastly improved in recent years there still exist problems with long distance connectivity and throughput due to issues related to distance, protocol limitations, peering, interference, and other problems and threats. As such, there exists a need for secure network optimization services running over the top of standard internet connections.

SUMMARY OF THE DISCLOSURE

A global virtual network (GVN) is a type of network which offers network optimization over the top (OTT) of the internet. It is a disruptive technology which provides a low cost alternative to costly MPLS or dedicated lines. Having a secure tunnel between an end point device (EPD) and an access point server (SRV_AP) linked to the broader GVN global network offers many advantages. The core technologies of the GVN were created to fill gaps where solutions were required but for which technology did not exist.

In addition to the broader theme of addressing quality of service (QOS) issues related to the network connectivity which improve general performance and enhance user experience, two other main features are that this topology allows for the extension of a network edge into the cloud. Additionally, the EPD acts as a bridge between the broader network and a local area network (LAN) bringing elements of the cloud as a local node extension into the edge of the LAN.

The disclosed subject matter describes various ancillary modules of the global virtual network which are either facilitated by a GVN or which assist it in its operations. The geographic destination claims have to do specifically with how the CDA and the CPA work, as well as their interactions and coordinated efforts. The geocasting element describes how the GeoD mechanism can offer a reverse-content delivery network (CDN) geocasting operation utilizing the topology of the GVN. The tunnels describe what can be done with the plumbing from a higher level. Architecture and algorithm/logic inventions describe component parts. Graphic user interface and related HW and software (SW) frameworks are also outlined as is file transferring.

Systems and methods for managing a virtual global network connection between an endpoint device and an access point server are disclosed. In one embodiment, the network system may include an endpoint device, an access point server, and a control server. The endpoint device and the access point server may be connected with a first tunnel. The access point server and the control server may be connected with a second tunnel.

BRIEF DESCRIPTION OF THE DRAWINGS

In order to facilitate a fuller understanding of the present disclosure, reference is now made to the accompanying drawings, in which like elements are referenced with like numerals or references. These drawings should not be construed as limiting the present disclosure, but are intended to be illustrative only.

FIG. 24 describes how a description of two different sets of data can provide information when comparing various dissimilar data sets in accordance with certain embodiments of the disclosed subject matter.

DETAILED DESCRIPTION

Figure 1:
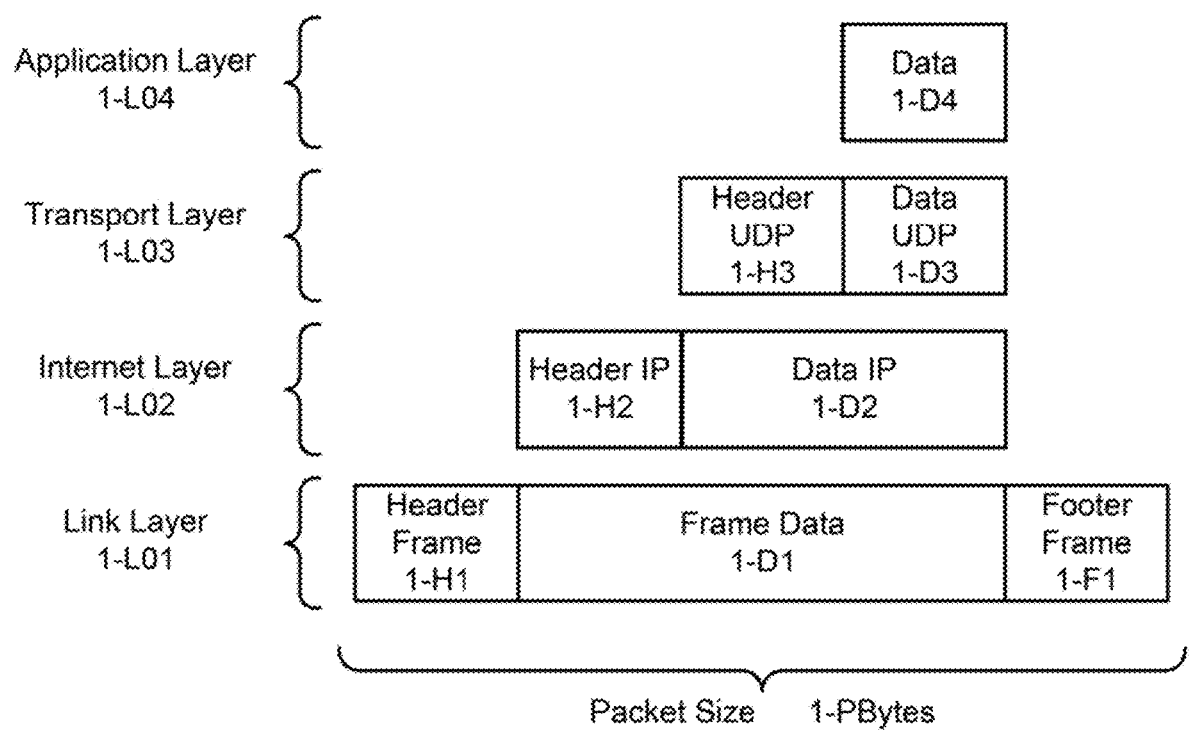
FIG. 1 illustrates the packet bloat for IP transport packets when headers are added to the data at various layers.

In the following description, numerous specific details are set forth regarding the systems, methods and media of the disclosed subject matter and the environment in which such systems, methods and media may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems, methods, and media that are within the scope of the disclosed subject matter.

A global virtual network (GVN) offers secure network optimization services to clients over the top (OTT) of their standard internet connection. This is an overview of the constituent parts of a GVN as well as a description of related technologies which can serve as GVN elements. GVN elements may operate independently or within the ecosystem of a GVN such as utilizing the GVN framework for their own purposes, or can be deployed to enhance the performance and efficiency of a GVN. This overview also describes how other technologies can benefit from a GVN either as a stand-alone deployment using some or all components of a GVN, or which could be rapidly deployed as an independent mechanism on top of an existing GVN, utilizing its benefits.

A software (SW) based virtual private network (VPN) offers privacy via a tunnel between a client device and a VPN server. These have an advantage of encryption and in some cases also compression. But here again there is little to no control over how traffic flows between VPN client and VPN server as well as between the VPN server and host server, host client or other devices at destination. These are often point-to-point connections that require client software to be installed per device using the VPN and some technical proficiency to maintain the connection for each device. If a VPN server egress point is in close proximity via quality communication path to destination host server or host client, then performance will be good. If not, then there will be noticeable drags on performance and dissatisfaction from a usability perspective. It is often a requirement for a VPN user to have to disconnect from one VPN server and reconnect to another VPN server to have quality or local access to content from one region versus the content from another region.

A Global Virtual Network (GVN) is a type of computer network on top of the internet providing global secure network optimization services utilizing a mesh of devices distributed around the world securely linked to each other by advanced tunnels, collaborating and communicating via Application Program Interface (API), Database (DB) replication, and other methods. Traffic routing in the GVN is always via best communication path governed by Advanced Smart Routing (ASR) powered by automated systems which combine builders, managers, testers, algorithmic analysis and other methodologies to adapt to changing conditions and learning over time to configure and reconfigure the system.

The GVN offers a service to provide secure, reliable, fast, stable, precise and focused concurrent connectivity over the top of one or more regular Internet connections. These benefits are achieved through compression of data flow transiting multiple connections of wrapped, disguised and encrypted tunnels between the EPD and access point servers (SRV_AP) in close proximity to the EPD. The quality of connection between EPD and SRV_AP's is constantly being monitored.

A GVN is a combination of a hardware (HW) End Point Device (EPD) with installed software (SW), databases (DB) and other automated modules of the GVN system such as Neutral Application Programming Interface Mechanism (NAPIM), back channel manager, tunnel manager, and more features which connect the EPD to distributed infrastructure devices such as access point server (SRV_AP) and central server (SRV_CNTRL) within the GVN.

Algorithms continually analyze current network state while taking into account trailing trends plus long term historical performance to determine best route for traffic to take and which is the best SRV_AP or series of SRV_AP servers to push traffic through. Configuration, communication path and other changes are made automatically and on the fly with minimal or no user interaction or intervention required.

Advanced Smart Routing in an EPD and in an SRV_AP ensure that traffic flows via the most ideal path from origin to destination through an as simple as possible "Third Layer" of the GVN. This third layer is seen by client devices connected to the GVN as a normal internet path but with a lower number of hops, better security and in most cases lower latency than traffic flowing through the regular internet to the same destination. Logic and automation operate at the "second layer" of the GVN where the software of the GVN automatically monitors and controls the underlying routing and construct of virtual interfaces (VIF), multiple tunnels and binding of communication paths. The third and second layers of the GVN exist on top of the operational "first layer" of the GVN which interacts with the devices of the underlying Internet network.

The cloud from a technical and networking perspective refers to devices or groups or arrays or clusters of devices which are connected and are available to other devices through the open internet. The physical location of these devices is not of significant importance as they often have their data replicated across multiple locations with delivery to/from closest server to/from requesting client utilizing content delivery network (CDN) or other such technology to speed connectivity which enhances user experience (UX).

In some embodiments, the disclosed subject matter is related to increasing utility value of firewalls (FW) by extending perimeters into the cloud. A firewall is a device primarily designed to protect an internal network against the external threats from an outside network, as well as protecting the leakage of information data from the internal network. A firewall has traditionally been placed at the edge between one network such as a local area network (LAN) and another network such as its uplink to a broader network. Network administrators have sensitivities about the placement and trustworthiness of a FW because of their reliance on it to secure their networks.

FIG. 1 illustrates the packet bloat for IP transport packets when headers are added to the data at various layers. At the Application Layer 1-L04, the data payload has an initial size as indicated by Data 1-D4. The size of the packet is indicated by Packet Size 1-PBytes. At the next layer, Transport Layer 1-L03, the Packet Size 1-PBytes has the original size of the data 1-D4 which is equal to Data UDP 1-D3. It further includes bloat of Header UDP 1-H3. At the next layer, Internet Layer 1-L02 the body payload Data IP 1-D2 is a combination of 1-D3 and 1-H3. It increases 1-PBytes by Header IP 1-H2. At the Link Layer 1-L01, Frame Data 1-D1 is a combination of 1-H2 and 1-D2. It further increases 1-PBytes by Header Frame 1-H1 and Footer Frame 1-F1.

Figure 2:
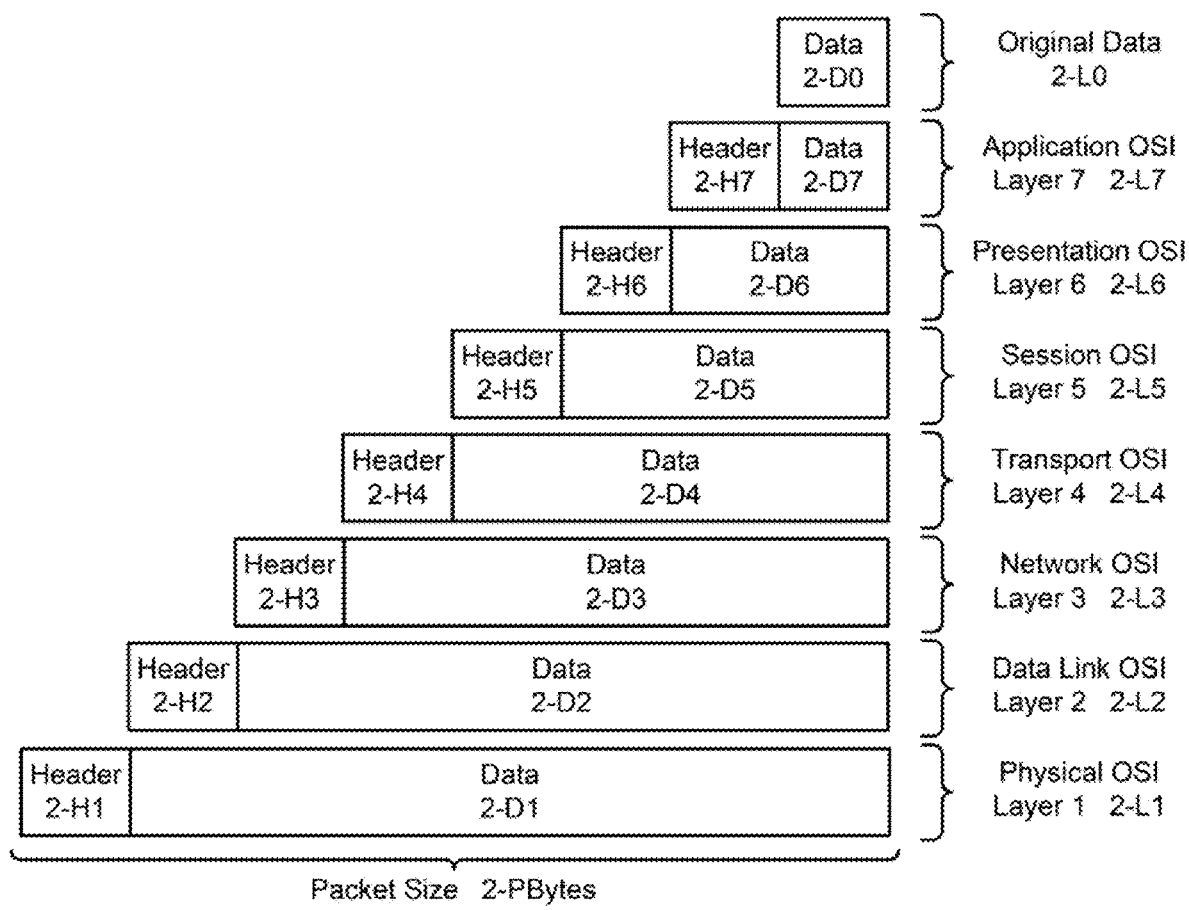
FIG. 2 illustrates the packet bloat of data and headers at each of the seven layers of the open systems interconnection (OSI) model.

FIG. 2 illustrates the packet bloat of data and headers at each of the seven layers of the OSI model. The original data 2-DO grows at each level Application OSI Layer 7 2-L7 with the addition of headers such as Header 2-H7. At each subsequent layer down from layer 7 to layer 1, the data layer is a combination of the previous upper level's layer of Data and Header combined. The total packet bloat in an OSI model at the Physical OSI Layer 2-LI is denoted by Packet Size 2-PBytes.

Figure 3:
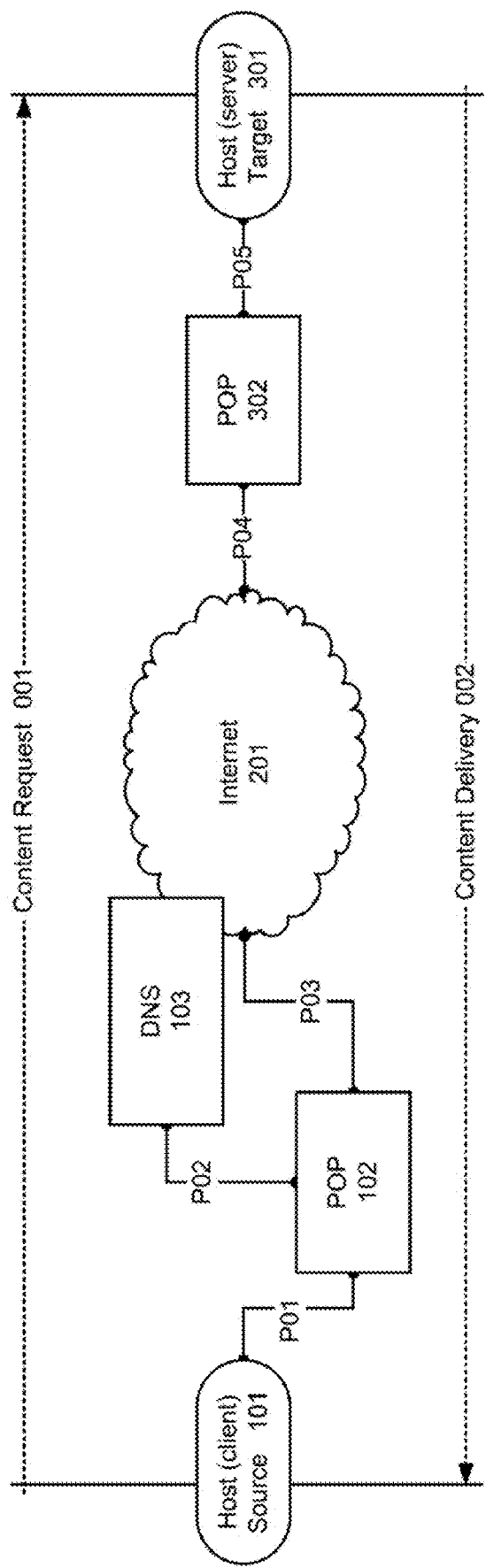
FIG. 3 shows a block diagram depicting resolution of universal resource locator (URL) via lookup through internet domain name system (DNS) for routing from Host (client) to the numeric IP address of the Host (server).

FIG. 3 shows a block diagram depicting resolution of universal resource locator (URL) via lookup through internet domain name system (DNS) for routing from Host (client) to the numeric IP address of the Host (server). A content request or push from host (client) source 101 to host (server) target 301 as files or streams or blocks of data flows in the direction of 001. The response 002 of content delivery from host (server) target 301 to host (client) source 101 as files or streams or blocks of data. The host (client) source 101 in Client-Server (C-S) relationship that makes request to access content from a remote host (server) or sends data to remote host (server) via a universal resource locator (URL) or other network reachable address.

The connection from the host client to the internet is marked as P01—connection from client 101 to POP 102 directly facing or can be located in a local area network (LAN) which then connects to the internet via a point of presence (POP) can be referred to as the last mile connection. The point of presence (POP) 102 which represents connection provided from an end point by an internet service provider (ISP) to the internet via their network and its interconnects. If the URL is a domain name rather than a numeric address, then this URL is sent to domain name system (DNS) server 103 where the domain name is translated to an IPV4 or IPv6 or other address for routing purposes.

Traffic from client 101 to server 301 is routed through the Internet 201 representing transit between POPs (102 and 302) including peering, backhaul, or other transit of network boundaries.

The connection P02 from POP 102 to DNS 103 to look up a number address from a universal resource locator (URL) to get the IPv4 address or other numeric address of target server can be directly accessed from the POP 102, or via the Internet 201. The connection P03 from POP 102 of an ISP to the Internet 201 can be single-honed or multi-honed. There is a connection P04 from the Internet 201 to the ISP's or internet data center's (IDC) internet-facing POP 302. The connection P05 from the POP 302 of the server to the host 301 can be direct or via multiple hops.

The lookups from name to numeric address via domain name systems is a standard on the Internet today and assumes that the DNS server is integral and that its results are current and can be trusted.

Figure 4:
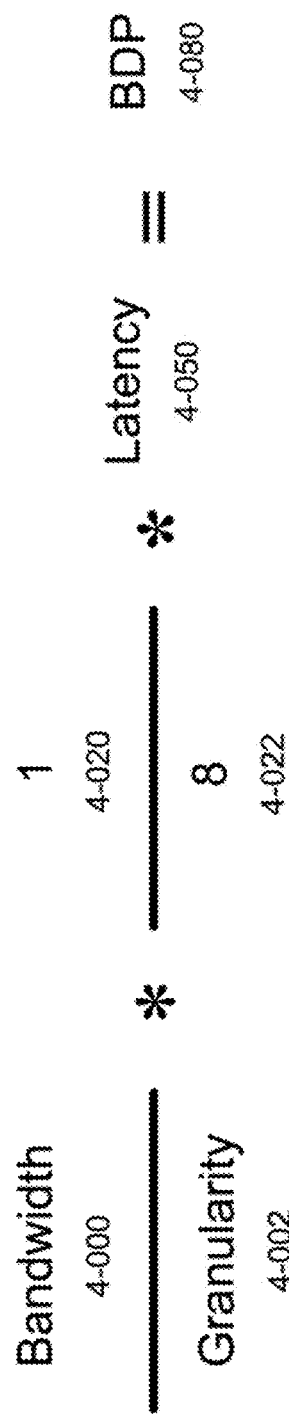
FIG. 4 illustrates, in accordance with certain embodiments of the disclosed subject matter, an equation to calculate bandwidth delay product (BDP) for a connection segment or path taking into account various connectivity attributes.

FIG. 4 illustrates, in accordance with certain embodiments of the disclosed subject matter, an equation to calculate bandwidth delay product (BDP) 4-080 for a connection segment or path taking into account various connectivity attributes. The further the distance between the two points and/or other factors which increase latency impact the amount of data that the line can blindly absorb before the sending device knows receives back a message from the recipient device about whether or not they were able to accept the volume of data.

In short, the BDP 4-080 calculation can represent a measure of how much data can fill a pipe before the server knows it is sending too much at too fast a rate.

The Bandwidth 4-000 can be measured in megabits per second (Mbps) and Granularity 4-002 can be unit of time relative to one second. To accurately reflect BDP 4-080, the Bytes 4-020 are divided by the number of Bits 4-022 of a system. Latency 4-050 is a measurement of round trip time (RTT) in milliseconds (ms) between the two points.

So for example, BDP 4-080 of the following network path with these attributes—Bandwidth 4-000 of 10 GigE using Granularity 4-002 of one second, on an eight bit system over a path with Latency 4-050 of 220 ms—can be calculated as follows:

$$\frac{10,000,000,000}{1} * \frac{1}{8} * 0.220 = 275,000,000 \text{ bits OR } 33,569.3 \text{ MB}$$

Therefore on a 10 GigE line, the sending device could theoretically send 33,569.3 megabytes of information (MB) in the 220 ms before a message can be received back from the recipient client device.

This calculation can also be the basis of other algorithms such as one to govern the size of a RAM buffer, or one to govern the time and amount of data that is buffered before there is a realization of a problem such as an attack vector. The throttling down by host server could lead to underutilized pipes but the accepting too much data can also lead to other issues. The calculation of BDP 4-080 and proactive management approach to issues leads to efficient utilization of hardware and network resources.

Figure 5:
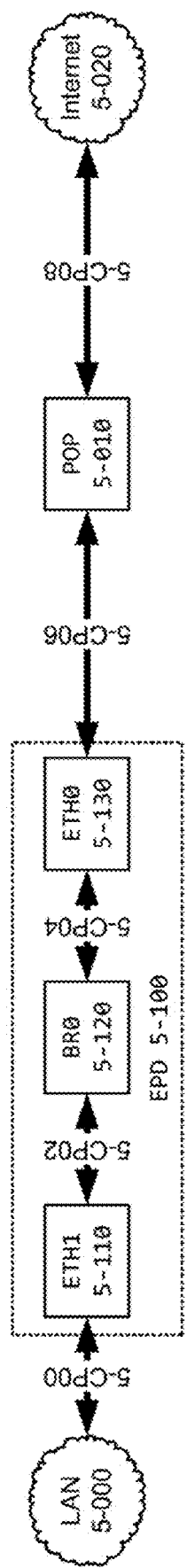
FIG. 5 illustrates, in accordance with certain embodiments of the disclosed subject matter, the traffic flow path within an end point device (EPD).

FIG. 5 illustrates, in accordance with certain embodiments of the disclosed subject matter, the traffic flow path within an end point device (EPD). The traffic flows between the LAN 5-000 and the end point device (EPD) 5-100 over connection 5-CP00. End point device (EPD) 5-100 flows to the point of presence (POP) 5-010 over connection 5-CP06. The point of presence (POP) 5-010 is connected to the Internet 5-020 via connection 5-CP08.

Figure 6:
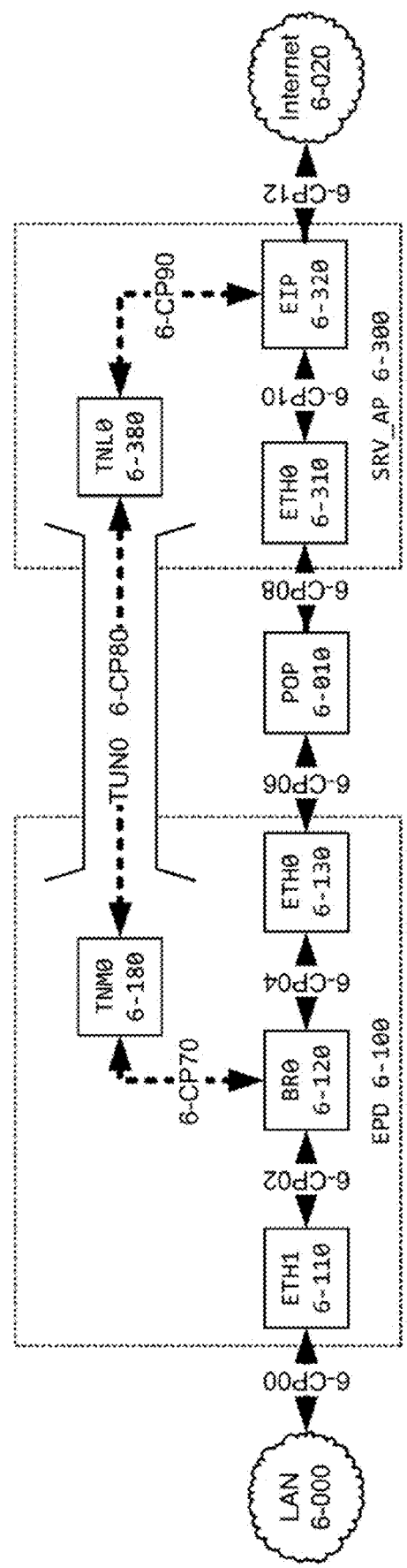
FIG. 6 illustrates, in accordance with certain embodiments of the disclosed subject matter, an over the top (OTT) tunnel created on top of a regular internet connection.

FIG. 6 illustrates, in accordance with certain embodiments of the disclosed subject matter, an over the top (OTT) tunnel created on top of a regular internet connection. FIG. 6 is similar to FIG. 5 and additionally shows an access point server (SRV_AP) 6-300. The access point server (SRV_AP) 6-300 includes a tunnel listener TNL0 6-380. The end point device (EPD) 6-100 includes a tunnel manager TNM0 6-180. A tunnel TUN0 6-CP80 is constructed that connects the tunnel manager TNM0 6-180 and the tunnel listener TNL0 6-380. The tunnel is constructed over-the-top (OTT) of the regular internet connection 6-CP06 and 6-CP08.

Figure 7:
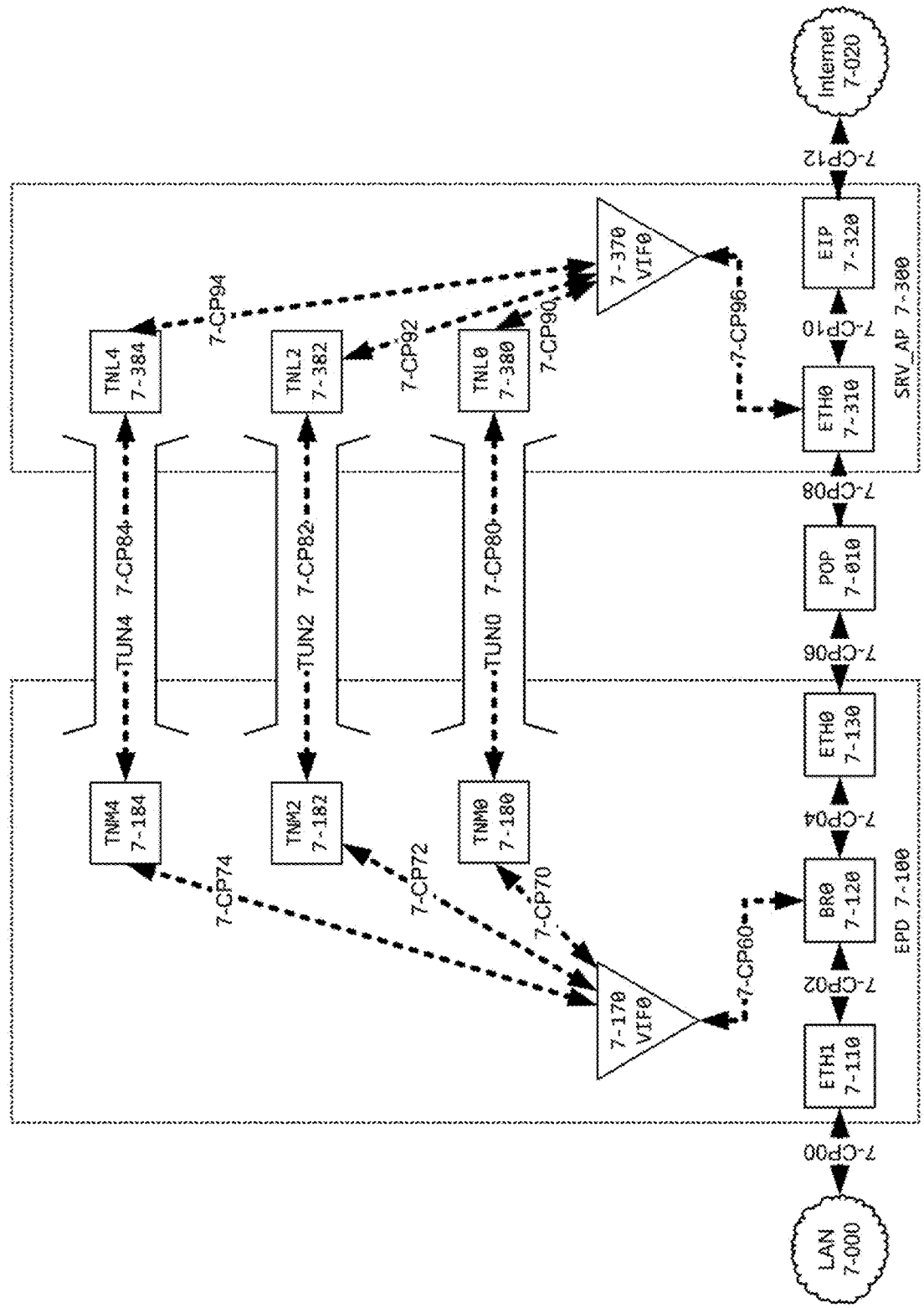
FIG. 7 illustrates, in accordance with certain embodiments of the disclosed subject matter, a virtual interface for over the top (OTT) tunnels created on top of a regular internet connection.

FIG. 7 illustrates, in accordance with certain embodiments of the disclosed subject matter, a virtual interface for over the top (OTT) tunnels created on top of a regular internet connection. FIG. 7 is similar to FIG. 6 and additionally includes a virtual interface (VIF) as a hook point on each device EPD 7-100 and SRV_AP 7-300 for multiple tunnels to be built between two. This figure also shows multiple tunnels TUN0 7-CP80, TUN2 7-CP82, and TUN4 7-CP84 between EPD 7-100 and SRV_AP 7-300. A main advantage of the virtual interface VIF0 7-170 and VIF0 7-370 on each device respectively is that this approach enables clean structural attributes and a logical pathway for more complex constructs of tunnels and subsequent routing complexity.

Certain other advantages with regards to timing and flow control will be described in subsequent figures below.

Figure 8:
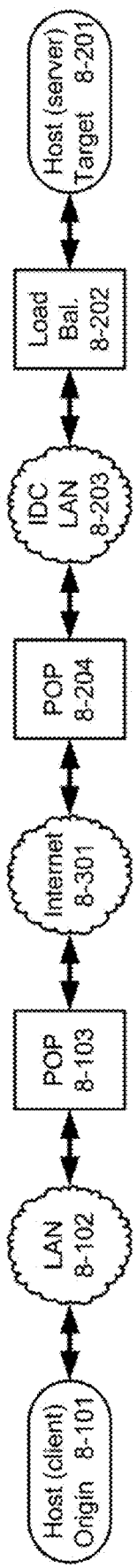
FIG. 8 illustrates a conventional embodiment of flow of the Internet traffic.

FIG. 8 illustrates a conventional embodiment of flow of the Internet traffic. In FIG. 8, the traffic through the Internet is from a Host (client) Origin 8-101 connected to a local area network (LAN) 8-102 to a point of presence (POP) 8-103 of an Internet service provider (ISP) to the Internet 8-301 to a POP 8-204 of an Internet data center (IDC) 8-203 to a load balancer 8-202 routing traffic to a Host (server) Target 8-201.

The client and the server both have little to no control over the routes that their traffic takes through the Internet and other networks between them.

Figure 9:
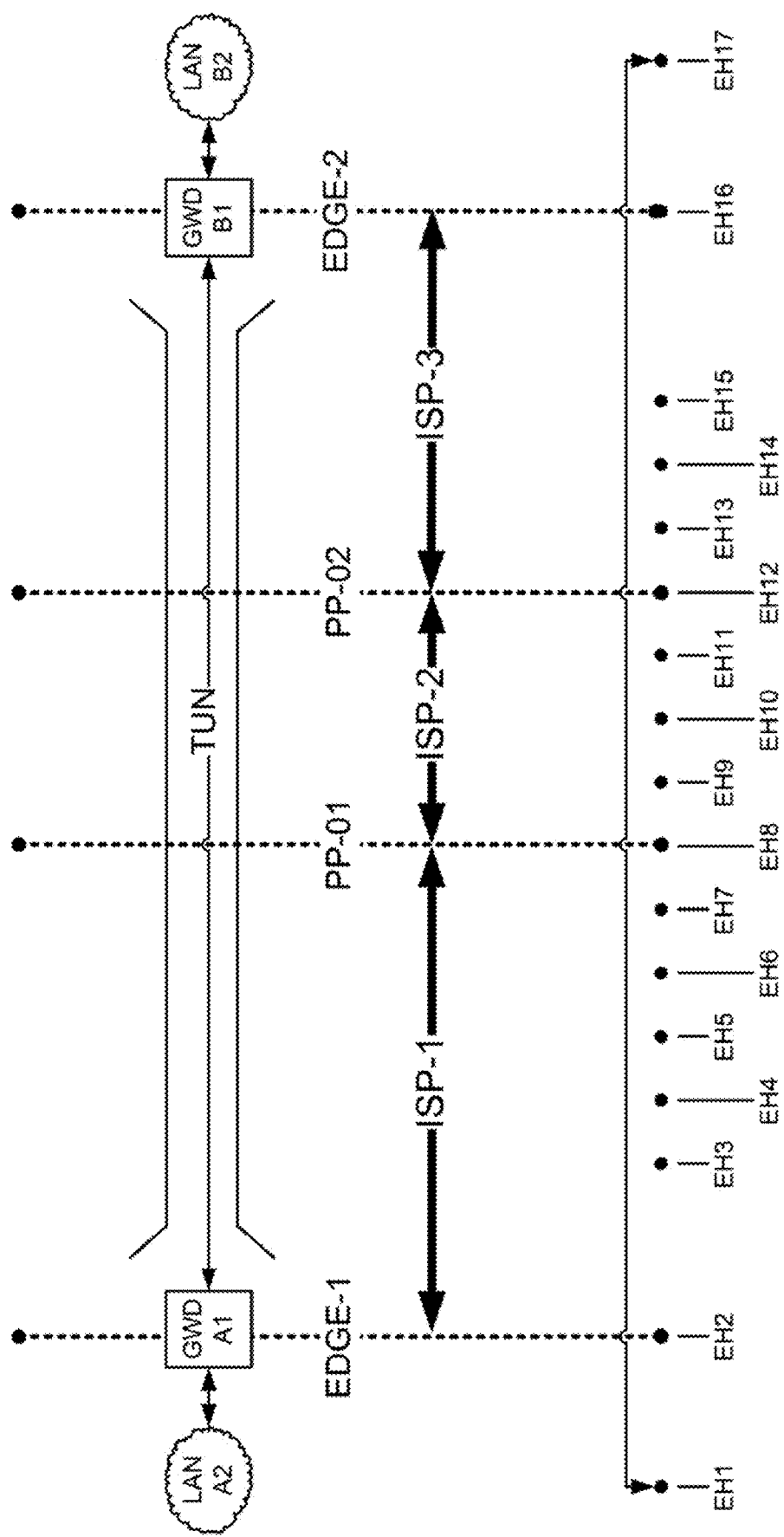
FIG. 9 illustrates, in accordance with certain embodiments of the disclosed subject matter, a tunnel (TUN) built between two gateway devices (GWD).

FIG. 9 illustrates, in accordance with certain embodiments of the disclosed subject matter, a tunnel (TUN) built between two gateway devices (GWD). In FIG. 9, GWD A1 and GWD B1 are each located between the edges EDGE-1 and EDGE-2 of their internal networks and the open Internet. The TUN connects the two local area networks (LAN) into a broader wide area network (WAN). The GWD A1 receives its connectivity from an Internet service provider ISP-1 and GWD B1 from ISP-3. A key point is that while the TUN offers security and other benefits, there are potential negative issues because traffic from ISP-1 destined for ISP-3 must transit through the network of ISP-2.

Congestion due to saturation, packet loss, or other issues can occur at peering points PP-01 and/or at PP-02 or within the network of ISP-2. Because neither GWD A1 nor GWD B1 is a client of ISP-2, they have to reach ISP-2 via complaining to their respective ISP of ISP-1 or ISP-3.

Another thing to note is that while the Internet path may consist of many hops such as, for example, external hop (EH) EH1 through EH17, within the TUN there will be only one hop at each of the end points of the tunnel. The tunnel is an encrypted path over the top (OTT) of the open Internet.

Figure 10:
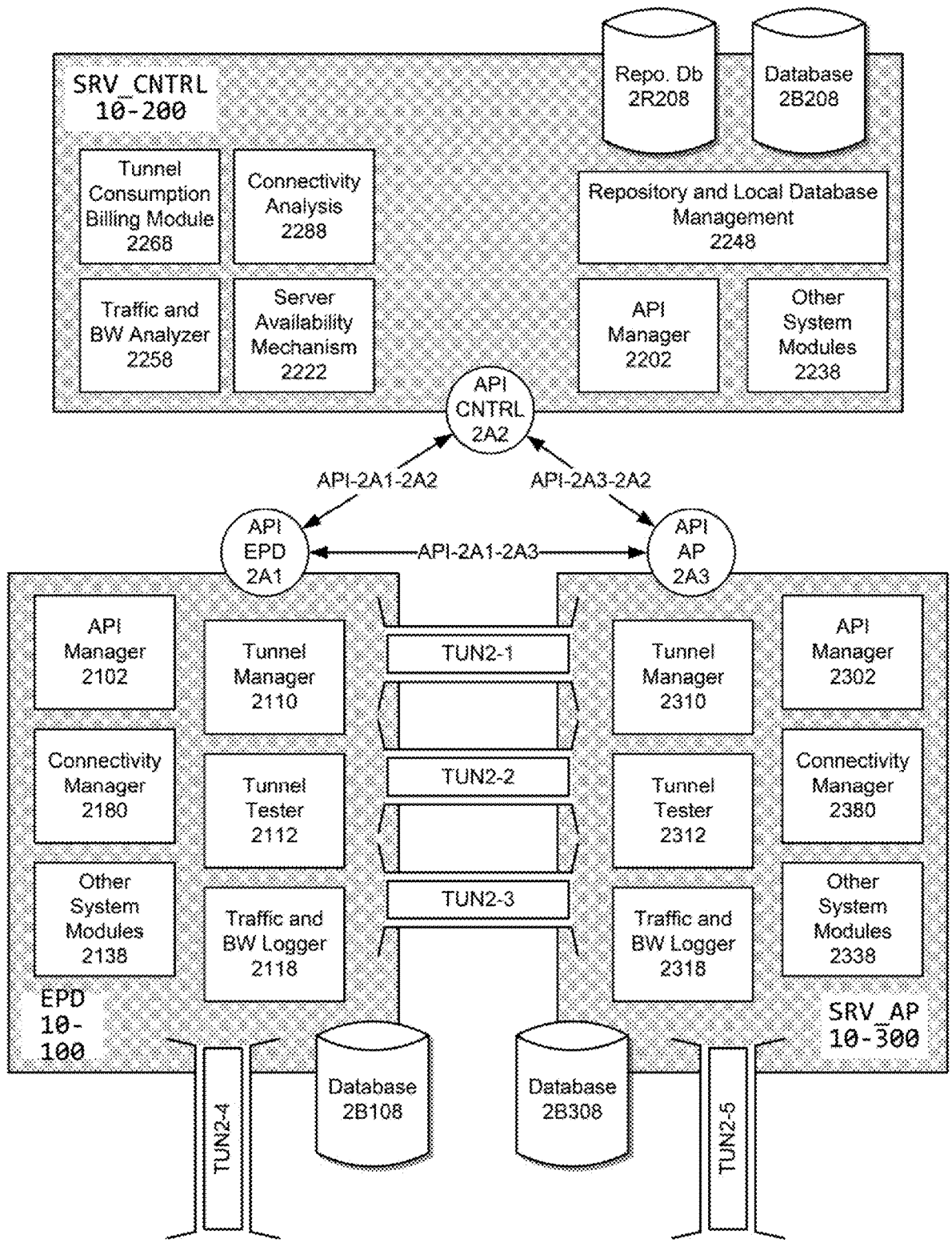
FIG. 10 illustrates, in accordance with certain embodiments of the disclosed subject matter, the communications between EPD 100, SRV_CNTRL 200, and SRV_AP 300 via the neutral API mechanism (NAPIM) of the GVN via paths API-10A1-10A2, API-10A3-10A2, and API-10A1-10A3.

FIG. 10 illustrates, in accordance with certain embodiments of the disclosed subject matter, the communications between EPD 10-100, SRV_CNTRL 10-200, and SRV_AP 10-300 via the neutral API mechanism (NAPIM) of the GVN via paths API-2A1-2A2, API-2A3-2A2, and API-2A1-2A3.

For tunnels TUN2-1, TUN2-2, and TUN2-3 to be built between EPD 10-100 and SRV_AP 10-300 as well as for tunnels from EPD 10-100 to other SRV_AP servers such as TUN2-4 and from other EPDs to SRV_AP 10-300 via TUN2-5, each device in the peer pair requires certain information per tunnel.

The NAPIM mechanism stores relevant credentials, coordinates and other information for each side of a peer pair to utilize when building new tunnels via the Tunnel Managers 2110 and 2310. The server availability mechanism 2222 on the SRV_CNTRL 10-200 evaluates the performance of various tunnels tested on the EPD side via Tunnel Tester 2112 and the SRV_AP side by Tunnel Tester 2312. The information from the tests is relayed to the Connectivity Analyzer 2288 on the SRV_CNTRL 10-200. Test results include assigned IP address and port combinations, ports used, results from historical combinations use, results from port spectrum tests, and other related information.

Server availability lists present the EPD 10-100 with a list of IP addresses and ports which could be utilized by the Tunnel Manager to build new tunnels. The SRV_AP 10-300 and other SRV_AP servers noted on the list will be notified and listen for connection attempts to be made by EPD 10-100.

Server availability prioritizes the list of SRV_AP IP address and port combinations based on expected best performance of the tunnels to be built while also looking at current load of available SRV_AP servers, balancing assigned lists given to other EPDs as well as other available information.

Figure 11:
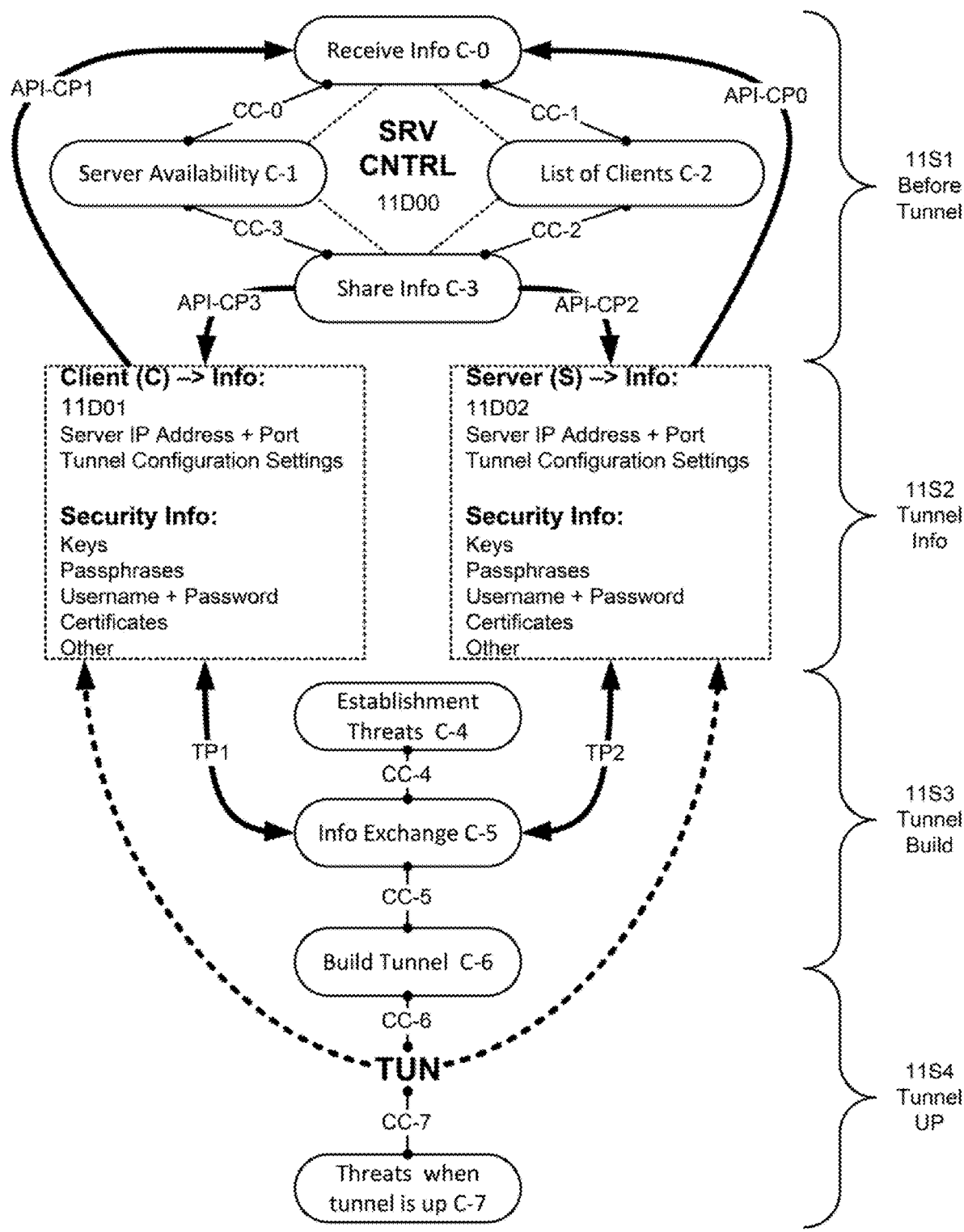
FIG. 11 illustrates, in accordance with certain embodiments of the disclosed subject matter, the flow of information required by two peers in a peer pair.

FIG. 11 illustrates, in accordance with certain embodiments of the disclosed subject matter, the flow of information required by two peers in a peer pair. The peers can either be a Client (C) and a Server(S), or a Peer to another Peer in a P-2-P topology. For simplicity of labeling and descriptions within this example embodiment, the C to S and P-2-P represent the same type of two peer relationship, with C to S described herein. The GVN mainly uses C to S relationships between devices but its methods and technology can also be applied to P-2-P peer pairs for tunnel building.

An encrypted tunnel by its nature is a secure communication path through which data can flow. When the Client and the Server are separated by distance and the connection between them is over the open, unencrypted Internet, an encrypted tunnel is an ideal channel through which to safely exchange data. If there is a human network administrator at either end, they can program devices. But there exists a challenge on how to relay security information like pass phrases, keys and other information. Some may use a voice phone call to coordination, others a series of postings through secure web sites to share information or other methods. Manually setting up a single tunnel can be a task. Administering multiple tunnels can become onerous.

To automatically build a series of encrypted tunnels between two devices in a peer pair there exists a need to securely share information. The tunnel information also needs to be current and securely stored on a device. Furthermore, during the establishment process, there exist threats which must be addressed. While a tunnel is up, other threats exist which need to be addressed.

SRV_CNTRL 11D00 is a central server which contains Repository managing information in Database tables, files stored in a Secure File Storage system, lists in memory and other related information. The SRV_CNTRL also has algorithms and mechanisms to evaluate certain data to generate information reports.

Client Device 11D01 represents a device which will initiate the building of a tunnel by "dialing" the connection to the Server device via a specific IP Address and Port. There can be many Client devices 11D01 concurrently connected to the GVN with similar software and configuration with a differentiating factor between Clients of unique device Identity, UUID's, and also unique information per tunnel per Client.

Server Device 11D02 represents a device which will be listening for client connection attempts on specific IP Addresses and Ports. If the Client follows correct protocol and establishment sequence, and presents correct credentials and other security information, the Server will allow the Client to build a tunnel to it. There can be many Server devices 11D02 concurrently connected to the GVN with similar software and configuration with a differentiating factor of unique device Identity, UUID's, and other unique information.

Tunnel Info 11S2 shows the information stored on a Client Device 11D01 and a Server Device 11D02. Each device can establish multiple tunnels and each tunnel will have its own set of Tunnel Information and Security Information. Some tunnel information sets may be used for building of current active tunnels and other tunnel info sets may be held in reserve for future tunnels.

Certain information between the C and S is equivalent such as a pass-phrase which one will present to the other, and other information will be different depending on applicability. Information requirements for building of a tunnel between two points can include: client/server topology and settings; IP and port of each end point to be used by the tunnel; tunnel metrics including MTU size, protocol, and other information used for its operations; keys, pass phrases and other information about security protections used for the tunnel; SSL certificates and other information for protecting the information exchange pre-tunnel UP; and other information. The information is shared between devices using specific API Action calls of the Neutral API of the GVN.

Before Tunnel 11S1 describes the process of receiving and sharing information between devices 11D01 and 11D02 and the repository 11D00 on SRV_CNTRL and back to devices 11D01 and 11D02. API Communication Paths API-CP0, API-CP2, API-CP1, and API-CP3 represent Request-Response information exchange with the arrows representing the direction of the flow of information from one device to another device.

Server 11D02 reports information to Receive Info C-0 module of the SRV_CNTRL 11D00 device via path API-CP0. SRV_CNTRL 11D00 receives information from servers and stores relevant Identity, Tunnel, Current Load and other information in its repository. For example, algorithms and AI logic on SRV_CNTRL 11D00 analyze server load and based on current and anticipated demand from Client 11D01 devices, Server Availability C-1 matrix is updated. The Server Availability C-1 information may be conveyed by database replication through the API of the GVN to Clients 11D01 via Share Info C-3 module via API call path API-CP3, by direct file sharing via GVN, or other method.

Client 11D01 reports information to Receive Info C-0 module of the SRV_CNTRL 11D00 device via path API-CP1. This information will be stored in the repository of SRV_CNTRL 11D00. Specific tunnel information from a Client 11D01 can be shared with Server 11D02 by Share Info C-3 module via path API-CP2.

SRV_CNTRL 11D00 compiles a current List of Clients C-2 per server which it publishes to Server 11D02 via Share Info C-3 via path API-CP2.

If either Client 11D01 or Server 11D02 detects problems in establishment of tunnel utilizing current tunnel information, one or the other device can request a new set of tunnel information to be generated by SRV_CNTRL 11D00 via API-CP1 or API-CP0 respectively. New tunnel info sets can be shared via Share Info C-3 with both peers in a peer pairing with Client 11D01 info sent via API-CP3 and Server 11D02 info sent via API-CP2.

The List of Clients C-2 and the current state of a Server 11D02 will have a direct impact on the Server Availability C-1.

Each Server 11D02 needs to organize, secure and coordinate its List of Clients C-2 which will attempt to build new tunnels to shared resources of Server 11D02. This information will be fluid and need to be updated regularly via secure API calls to SRV_CNTRL 11D00.

The need to securely harmonize info between devices is essential to protect the integrity of tunnels between them.

Tunnel Build 11S3 phase describes the process of tunnel establishment via Share Info C-3. Refer to FIG. 11 for the steps taken between Client and Server to build the tunnel. The path TP1 represents path between Client 11D01 and Info Exchange C-5 and from Info Exchange C-5 to Server 11D02 via path TP2.

Establishment Threats C-8 refers to threats to Info Exchange C-10 during tunnel establishment. If the signature of the tunnel type is visible, then there may be threats during the tunnel establishment C-4 such as fake Transport Layer Security (TLS) handshakes from illegitimate actors in the middle, TLS errors on handshake, Port and IP identification resulting in blocking or obstructing, time outs due to filtering devices, reset packets sent by ISP or firewall or device in the middle, or other threats.

If the Info Exchange C-5 is successful, the Build Tunnel C-6 step will be taken with routes applied and other related actions to enable the tunnel TUN to be securely built between Client 11D01 and Server 11D02.

Tunnel UP 11S4 describes the period during normal flow of traffic through a tunnel. It is essential to convey information between devices and there exists a need on SRV_CNTRL 11D00 to manage unique info for various Client 11D01 and Server 11D02 devices, as well as for multiple tunnels to be built between them.

The exchange of information between devices has to be a regular occurrence as there exists a recurring need to make fresh, new dynamic tunnels. Some ports on an IP address may be blocked or become blocked and simply changing the port for that IP address will allow the tunnel to be built and for data to flow. Furthermore, each tunnel needs one or more unique ports per IP Address to avoid collisions between tunnels. When a Client 11D01 device requests new tunnel information to be created, a random port number is generated and the port availability for that specific IP address on the target Server 11D02 is checked against two or more factors including; if that port is already in use by an existing tunnel (either an operational one or one on standby which could be made operational), and if that port has been used by that specific Client 11D01/Server 11D02 peer pair in the past and if it has been blocked. In both cases, a new random number will be generated. There are 65,536 ports available per IP address with a certain number reserved for specific services. A floor for example of 5,500 would leave available 60,036 ports which could be used by the random number generator with a min of 5001 and max of 65536. When a tunnel is dismantled and the port is marked as blocked for a peer pair, it is made available to other peer pairs to utilize. This freeing up of ports is necessary to avoid exhaustion of ports. Therefore, the tracking of IP and Port combinations by SRV_CNTRL 11D00 is essential.

A tunnel can help with its own establishment through steps, but it also has limitations. While secure, most tunnels are visible during establishment. The handshake and signature of what kind of tunnel it is may be visible during operation. Manually set keys are cumbersome and not often changed and if used for too long, the risk that they can be broken increases; therefore, keys should be re-keyed with new ones on a frequent basis.

Automated systems need to ensure that information such as new keys, ports to IP Addresses and other info can be created and that this information is available to both sides of the peer pair so that tunnels can be built and rebuilt. Both sides have to be configured & ready to be able to build tunnels. Therefore, the exchange of info between peer pairs needs to be secure or integrity of the security of the tunnel itself is compromised.

While tunnel is up and pushing traffic, operational threats C-7 exist. The tunnel signature may be visible (e.g. if the tunnel is sniff-able and not obfuscated). The structure of the tunnel may be known if type of tunnel is able to be discovered. This risks the stream of packets being grabbed and brute force key breaking being used to decrypt the contents of the tunnel. Or a reset signal can break tunnel if the reset code or other tunnel control codes are known. Therefore, to maintain tunnel security and integrity between Client 11D01 and Server 11D02 devices in a peer pair, the updating and sharing of information needs to be automated and secure.

The GVN structure allows devices to be enabled for automated secure tunnel establishment between peer pairs based on most current information. A combination of security features and methodologies offer self-reinforcing protections.

Figure 12:
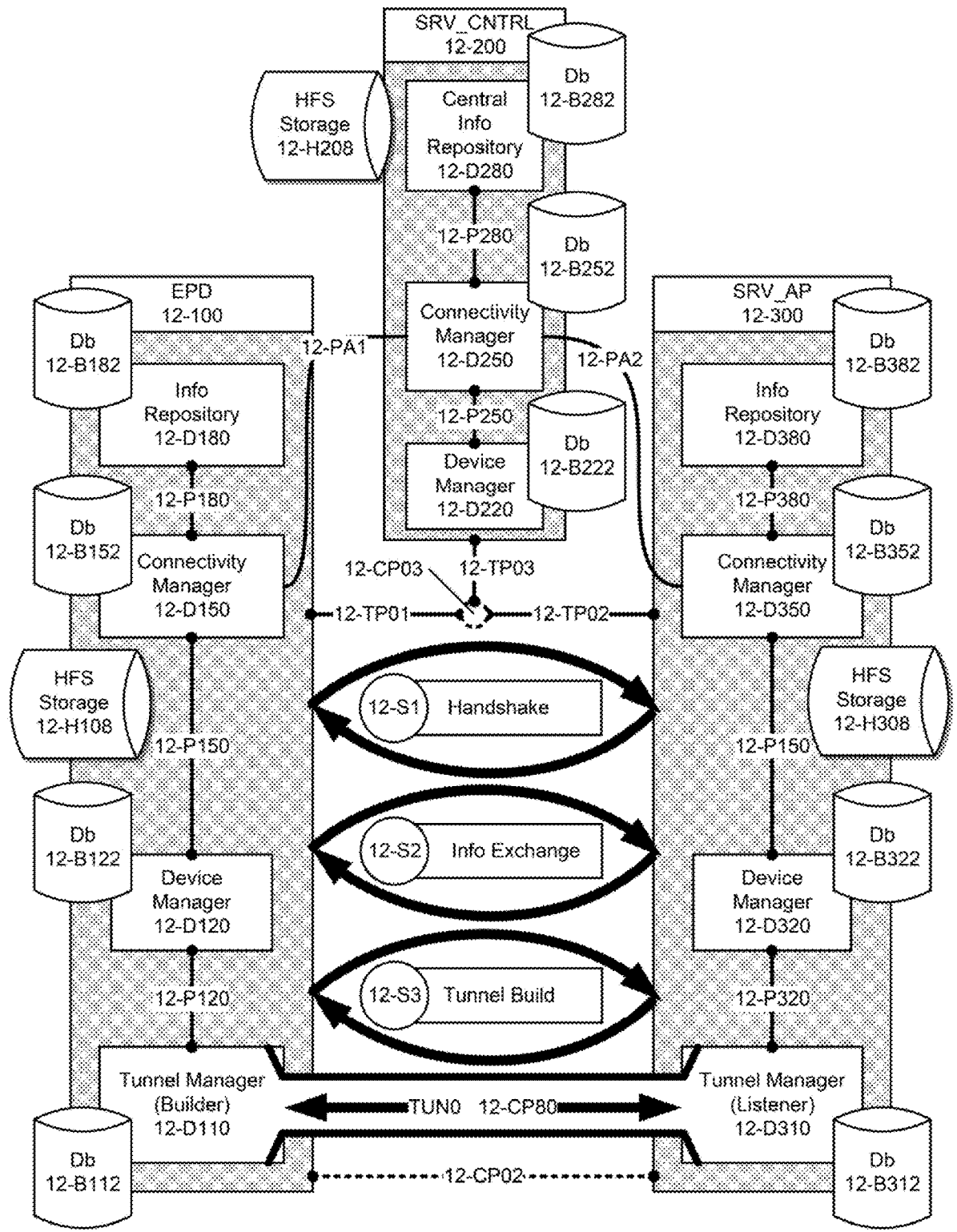
FIG. 12 illustrates, in accordance with certain embodiments of the disclosed subject matter, a process of building a tunnel.

FIG. 12 illustrates, in accordance with certain embodiments of the disclosed subject matter, a process of building a tunnel. The example shown in FIG. 12 demonstrates managers, modules, processes, databases (Db), storage devices (HFS), paths and other features for the communication between three pertinent players in the tunnel building and managing process.

In this example, a single tunnel TUN0 12-CP80 is built between an end point device (EPD) 12-100 and an access point server (SRV_AP) 12-300. The tunnel is initiated by the Tunnel Manager (Builder) 12-D110 on the EPD 12-100. It "dials" a specific point on an IP address which is being listened to by the Tunnel Manager (Listener) 12-D310 on the SRV_AP 12-300.

The three main steps between the builder and the listener are the handshake (12-S1), the information exchange (12-S2) and the tunnel build process (12-S3).

There are also other communications paths described such as path 12-CP02 which could be a direct SSH or equivalent type of direct device-to-device communication.

An API path 12-PA1 between EPD 12-100 and a central control server (SRV_CNTRL) 12-200 and another API path 12-PA2 between SRV_AP 12-300 and SRV_CNTRL 12-200 can be utilized to securely share information about the tunnel, about the peers EPD 12-100 and SRV_AP 300, or other related information via SRV_CNTRL 12-200.

Within each device, the Tunnel Managers collaborate with other modules and managers such as Device Manager 12-D120 and 12-D320, as well as others.

Paths 12-TP01 to 12-TP02 between EPD 12-100 and SRV_AP 12-300 can represent another dedicated tunnel for information exchange in addition to the tunnel for data traffic TUN0 12-CP80.

Figure 13:
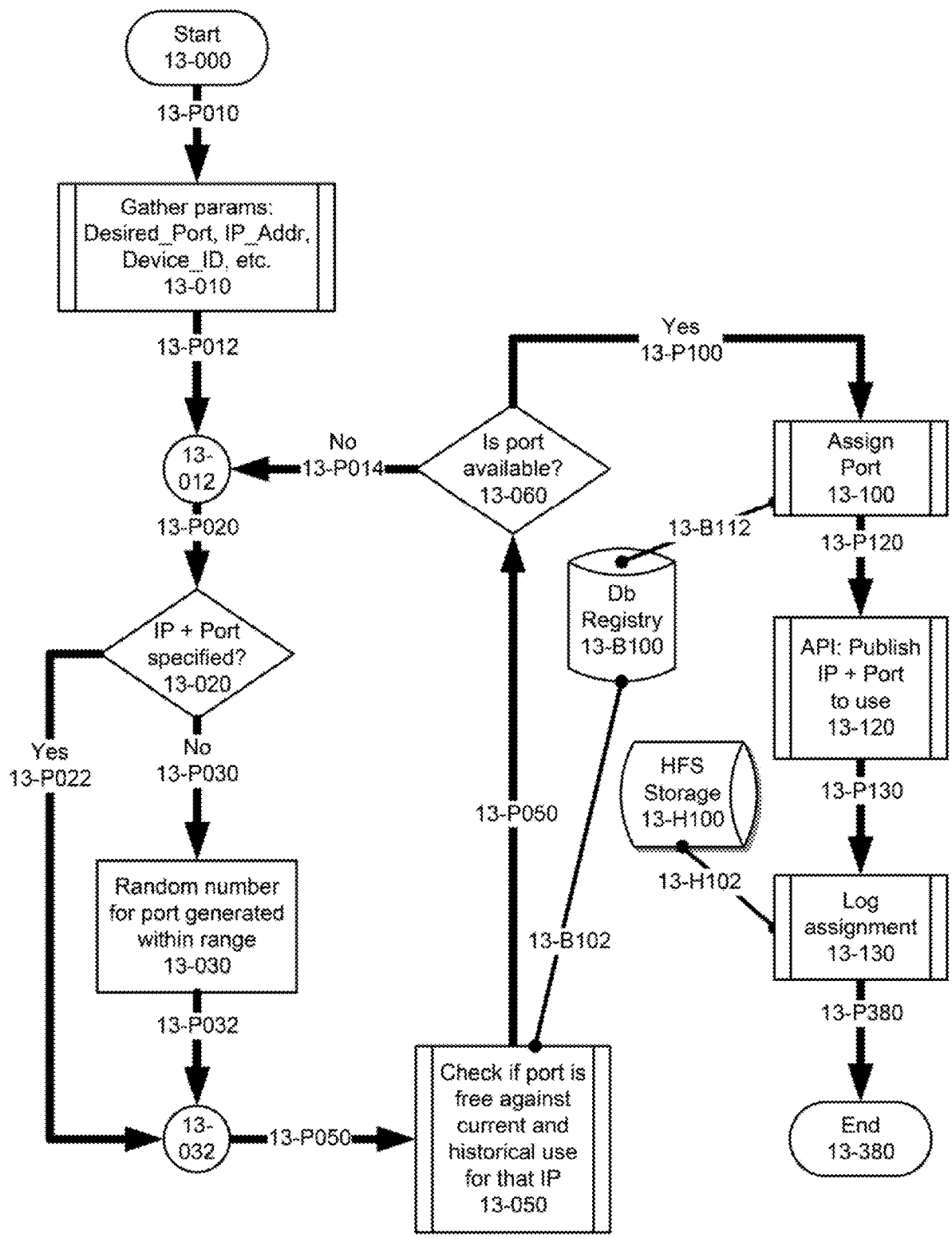
FIG. 13 is a flowchart illustrating the logic used to assign a port to an IP address used to build a tunnel in accordance with certain embodiments of the disclosed subject matter.

FIG. 13 is a flowchart illustrating the logic used to assign a port to an IP address used to build a tunnel in accordance with certain embodiments of the disclosed subject matter. The flow takes into account various factors when selecting the port and IP address to use.

The first step is to gather parameters 13-010 for the port to IP address assignment by checking to see if desired port and IP_Addrress have been specified to be used by a specific device by its Device_ID, and other factors. The parameters also delineate a floor value and a roof value for port number, and more governing settings.

The "logic gate IP+ Port specified? 13-020" step checks to see if there is a request for a specific port attached to a specific IP address for a server device by Device_IP.

If the port and IP address have been specified, then the availability for their use is accepted and logic follows path Yes 13-P022. If a preferential port and IP are not specified, then logic follows path No 13-P030 to random number generator for a random port to be generated within range 13-030.

A lookup is done at step 13-050 to check against current and historical use (via path 13-B102 to Db Registry 13-B100) for that port to IP address mapping to see if the port is free or if it is currently in use. A secondary check is done by looking at historical use to see if it indicates if that port and IP combination has been used in the past by this device or other devices, and if so, if that use proved to be relatively problematic. Some unstable or unreliable ports due to filtering or congestion through devices or other reasons can be marked as being problematic. If there is also a trend for blocking of problematic ports for other devices, then the port to IP address combination can be marked as unavailable.

If the port is not available at step 13-060, the process of generating a port to IP address mapping is restarted via junction point 13-012.

If the port is available, then the port to IP address will be assigned for use at step 13-100. This assignment will be saved in the Db registry 13-B100 via path 13-B112. Next, the Port to IP Address assignment is published via an API call 13-120 so that relevant devices know about the availability status of the port. The last step is to log the assignment 13-130 of port to IP address including the logic used and other factors which could assist in improving the efficiency of future port assignments.

Figure 14:
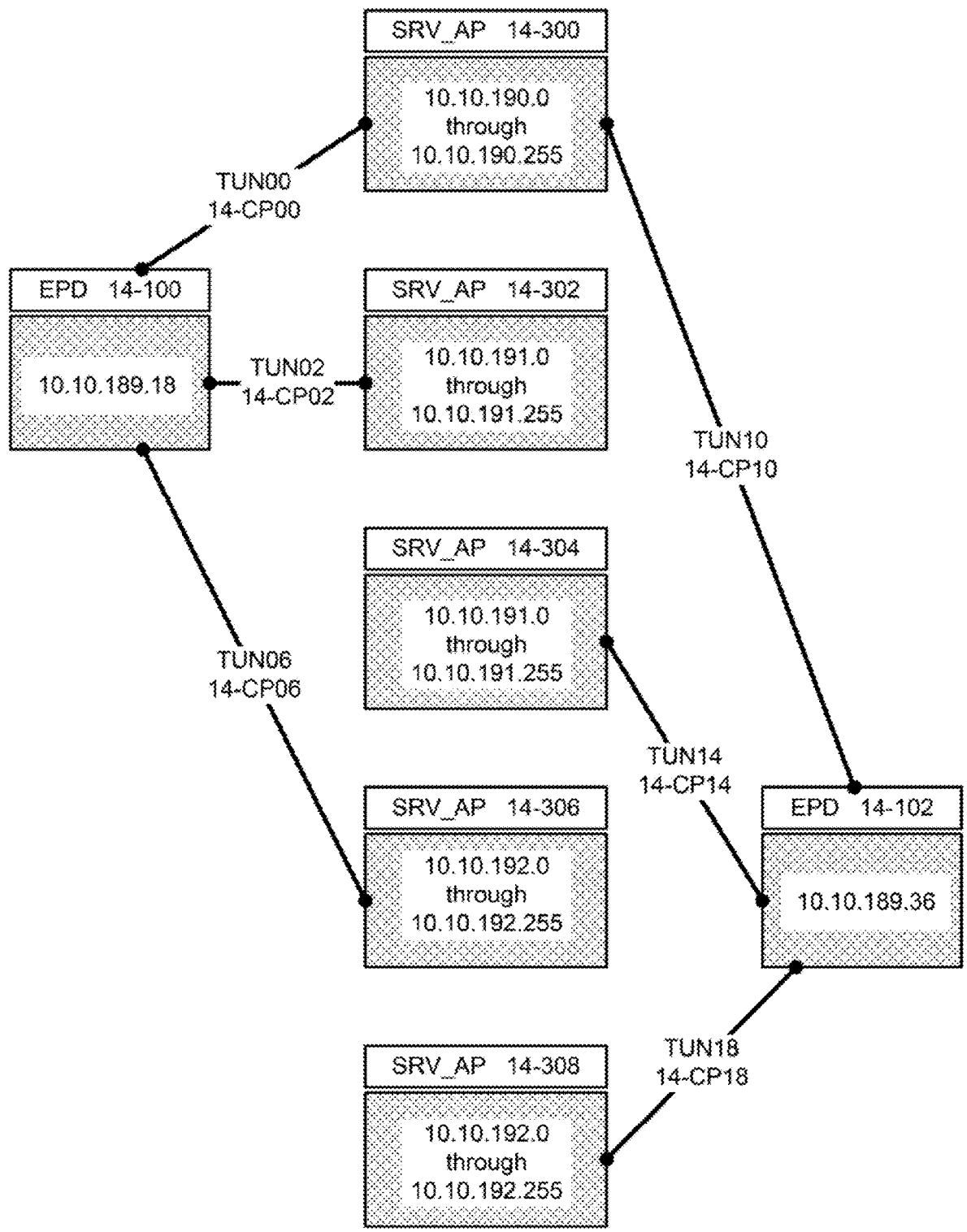
FIG. 14 illustrates, in accordance with certain embodiments of the disclosed subject matter, the importance of a server availability list and how IP addresses and ranges are assigned for various devices.

FIG. 14 illustrates, in accordance with certain embodiments of the disclosed subject matter, the importance of a server availability list and how IP addresses and ranges are assigned for various devices. Although IPv6 offers a huge range of possible IP addresses, the IPv4 standard has a finite amount of both public and private IP addresses. This has an influence on which EPDs can connect with which SRV_APs.

In this figure, EPD 14-100 builds tunnels with SRV_APs 14-300, 14-302 and 14-306. EPD 14-102 builds tunnels with SRV_APs 14-300, 14-304, and 14-308.

This example demonstrates how the internal IP range 10.10.191.0 through 10.10.191.255 can be used on two SRV_APs 14-302 and 14-304, and IP range 10.10.192.0 through 10.10.192.255 can be used on both SRV_AP 14-306 and 14-308.

Therefore, for example, 10.10.191.18 can be used by EPD 14-100 to build a tunnel to SVR_AP 14-302 and at the same time 10.10.191.18 can also be used by EPD 14-102 to connect with SRV_AP 14-304.

EPD 14-100 and EPD 14-102 do not have to directly interact with each other to avoid conflicts because the server availability list published for each EPD in coordination with the TUN manager will assign IP address (internal and external) combinations for EPDs to connect with SRV_APs without any conflicts.

Figure 15:
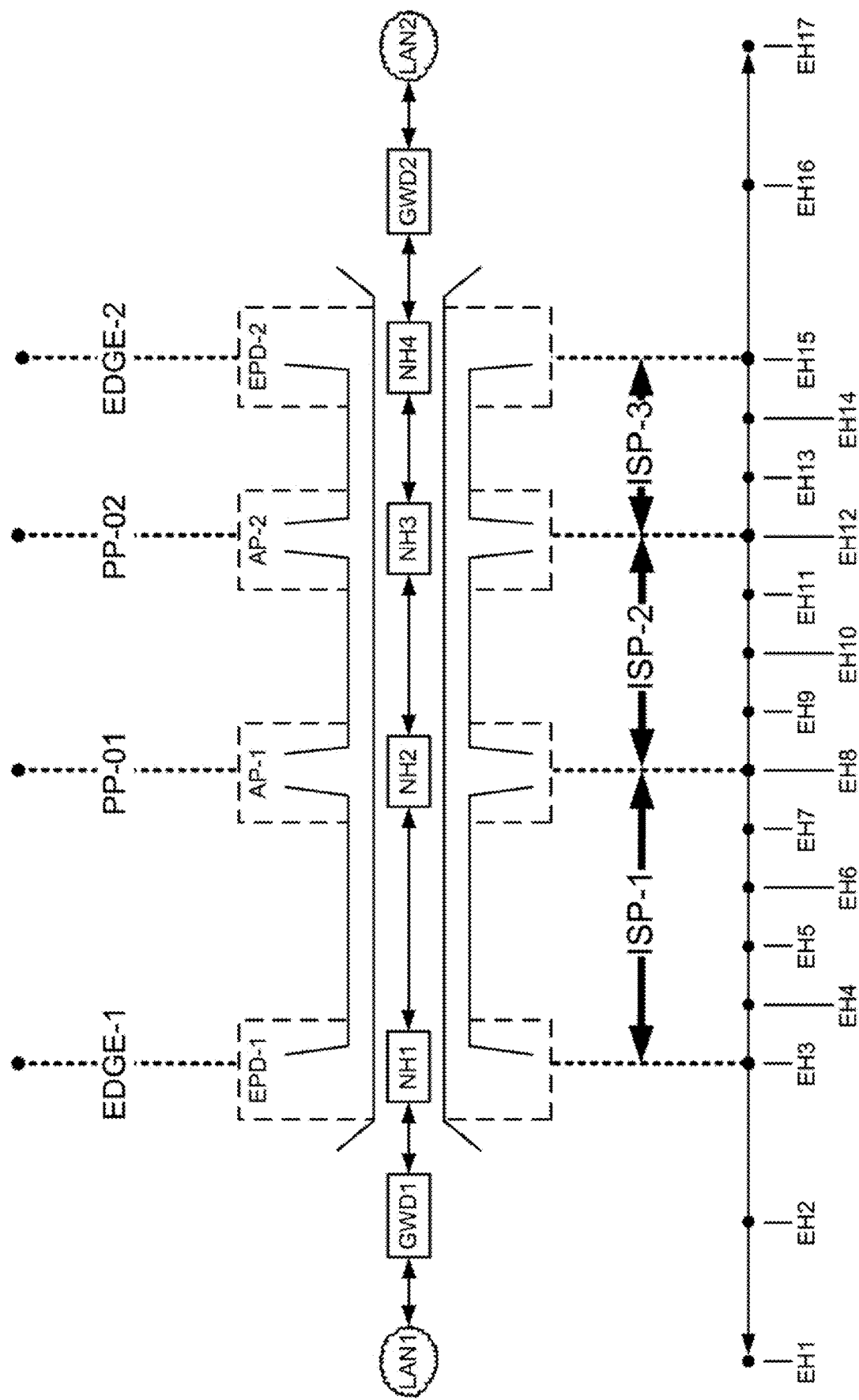
FIG. 15 illustrates, in accordance with certain embodiments of the disclosed subject matter, elements of a GVN Tunnel from LAN to EPD to SRV_AP to SRV_AP to EPD to LAN, including peering points between internet service providers (ISPs) and network edges.

FIG. 15 illustrates, in accordance with certain embodiments of the disclosed subject matter, elements of a GVN Tunnel from LAN to EPD to SRV_AP to SRV_AP to EPD to LAN, including peering points peering points between ISPs and network edges. This illustrates an end-to-end GVN tunnel(s) between edges of two LANs via two SRV_APs and it also further illustrates more information about different Internet Service Providers (ISP) carrying traffic over certain portions of the Internet between EH-3 and EH-15.

EDGE-1 is the demarcation point for network access connection between the devices of LAN-1 and the POP of ISP-1. PP-01 is the point where peering occurs between the ISP-1 and ISP-2 networks. PP-02 is the point where peering occurs between the networks of ISP-2 and ISP-3. EDGE-2 is the demarcation point for network access connection between devices of LAN-2 and the POP of ISP-3.

Some advantages can be realized by placing SRV_AP AP-1 at PP-01 so that this SRV_AP AP-1 directly can peer with both ISP-1 and ISP-2. More advantages can be realized by placing SRV_AP AP-2 at PP-02 so that this SRV_AP AP-2 can directly peer with both ISP-2 and ISP-3. If the network of ISP-2 is not ideal, it is possible for traffic to be alternatively routed around ISP-2 by the GVN through another route or line or ISP or carrier.

The hop count through the neutral Third Layer of the GVN is eight. The distance between ISPs is not to scale. Furthermore, it is likely that there could be more hops within the network of an ISP but for simplicity sake, the quantity illustrated has been limited.

Figure 16:
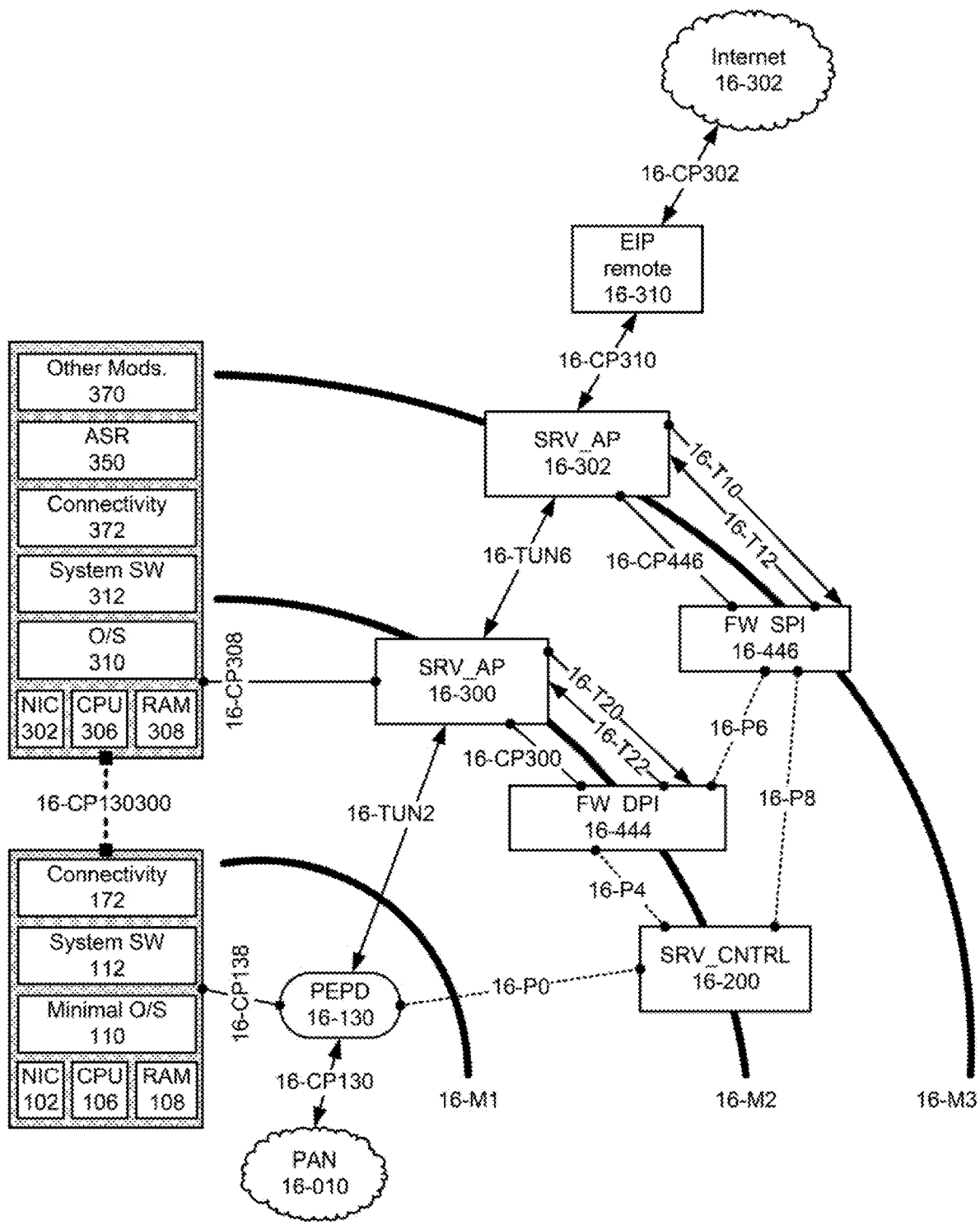
FIG. 16 illustrates, in accordance with certain embodiments of the disclosed subject matter, a multi-perimeter firewall (MPFW) in the cloud supporting a personal end point device.

FIG. 16 illustrates, in accordance with certain embodiments of the disclosed subject matter, a multi-perimeter firewall (MPFW) in the cloud supporting a personal end point device. This figure shows portable devices which would hook into the GVN from a mobile location and where 16-M1 boundary is the edge between a personal area network (PAN) 16-010 and the GVN.

This figure shows the topology of a personal end point device (PEPD) 16-130 with some of its connectivity and other functionality distributed in the cloud. This figure further describes firewall operations distributed into the cloud along with those other operations performed in the cloud on behalf of a local device such as a personal end point device (PEPD) 16-130. Where a PEDP 16-130 is a less powerful and more portable device than an end point device (EPD), it can still take advantage of the personal area network connectivity afforded by a GVN, including features such as advanced smart routing (ASR), multi-perimeter firewalls, and more.

The key point illustrated is that the personal device spreads its need for processing power into the cloud. The modules residing on the PEPD include hardware components for processor CPU 106, memory RAM 108, and network interface NIC 102. The operating system is a minimal O/S 110 to provide a platform for system software System SW 112 and a Connectivity 172 module. This basic configuration is enough to allow the PEPD 16-130 to build a tunnel 16-TUN2 between itself and an access point server SRV_AP 16-300.

The component parts at the SRV_AP 16-300 hardware components for processor CPU 306, memory RAM 308, and network interface NIC 302. The operating system O/S 310 is a more extensive install than O/S 110. O/S 310 provides a platform for system software System SW 312 and a Connectivity 372 module for the SRV_AP 16-300. Advanced smart routing (ASR) 350 module and other modules 370 offer functionality both to the SRV_AP 16-300 and to the connected PEPD-16-130.

The PEPD 16-130 may be dependent on the tunnel 16-TUN2 to be up and able to carry traffic to realize cloud based ASR, FW and other operational functionality.

Figure 17:
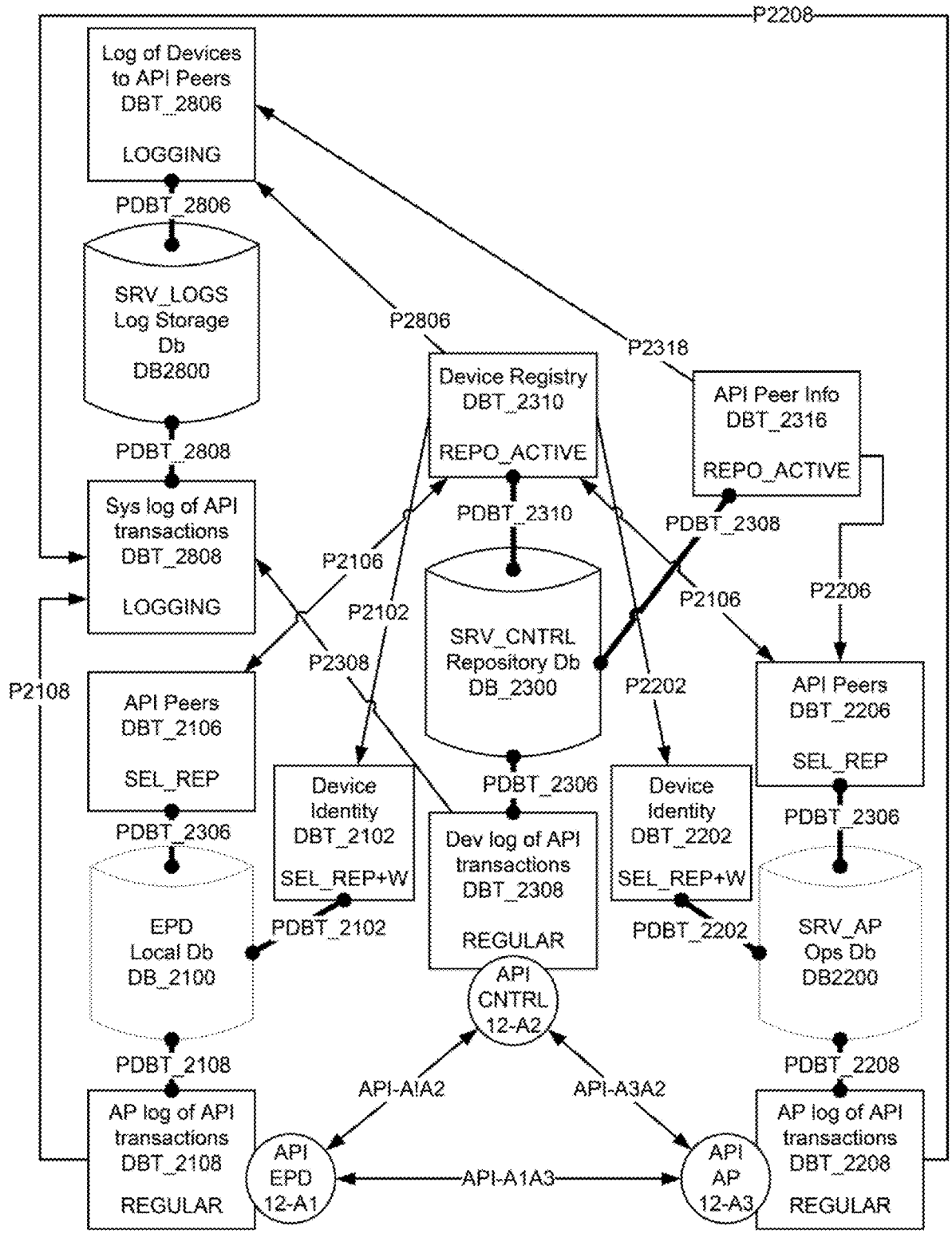
FIG. 17 illustrates, in accordance with certain embodiments of the disclosed subject matter, how tables on the databases of various GVN devices are related to each other and in which way they interact.

FIG. 17 illustrates, in accordance with certain embodiments of the disclosed subject matter, how tables on the databases of various GVN devices are related to each other and in which way they interact. For example, the repository database DB_2300 on the SRV_CNTRL has various tables on it related to devices and the interaction between devices via the neutral API mechanism (NAPIM) of the GVN. Tables such as Device Registry DBT_2310 in database DB_2300 is designated as REPO_ACTIVE which means that it receives information from many sources, is read/write and is able to be queried as the source of information for selective or full replication to tables such as Device Identity DBT_2102 as a part of the database EPD Local Db DB_2100. This table DBT_2102 has the designation SEL_REP+W which allows for selective replication from DBT_2310 as well as for it to report relevant identity back to the device registry.

The control and release of information is governed by data managers. Database table type designators include REGULAR for normal, read/write tables, as REP_INFO for read only, replicated tables, as SEL_REP read only, partially replicated tables with only related rows, as REPOS_ACTIVE a table combined from all sources on repository for device registry DBT_2310 such as identities. Other possibilities include LOGGING from source tables to be combined on the database DB2800 on SRV_LOGS. These designations for tables are for example only and may be different in real world use and there are many more tables and other types based on use.

Figure 18:
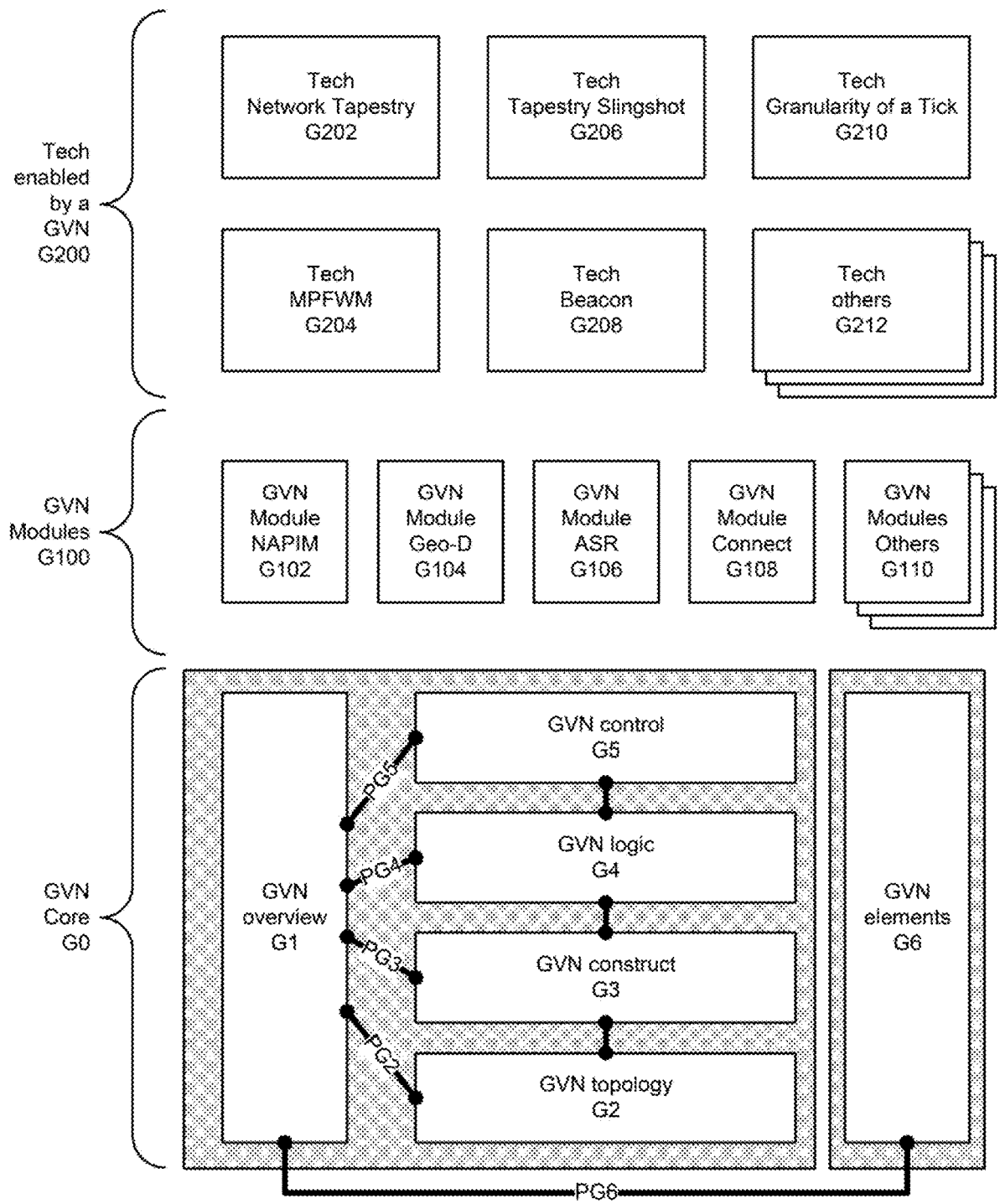
FIG. 18 shows, in accordance with certain embodiments of the disclosed subject matter, a block diagram of technology used by and enabled by a global virtual network ("GVN").

FIG. 18 shows, in accordance with certain embodiments of the disclosed subject matter, a block diagram of technology used by and enabled by a global virtual network ("GVN") including the GVN core elements G0, GVN modules G100, and technology enabled G200 by the global virtual network GVN. The GVN core G0 includes an overview of the mechanism G1 and its constituent component parts of Topology G2, Construct G3, Logic G4, and Control G5 layers. The GVN core G0 also incorporates the relations to and with GVN Elements G6.

The GVN can include plug-in and/or stand-alone GVN modules G100 including but not limited to: Neutral API Mechanism ("NAPIM") G102, described in PCT International Application No. PCT/US16/12178, which is incorporated herein by reference in its entirety; Geodestination ("Geo-D") G104, described in PCT International Application No. PCT/US15/64242, which is incorporated herein by reference in its entirety; Advanced Smart Routing ("ASR") G106, Connect G108, and other modules G110 described in U.S. Provisional Application U.S. 62/151,174, which is incorporated herein by reference in its entirety.

The GVN also provides a platform which can enable other technologies including but not limited to: Network Tapestry G202; MPFWM G204; Network Slingshot G206; Network Beacon G208, Granularity of a tick G210, and other technologies G212. These are described in in U.S. Provisional Application 62/174,394 and U.S. Provisional Application 62/266,060, which are incorporated herein by reference in their entireties.

GVN Modules (G100) and Technology (G200) enabled by GVN can operate on top of an existing GVN, as a component part of a GVN, or can be independent and utilize all or some isolated parts of a GVN to support their own stand-alone operations.

Figure 19:
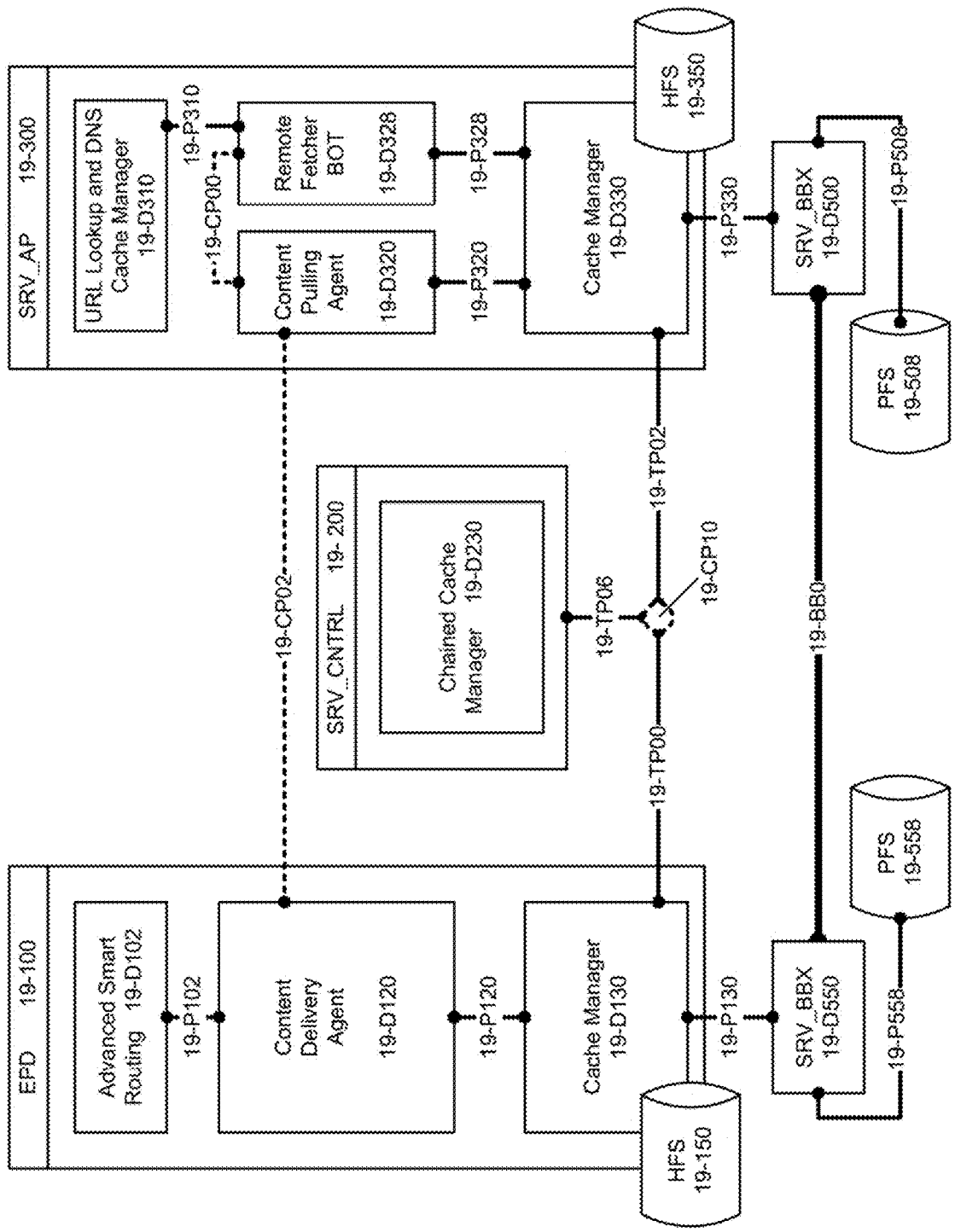
FIG. 19 illustrates, in accordance with certain embodiments of the disclosed subject matter, three devices that work together to provide geographic destination services to a client to optimize the retrieval, transfer, and serving of content from servers located in a remote location.

FIG. 19 illustrates, in accordance with certain embodiments of the disclosed subject matter, three devices that work together to provide geographic destination services to a client to optimize the retrieval, transfer, and serving of content from servers located in a remote location.

The devices are an end point device (EPD) 19-100, an access point server (SRV_AP) 19-300, and in a supporting capacity, a central control server (SRV_CNTRL) 19-200.

A content delivery agent (CDA) 19-D120 operates on the EPD 19-100, and a content pulling agent operates on the SRV-AP_19-300.

The CDA 19-D120 coordinates with the advanced smart routing (ASR) 19-D102 module on the EPD 19-100 as well as with the cache manager 19-D130.

CPA 19-D320 communicates with the URL lookup and DNS cache manager 19-D310 and it directly provides instructions and receives information from the Remote Fetcher BOT (RFBOT) 19-D328, as well as coordinating its actions with the cache manager 19-D330 on the SRV_AP 19-300.

The CPA 19-D320 receives instructions from the CDA 19-D120 to contact a content server to retrieve content from a target server.

Figure 20:
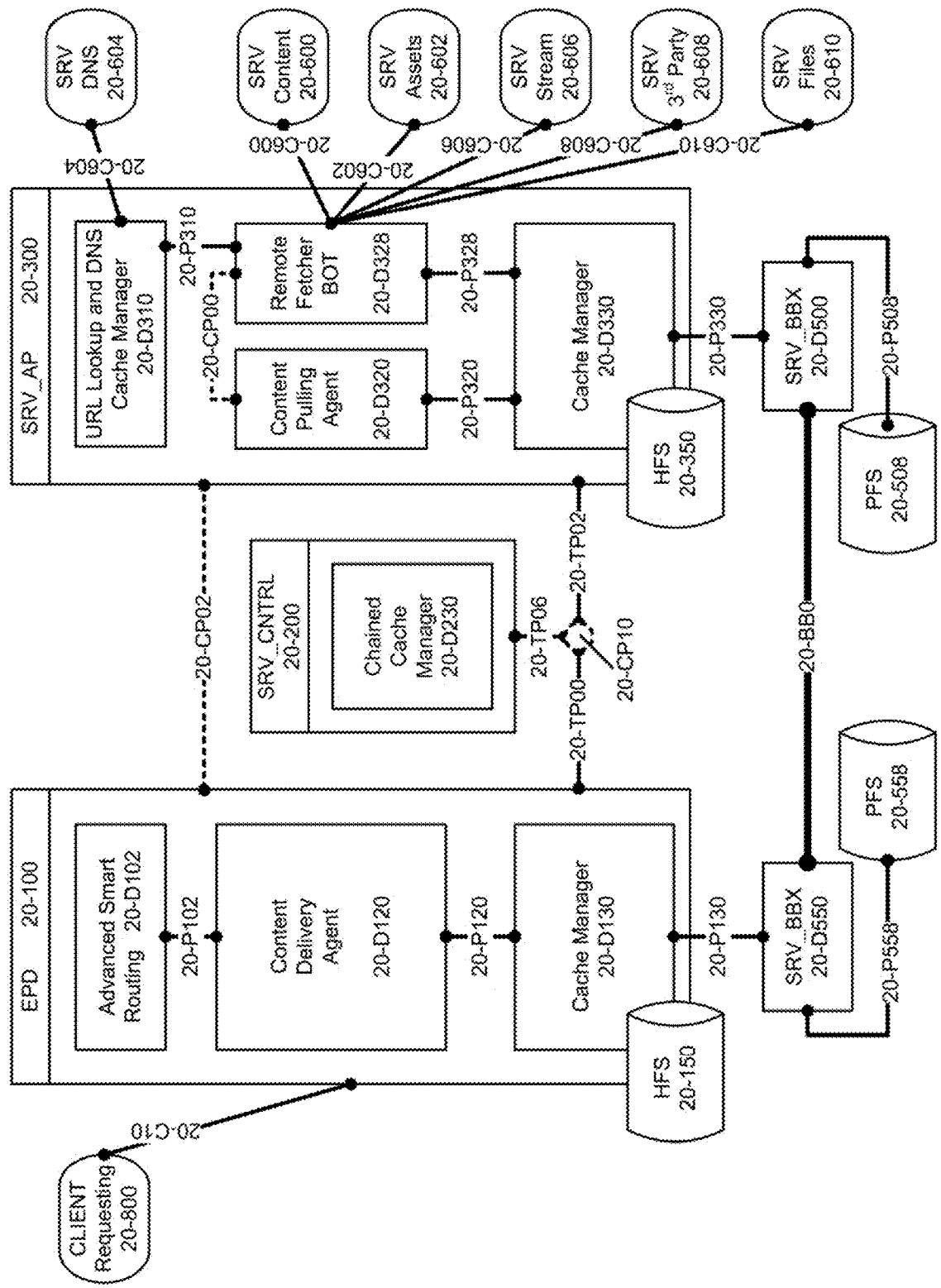
FIG. 20 further illustrates the operation of the three devices described in FIG. 19 in accordance with certain embodiments of the disclosed subject matter.

FIG. 20 further illustrates the operation of the three devices described in FIG. 19 in accordance with certain embodiments of the disclosed subject matter. The three devices, which constitute a geographic destination mechanism, include an end point device (EPD) 20-100, an access point server (SRV_AP) 20-300, and a central control server (SRV_CNTRL) 20-200.

The content pulling agent (CPA) 20-D320 receives instructions from the content delivery agent (CDA) 20-D120 that the Client 20-800 connected to the EPD 20-100 has requested geographic destination fetching and retrieval of content from a content server 20-600 that is located in the region where the SRV_AP 20-300 resides.

The CPA 20-D320 receives the instructions from the CDA 20-D120 to fetch content from a URL. The CPA 20-D320 passes this information to the remote fetcher BOT (RFBOT) 20-D328 to do a lookup of the URL to see if its DNS information is locally cached at 20-D310. If it is cached and the information is not stale, then the cached information is used. If the information is not in the cache, or if it is stale, a fresh lookup will be made to DNS server 20-604. The results will be returned and stored in 20-D310. The RFBOT 20-D328 notifies the CPA 20-D320 that it has successfully obtained DNS information. The CPA 20-D320 instructs the RFBOT 20-D328 to contact the content server 20-600 and it fetches the content file(s) from that server. The RFBOT 20-D328 passes the content to the CPA 20-D320 for parsing to seek for more content links which are embedded in the fetched content. The CPA 20-D320 then collaborates with the URL Lookup and DNS cache manager 20-D310 and as well as with the RFBOT 20-D328 to fetch information about the network coordinates of the server(s) where the other content resides. For examples, an assets server 20-602 may host images, CSS, JavaScript, and other related assets files. Streaming files may be served from streaming specific servers 20-606, files may be served from file servers 20-610, and included content from third parties will be available from their servers 20-608.

Figure 21:
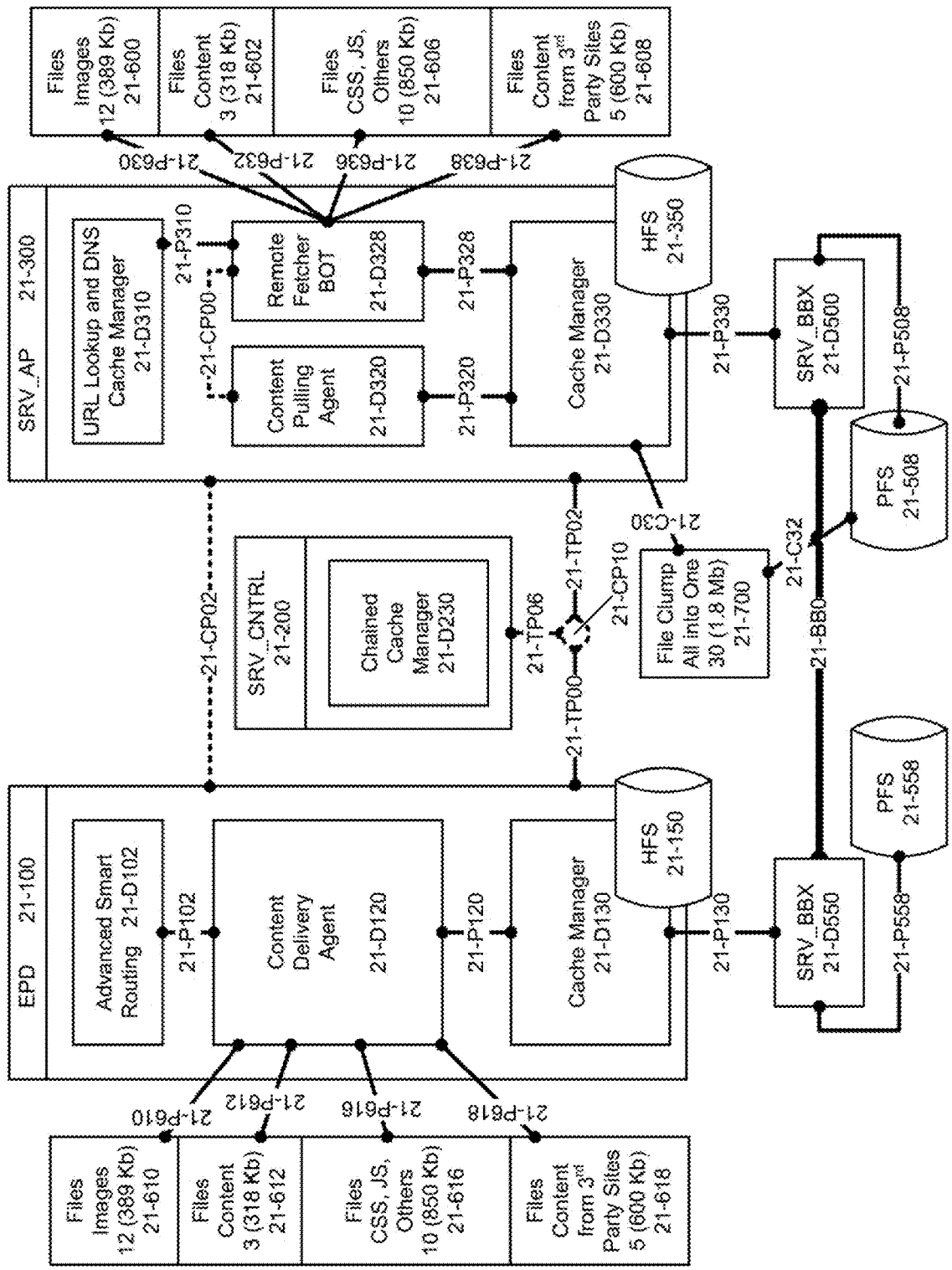
FIG. 21 is an exemplary embodiment which continues to describe the operation of a geographic destination mechanism further explaining the retrieval of a series of files from various types of servers, the clumping together of the retrieved files and the subsequent transmission from the access point server (SRV_AP) to the end point device (EPD).

FIG. 21 is an exemplary embodiment which continues to describe the operation of a geographic destination mechanism further explaining the retrieval of a series of files from various types of servers, the clumping together of the retrieved files and the subsequent transmission from the access point server (SRV_AP) 21-300 to the end point device (EPD) 21-100.

After the content files are successfully retrieved by the RFBOT 21-D328, they are passed to the Cache Manager 21-D330. The information about each file as well as the manifest of all of the files retrieved is analyzed by the content pulling agent (CPA) 21-D320. This information is conveyed to the cache manager 21-D330 as well as to the cache manager 21_D130 on the EPD 21-100.

The manifest of content file information is further shared with the content delivery agent (CDA) 21-120 on the EPD 21-100. The CDA 21-120 communicates with the cache manager 21-130 to expect and receive the clump of files from 21-700 to be de-clumped and individually served from a local host on the EPD 21-100 to serve clients connected and in close proximity to the EPD 21-100.

In many respects, this operates like a reverse of content delivery network.

Figure 22:
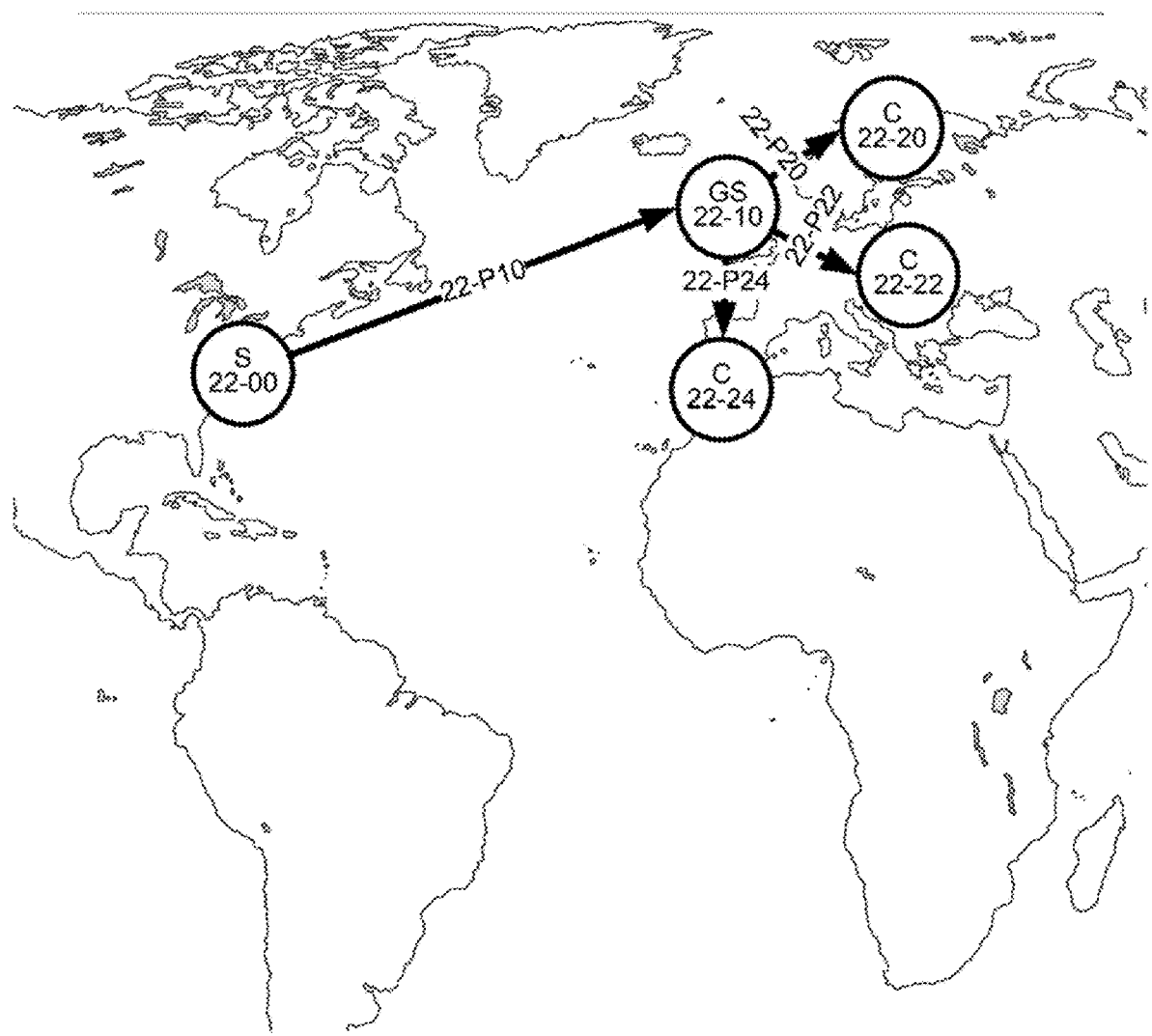
FIG. 22 illustrates the prior art of how geocasting works within a content delivery network (CDN).

FIG. 22 illustrates the prior art of how geocasting works within a content delivery network (CDN) where a server in one region S 22-00 has content like streaming video that clients located in another region such as C 22-20, C 22-22, and/or C 22-24 desire to retrieve said content. There are bandwidth and latency issues that impede the transporting of the information over a long distance from S 22-00 located in one region to the clients in another region.

To mitigate the negative effects, the owner of S 22-00 may set up a geocasting server (GS) such as GS 22-10 to buffer content from S 22-00 or act as a streaming reflector for live streams from S 22-00 to be efficiently served by GS 22-10 to the clients C 22-20, C 22-22, and/or C 22-24.

Figure 23:
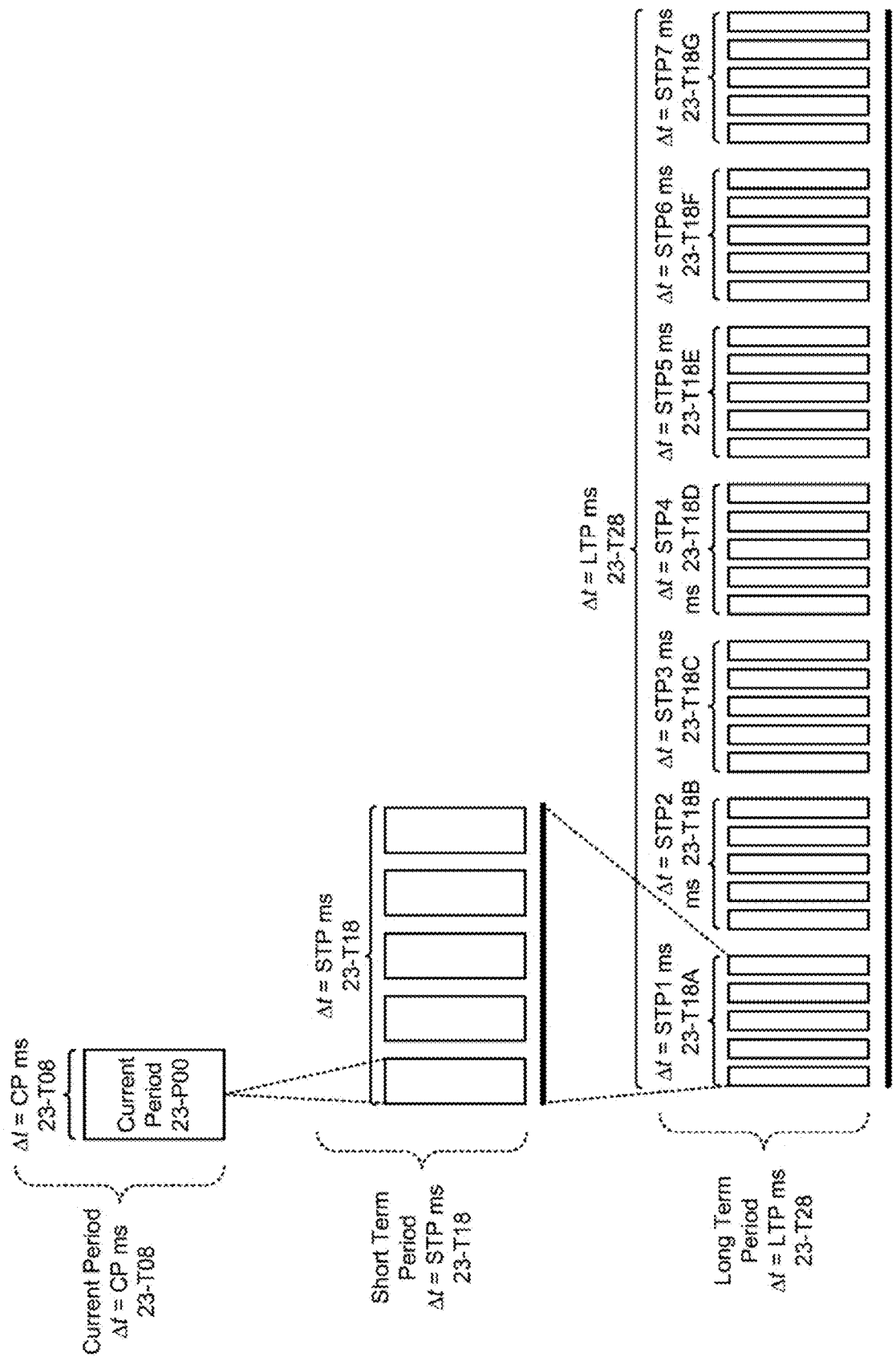
FIG. 23 illustrates the analysis and interpretation of periods of tick cycles.

FIG. 23 illustrates the analysis and interpretation of periods of tick cycles. Artificial intelligence can assist in future calculations to estimate how long the processing and post processing times of a tick will take based on quantities of items to process taking into account system resources and other factors.

Per period calculated metrics with data from current period, short term and long term historical data can be plotted on a standard deviation curve based on the various cyclical trends. Notation of lows, highs, averages and other analysis can indicate whether current performance is in line with expectations or is better, worse, or otherwise different than previous experience.

This data gathering and contextual analysis assists artificial intelligence (AI) algorithms in decision making.

Current period 23-T08 can be compared with short term 23-T18 and long term 23-T28 performance data.

Figure 24:
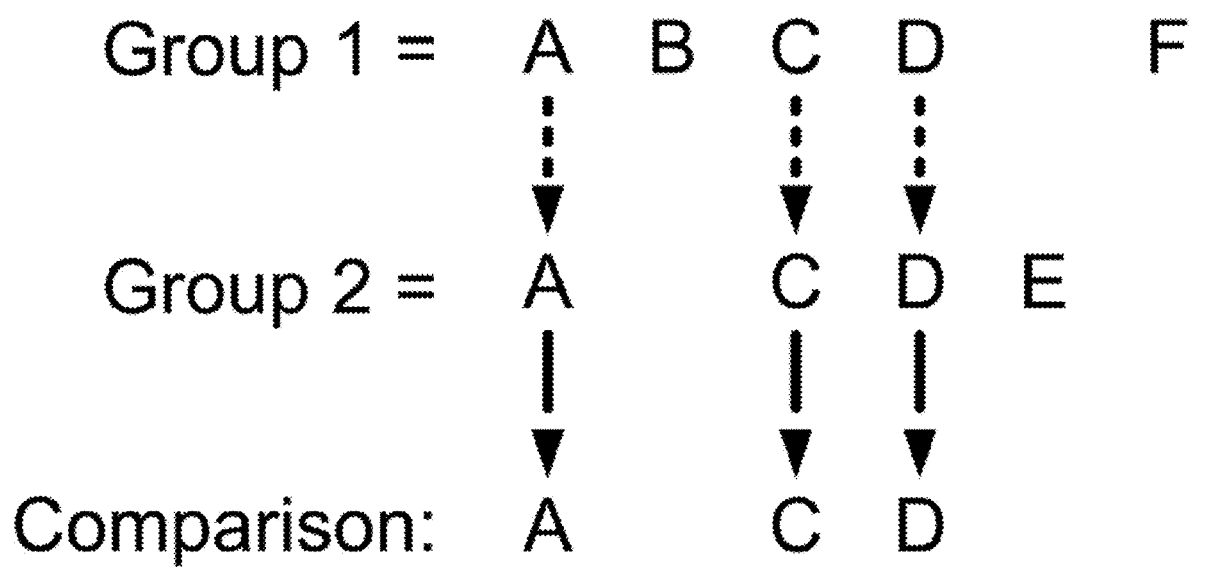

FIG. 24 describes how a description of two different sets of data can provide information when comparing various dissimilar data sets in accordance with certain embodiments of the disclosed subject matter.

A key point is that while Group 1 has A, B, C, D, and F sets of data, Group 2 contains data sets A, C, D, and E. Information from the direct comparison where there is an overlap for sets A, C, and D can provide a contrast or corroboration of characteristics of the sets being compared.

And a comparison of the results of B set against E set may also provide insight into differences and alternatives which could be considered.

An intelligent algorithm which will be presented with different sets of data at different times needs to be able to compare sets which overlap between groups as well as being able to take into account how to analyze sets which are in one group and not in the other group, and to weight this into the results.

Figure 25:
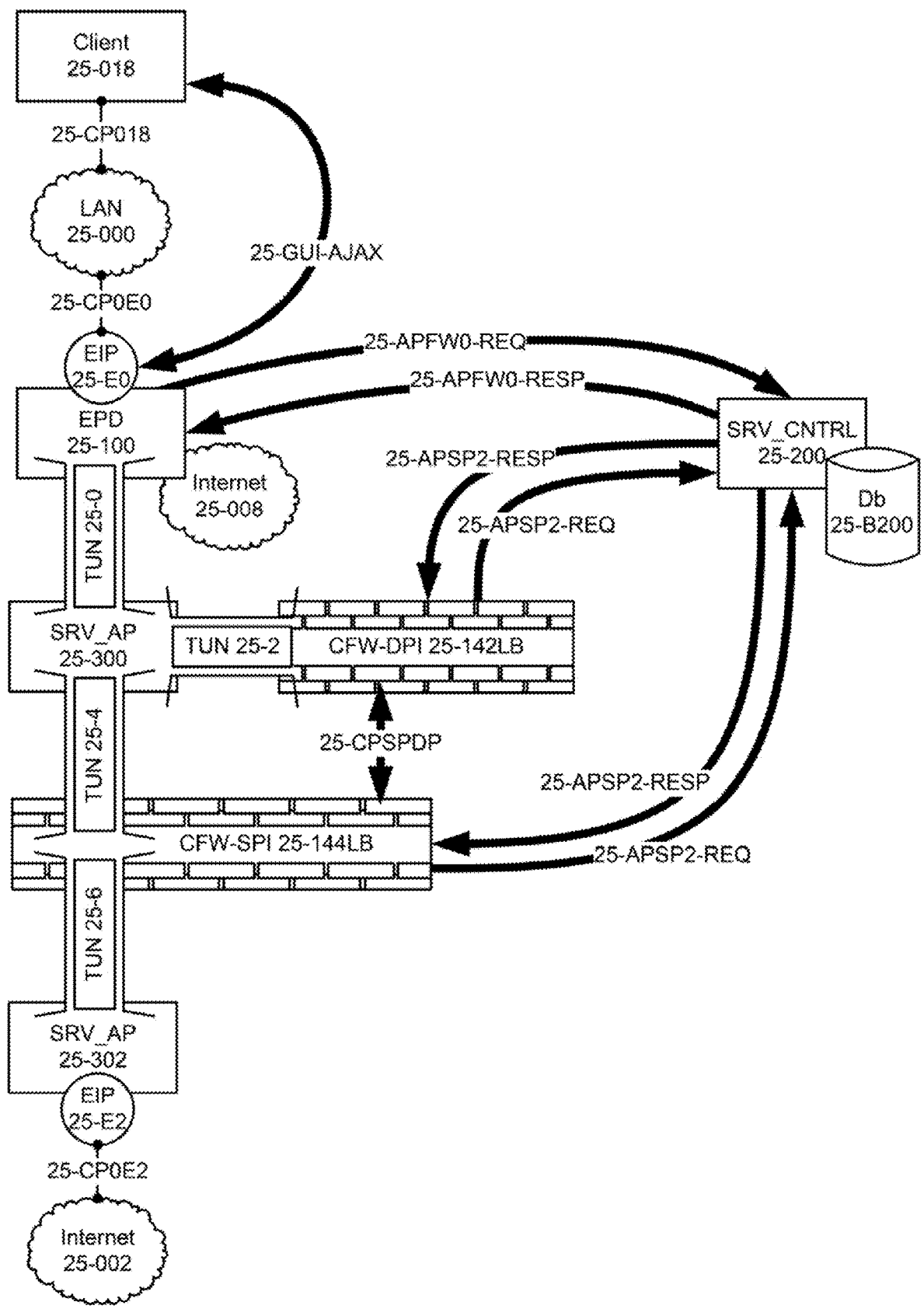
FIG. 25 illustrates, in accordance with certain embodiments of the disclosed subject matter, the integration of a multi-perimeter firewall with other systems in a GVN.

FIG. 25 illustrates, in accordance with certain embodiments of the disclosed subject matter, the integration of a multi-perimeter firewall with other systems in a GVN. Acts of information warfare are always occurring. Whether they are by nation state, by corporate players, hackers, or other actors, these attacks are relentless and according to trends, the threats are increasing. Utilizing the topology described herein, there exists the possibility to integrate information about live attacks which is detected by passive firewalls or other such monitoring middle devices on the internet aggregated and reported by security provider companies or organizations. Whether the nature of the attack is an intrusion, phishing attack, attempt to steal intellectual property, DDOS attack, or other threat known or unknown, the key point is to protect one's network.

FIG. 25 shows request/response (REQ/RESP) API loops between various devices. These information loops can share information that a cloud firewall such as CFW-DPI 25-142 LB or CFW-SPI 25-144 LB learns about traffic flowing through it which is reported to SRV_CNTRL 25-200. The information loops can share information about attacks in other localities by passing information from SRV_CNTRL 25-200 to the cloud firewall such as CFW-DPI 25-142 LB or CFW-SPI 25-144 LB. Furthermore, the information stored in the database Db 25-B200 on SRV_CNTRL 25-200 can also contain heuristic patterns, signatures of known threats, as well as information from global internet monitoring feeds to be shared. Visibility for a human administrator can also be made available from a hosted instance on EPD 25-100 via a graphic user interface (GUI) on the Client 25-018 via path 25-GUI-AJAX.

The flexibility of this information exchange topology also allows for performance monitoring, billing module for cloud-based scalable use of firewall resources, systems administration, and other purposes.

A graphic user interface (GUI) hosted on either the end point device (EPD) 25-100 or on the central control server (SRV_CNTRL) 25-200 can provide information about the operations of the firewalls and also offer point and click control surfaces for users to utilize.

Figure 26:
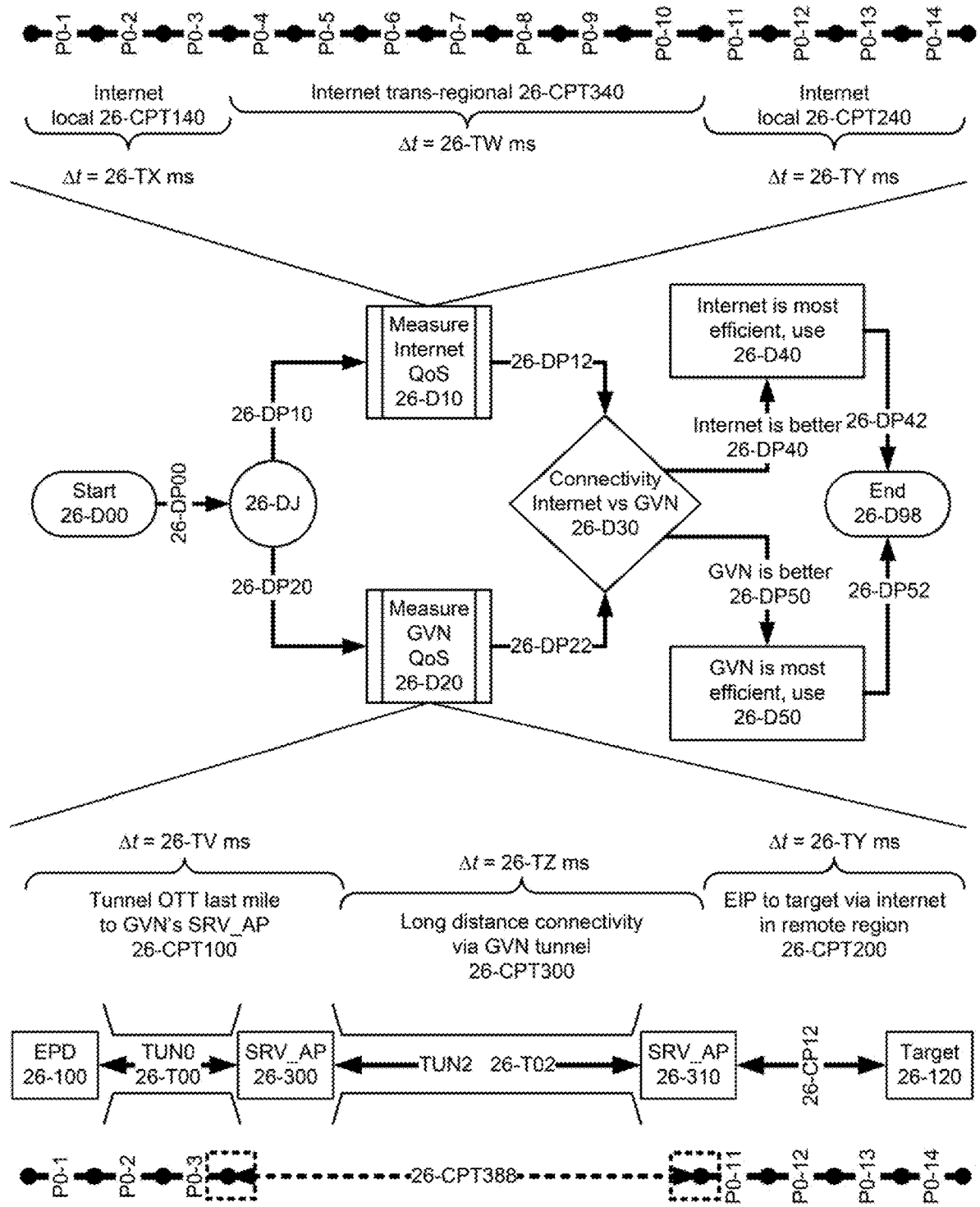
FIG. 26 illustrates, in accordance with certain embodiments of the disclosed subject matter, both paths through the open Internet as well as paths which are a combination of network optimized traffic with a blend of global virtual network (GVN) segments over the top (OTT) of the base Internet and open Internet segments.

FIG. 26 illustrates, in accordance with certain embodiments of the disclosed subject matter, two paths-one through the open Internet as well as another path which is a combination of network optimized traffic via global virtual network (GVN) segments over the top (OTT) of the base Internet combined with open Internet segments.

One path is through the open Internet from hop P0-1 through P0-14 via Internet local 26-CPT140 to Internet trans-regional 26-CPT340 to Internet local 26-CPT240.

The other path is also from hop P0-1 through P0-14 but differs from the previous path as it goes from tunnel OTT last mile to GVN's SRV_AP 26-CPT100 to long distance connectivity via GVN tunnel 26-CPT300 to EIP to target via Internet in remote region 26-CPT200.

Metrics about each block of network segments such as a measure of time Δt=26-TZ ms for long distance connectivity via GVN tunnel 26-CPT300 offer a quantifiable value which can be compared. Algorithmic analysis can compare paths such as starting at 26-D00. One analysis of Measure Internet QoS 26-D10 can look at the end-to-end open Internet path and the other can look at Measure GVN QoS 26-D20. A compare and contrast evaluation is run at Connectivity Internet vs GVN 26-D30.

If the open Internet is better (26-DP40), then that path is used. If the GVN optimized path is better (26-DP50), then that is used. This is only one embodiment for illustration purpose and is not limiting.

Figure 27:
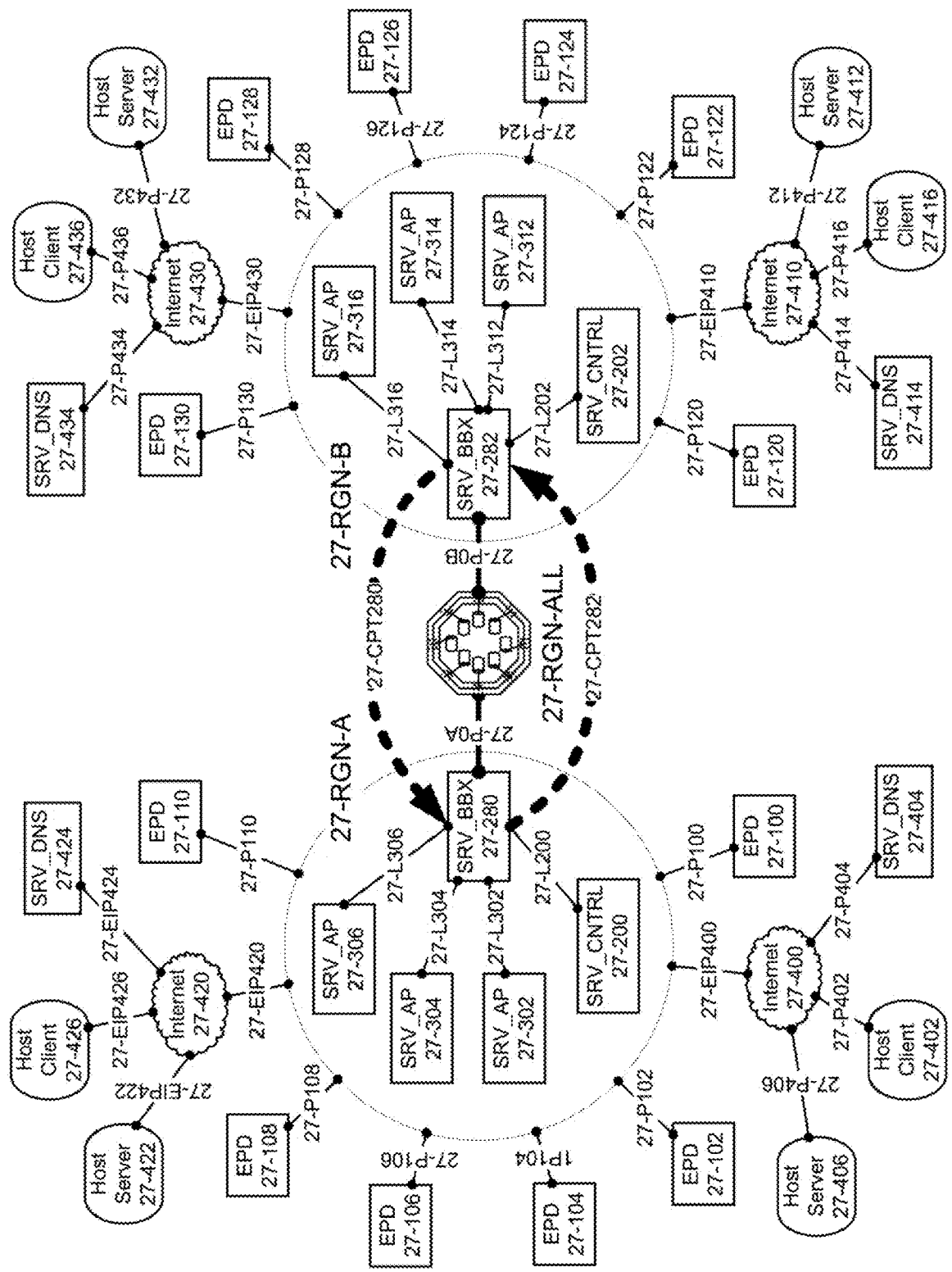
FIG. 27 illustrates a GVN using hub and spoke topology with a backbone and octagon routing in accordance with certain embodiments of the disclosed subject matter.

FIG. 27 illustrates a GVN using hub and spoke topology with a backbone and octagon routing in accordance with certain embodiments of the disclosed subject matter. FIG. 27 shows the network topology of a GVN in two different regions 27-RGN-A and 27-RGN-B and how the regions are connected via paths 27-P0A and 27-P0B through global connectivity 27-RGN-ALL. In addition, FIG. 27 shows the hub & spoke connections in each of the two regions.

SRV_BBX 27-280 and SRV_BBX 27-282 are backbone exchange servers and provide the global connectivity. SRV_BBX may be one or more load-balanced servers in a region serving as global links. Access point servers (SRV_AP) 27-302, 27-304 and 27-306 in 27-17-RGN-A connect to SRV_BBX 27-280. The central, control server (SRV_CNTRL) 27-200 serves all of the devices within that region and it may be one or more multiple master SRV_CNTRL servers. End point devices (EPD) 27-100 through 27-110 will connect with one or more multiple SRV_AP servers through one or more multiple concurrent tunnels.

This figure also shows multiple egress ingress points (EIP) 27-EIP420, 27-EIP400, 27-EIP430, and 27-EIP410 in each region as added spokes to the hub and spoke model with paths to and from the open internet. This topology can offer EPD connections to an EIP in remote regions routed through the GVN. In the alternative, this topology also supports EPD connections to an EIP in the same region, to an EPD in the same region, or to an EPD in a remote region. These connections are securely optimized through the GVN.

Figure 28:
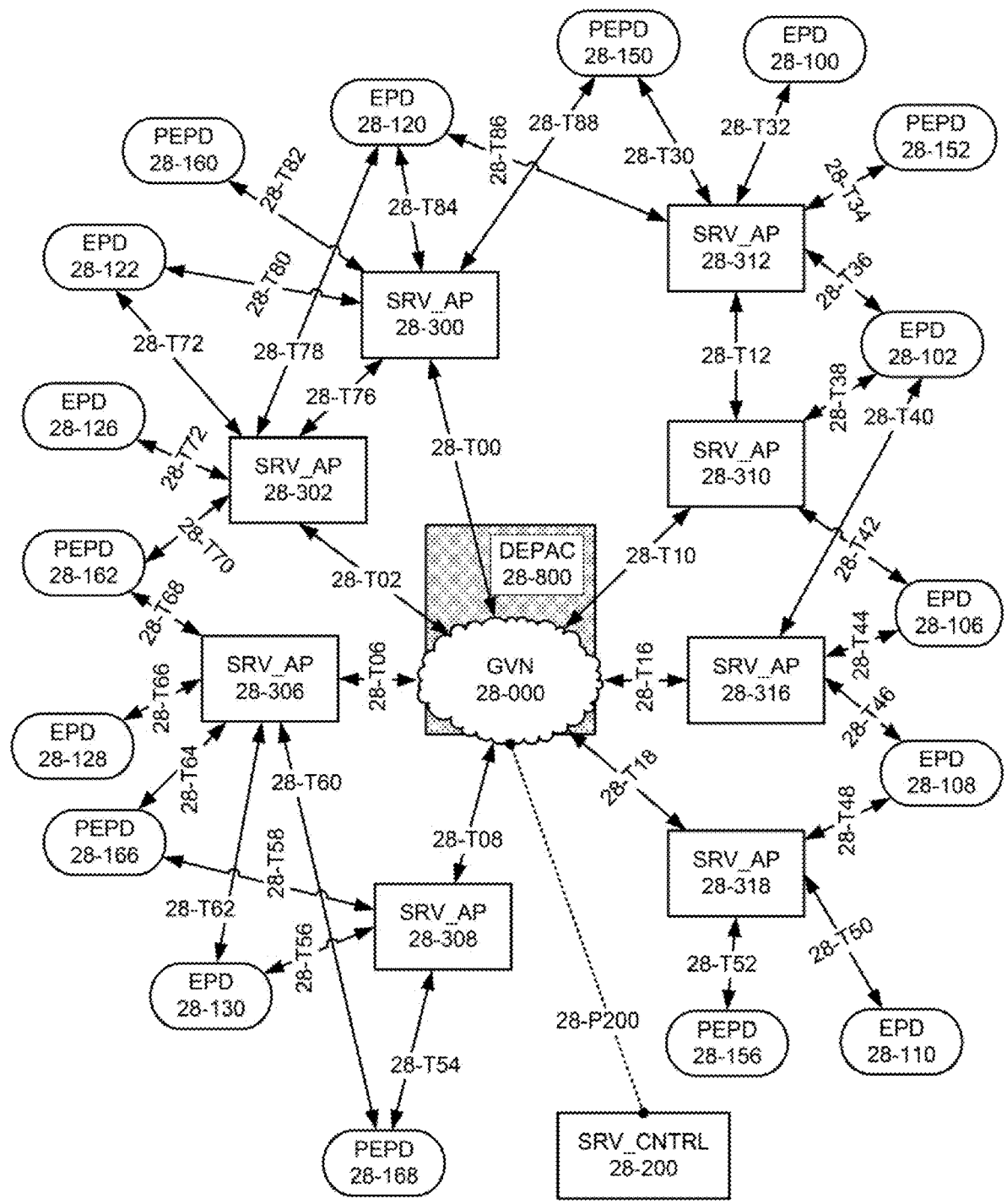
FIG. 28 illustrates, in accordance with certain embodiments of the disclosed subject matter, a distributed end point administrative cluster (DEPAC) which can be virtually constructed within a global virtual network (GVN) or other similar topology.

FIG. 28 illustrates, in accordance with certain embodiments of the disclosed subject matter, a distributed end point administrative cluster (DEPAC) 28-800 which can be virtually constructed within a global virtual network (GVN) 28-000 or other similar topology.

Traffic between devices is carried within encrypted tunnels and these tunnels join devices together into a broader network over the top (OTT) of the base Internet.

There are two types of end points described herein, an end point device (EPD) such as 28-120 behind which is a local area network (LAN) or a portable end point device (PEPD) such as 28-150 behind which is a personal area network (PAN).

Other devices described herein are access point servers (SRV_AP) such as 28-308 and a central control server (SRV_CNTRL) 28-200.

This topology offers security both for traffic through the tunnels as well as by concealing the IP address of the device as its traffic egresses to the Internet via a remote egress ingress point (EIP).

Best and most efficient routing for traffic within a GVN 28-000 can be routed by an advanced smart routing (ASR) mechanism.

Figure 29:
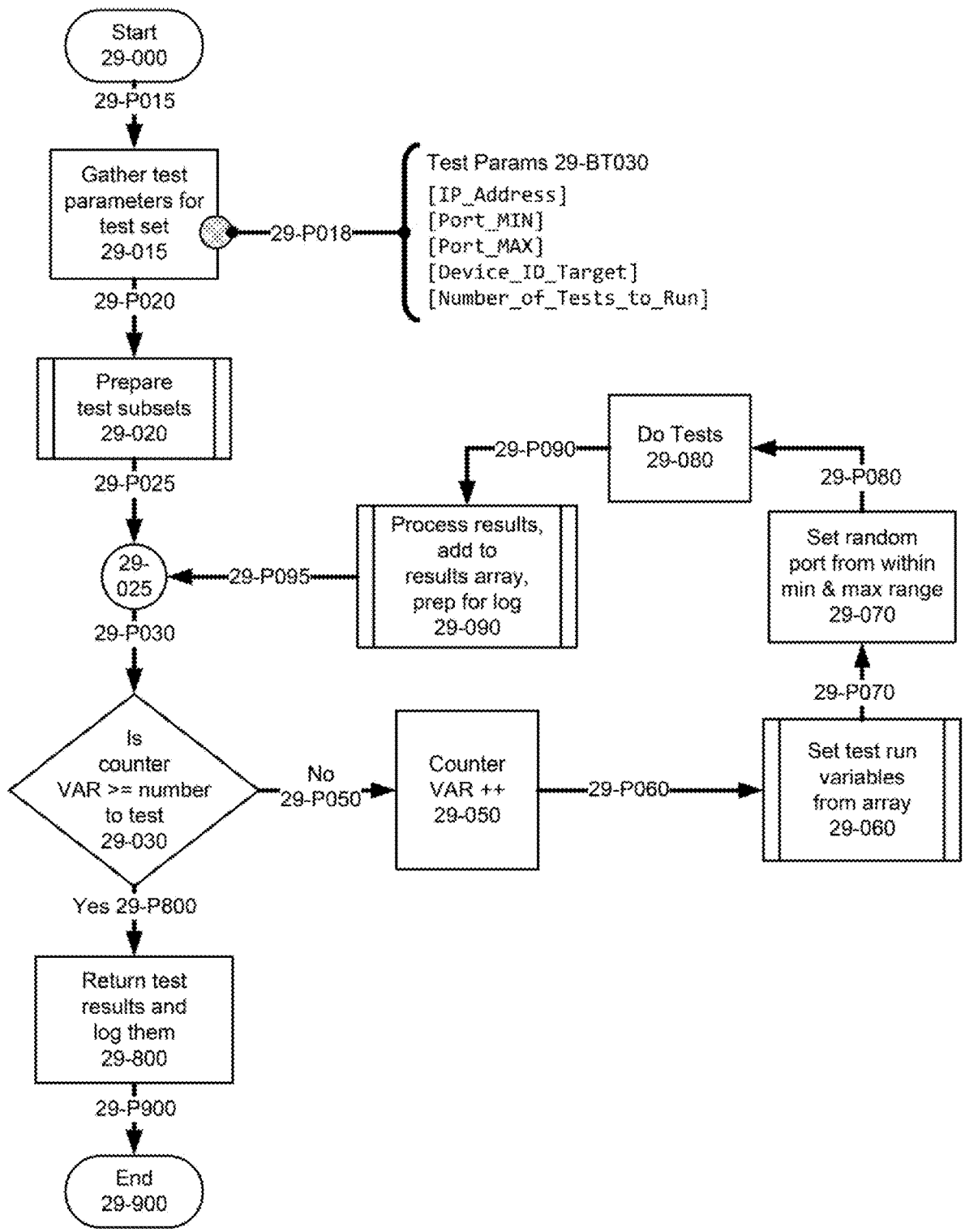
FIG. 29 illustrates the logical construction of a series of tests to be run on the Internet testing various ports and IP addresses in accordance with certain embodiments of the disclosed subject matter.

FIG. 29 illustrates the logical construction of a series of tests to be run on the Internet testing various ports and IP addresses in accordance with certain embodiments of the disclosed subject matter. It allows for a specification of a range of ports to run on a specific IP Address via data array 29-BT030.

A counter keeps track of tests 29-030. The results of each test are saved in an array 29-090 which is then returned and logged at step 29-800.

This algorithm can be used to test inventory of available IP and Ports assigned for production, to test and analyze IP and Port performance to the same access point server (SRV_AP) to compare them. It is useful to look at the results of current tests versus the performance logs of production connectivity both to establish a baseline and to assess whether tests results are within an expected performance range. And also to monitor network connectivity during tests to make sure tests do not affect performance of other connectivity.

Figure 30:
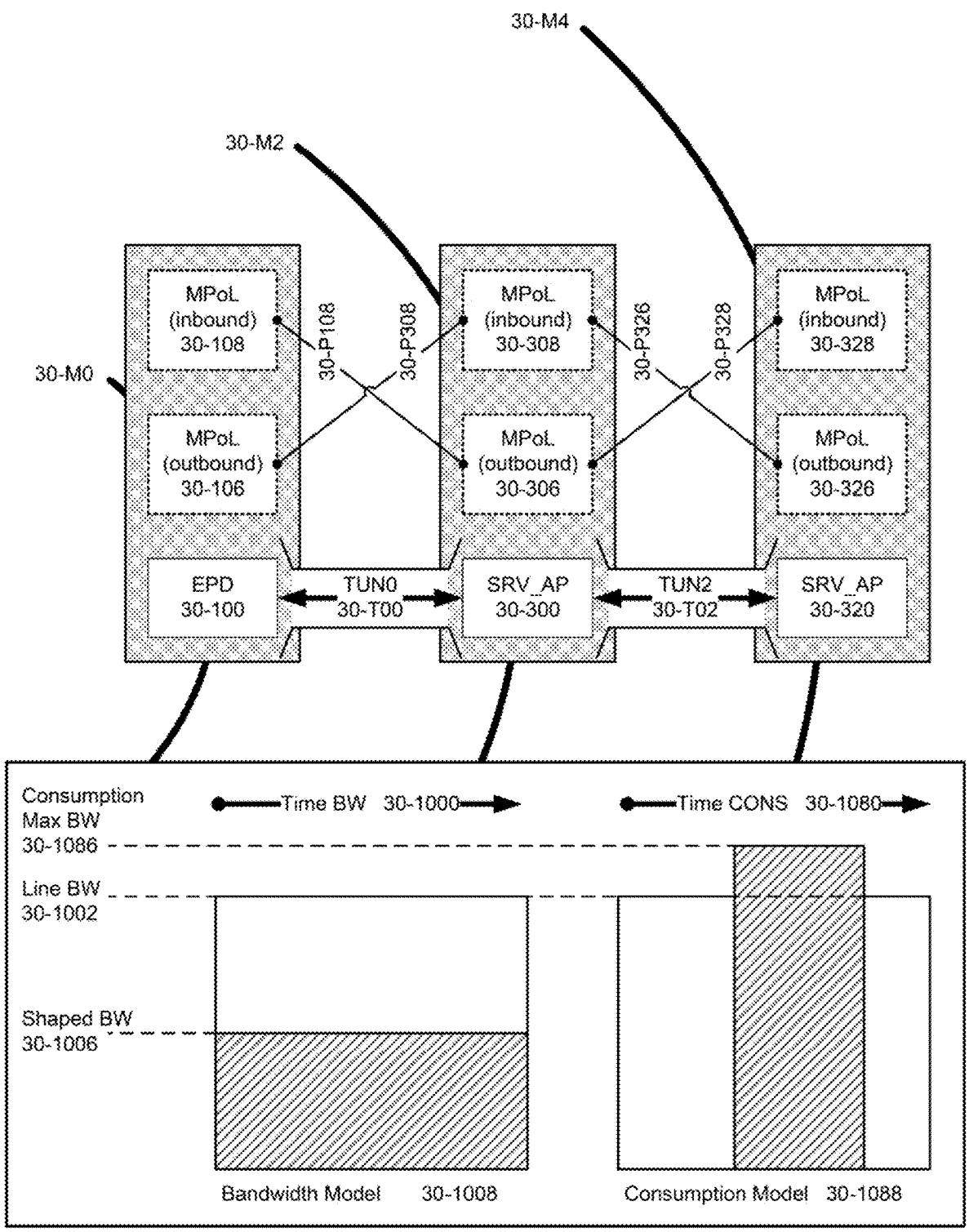
FIG. 30 illustrates a mechanism for logging of connectivity traffic activity between various devices operating in a global virtual network (GVN) or other similar topologies in accordance with certain embodiments of the disclosed subject matter.

FIG. 30 illustrates a mechanism for logging of connectivity traffic activity between various devices operating in a global virtual network (GVN) or other similar topologies in accordance with certain embodiments of the disclosed subject matter. Such devices can include an end point device (EPD) 30-100, and access point servers (SRV_AP) 30-300 and 30-320.

A meter point of logging (MPoL) on network interfaces and virtual interfaces and tunnel interfaces logs both inbound and outbound traffic for each device.

So for example the tunnel TUN0 30-T00 between EPD 30-100 and SRV_AP 30-300 has four such points of logging: on EPD 30-100 MPOL (inbound) 30-108 and MPOL (outbound) 30-106 and on SRV_AP 30-300 MPOL (inbound) 30-308 and MPOL (outbound) 30-306.

There exists a direct relation between the outbound MPOL on one device and the inbound MPOL on the device to which it is connected.

So for example, the outbound MPOL 30-306 on SRV_AP 30-300 measures traffic sent to the EPD 30-100 and the direct correlation via path 30-P108 to the inbound MPOL 30-108. The aggregate totals of traffic sent can be compared to the amount of traffic received on the other end. The amounts should be equal to each other. If the amount received is less than the amount transmitted, then this indicates loss. From a fairness perspective on a consumption billing mechanism, if traffic is billed on the EPD 30-100, it should be based on the traffic received on the inbound MPOL 30-108. Conversely traffic that reaches the SRV_AP 30-300 from the EPD 30-100 should be billed based on the amount received by the inbound MPOL 30-308 on the SRV_AP 30-300.

If a situation exists where the traffic received on an inbound MPOL is greater than the traffic sent its corresponding outbound MPOL, this can indicate either an error or a malfunction or a data injection by a malicious player in the middle.

The difference between a bandwidth (BW) billing model and a consumption (CONS) billing model is that in a Bandwidth Model 30-1008, the traffic may be shaped to an amount which is less than the carrying BW capacity of the line 30-1002. Conversely, in a consumption based model 30-1088, there is no shaping of the BW and the max bandwidth 30-1086 may actually exceed the rated BW carrying capacity of the line 30-1002.

The advantages of a BW model 30-1008 are that unlimited data traffic up to the amount in Mbps of the paid BW tunnel. There is a relatively high cost barrier for this and the actual utilization is usually only during certain hours with wasted capacity at other times.

The advantages of a CONS model 30-1088 are that there is no throttling of a tunnel so it can reach or even exceed the rated BW carrying capacity of the line. This model is advantageous because data will transfer as fast as possible and it is billed on a pay as you go basis. And paid by the gigabyte GB transferred it can offer a low barrier to entry for consumers.

Figure 31:
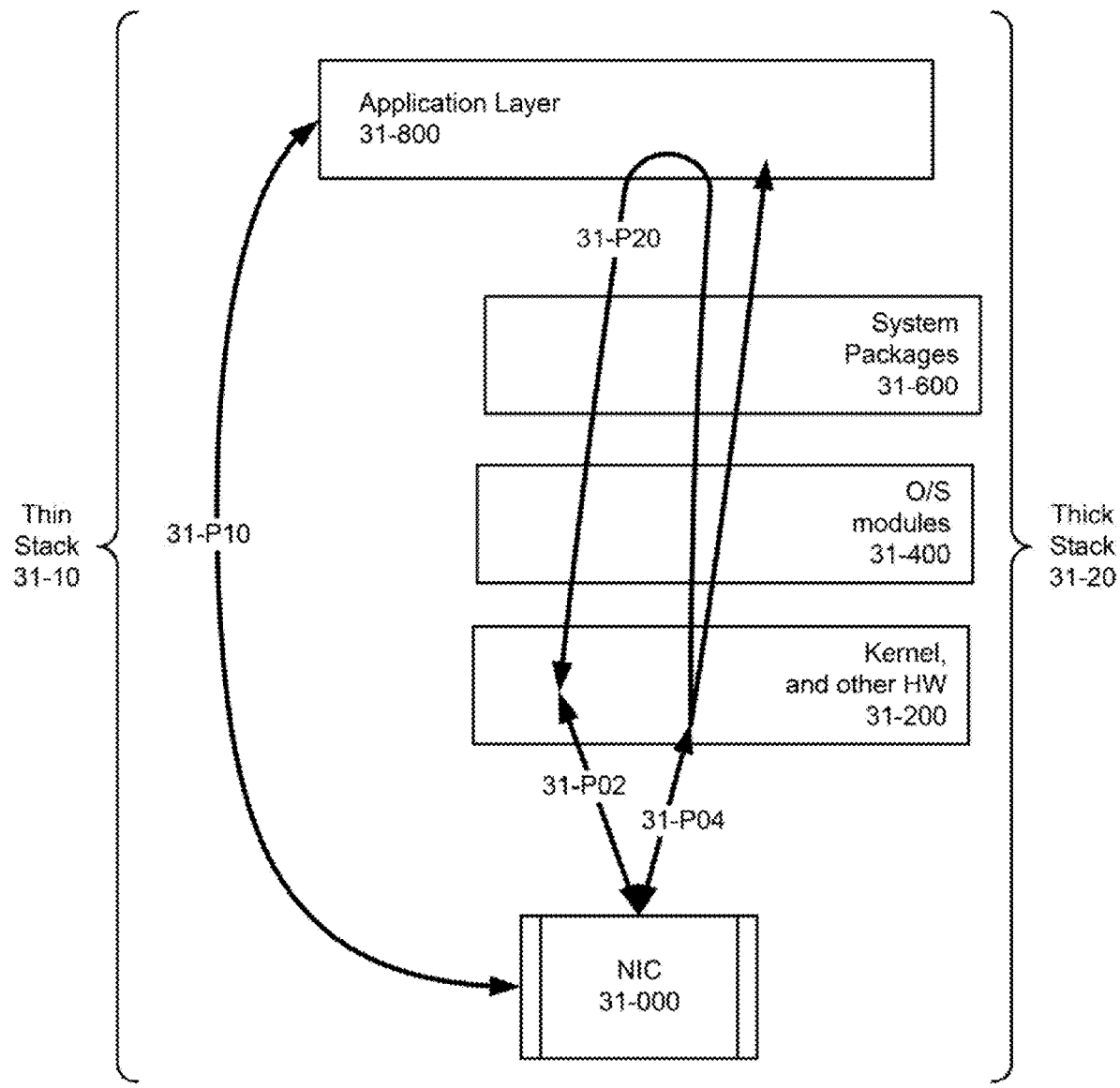
FIG. 31 illustrates the traditional thick stack 31-20 layered access between the application layer 31-800 and a network interface card (NIC) 31-000 as compared to a thin stack approach 31-10 which directly accesses the NIC 31-000 in accordance with certain embodiments of the disclosed subject matter.

FIG. 31 illustrates the traditional thick stack 31-20 layered access between the application layer 31-800 and a network interface card (NIC) 31-000 as compared to a thin stack approach 31-10 which directly accesses the NIC 31-000 in accordance with certain embodiments of the disclosed subject matter.

The advantages of a thin stack 31-10 over thick stack 31-20 are that it is faster, consumes less resources, and therefore can process relatively more network connectivity interactions.

Figure 32:
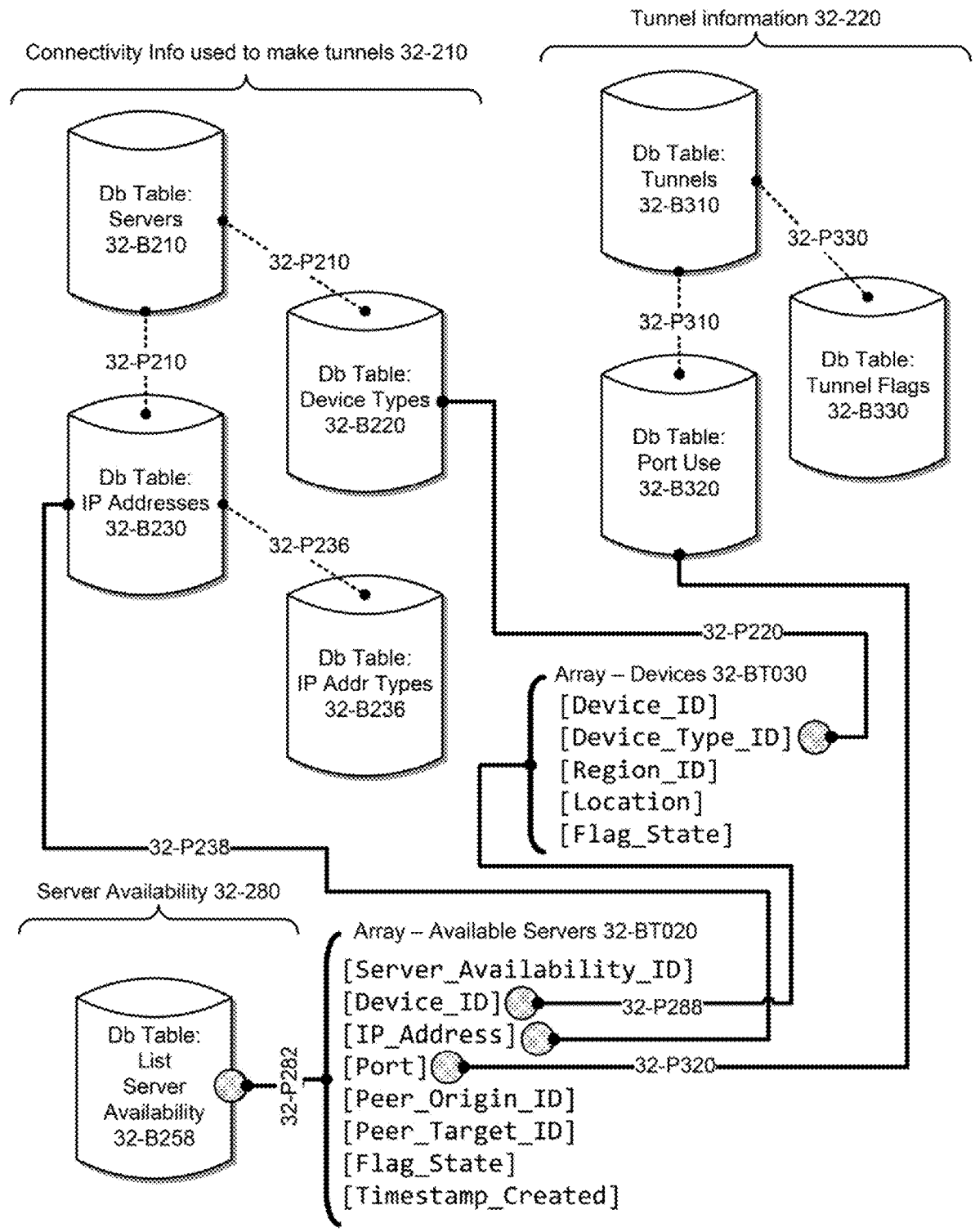
FIG. 32 illustrates a simple example databases schema for relating and storing connectivity information from both tests and production environment usage.

FIG. 32 illustrates a simple example databases schema for relating and storing connectivity information from both tests and production environment usage.

Those experienced in the art will see its advantages. The tables, the fields, labels and other information are provided for reference only and may differ in the various production deployments.

The Server Availability 32-280 module examines current allocation of IP address and port combinations while taking account of actual use, load, and other factors of the live production environment. It further analyzes the potential impact of assigned but standby allocations to predict the impact of those resource demands going live.

When a device makes a request to the server availability 32-280 module, what it is really asking for is a list of available servers, and specifically an IP and port which it could utilize in the present or in the future to build a tunnel to. Each tunnel has specific information which needs to be known to each pair in the tunnel building process as defined by tables under Tunnel information 32-220.

The list of server availability is tied to Connectivity Info used to make tunnels 32-210 by both device ID 32-P288 and device type ID 32-P220.

The Peer_Origin_ID refers to the ID of the originating device making the tunnel.

The Peer_Target_ID refers to the ID of the listening device to which the tunnel will be made. In most cases, Device_ID field in the array 32-BT020 is equivalent to the Peer_Origin_ID field in the 32-BT020.

The List of Server Availability is therefore a list which can be utilized by all devices but for which a contextual list for one certain device is easily retrieved with contextual records relevant to it. The field Flag_State in array 32-BT020 is significant because it can indicate the state of this information, if it is unused, in production, retired, blocked or otherwise marked.

The server availability mechanism 32-280 considers many factors balancing demand for resources by clients such as EPDs wanting to building tunnels against available resources of SRV_AP's which they would connect with.

This governing mechanism ensures that automatic jumps of tunnels from many EPDs to one specific device do not occur. For example, if all EPDs share the same list of server availability, without an influence on how an EPD picks which servers to connect with, there are scenarios where too many EPDs connect with some SRV_APs and too few to others. And when the EPDs connected to the oversaturated SRV_AP realize that they are receiving less than optimal connectivity, if they share the same list, by jumping to the next server on the list, they will be causing a wobbly shifting of the problem down the line.

Server availability addressing this sort of scenario by ranking best SRV_APs in order contextually for that specific EPD, and when generating the list, taking into account a holistic view and predictively spreading load in anticipation of demand pressures on the production environment.

Figure 33:
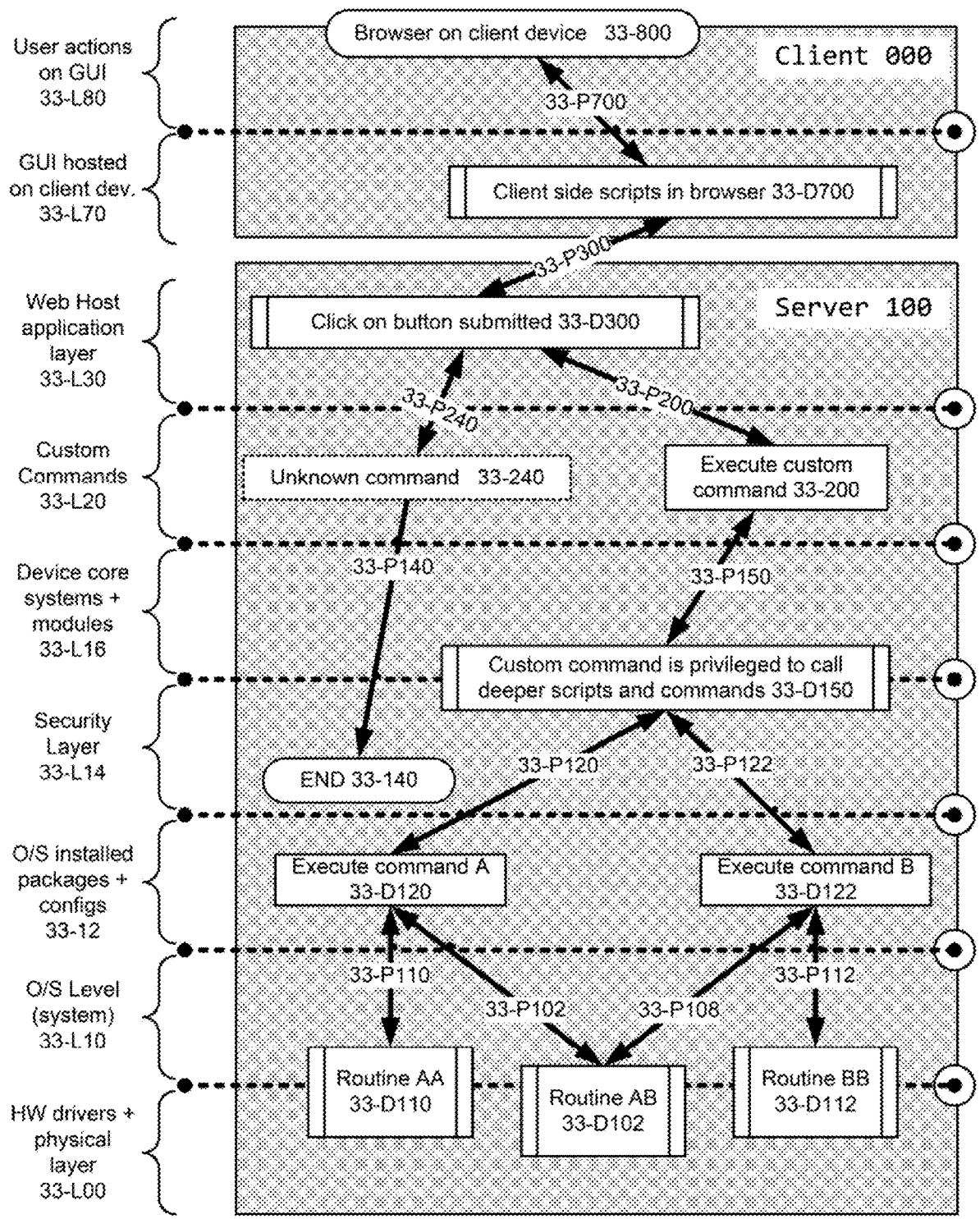
FIG. 33 illustrates, in accordance with certain embodiments of the disclosed subject matter, the usage of custom commands that act as a defensive cushion between a trigger on an application layer such as a button clicked on a graphic user interface and the deep logic and commands to be run as a result of the trigger.

FIG. 33 illustrates, in accordance with certain embodiments of the disclosed subject matter, the usage of custom commands that act as a defensive cushion between a trigger on an application layer such as a button clicked on a graphic user interface and the deep logic and commands to be run as a result of the trigger.

The deeper a trigger's code execution can penetrate, the more risk of compromise to the system. This presents a conundrum because on one hand, an unprivileged client should not have deep access. Yet, certain scripts that a user will want to trigger will need to delve deep or they will be rendered moot and not take effect when executed.

This figure has sufficient labelling so that a reader with reasonable skill in this area will be able to understand the information flow.

The step executing custom command 33-200 presumes that the triggering user has limited rights only to the Custom Commands 33-L20 execution level and not below. These limited rights preclude the ability to run sensitive commands, to access deep folders or files, or otherwise harm or penetrate deeper levels of the system. The path 33-P150 to "custom command is privileged to call deeper scripts and commands 33-D150" defines a sequence and series of steps that will allow the specific custom command to run the intended specific functionality in a safe and secure manner.

At "O/S installed packages+configs" 33-12, the embedded commands within the custom command may be able to evoke control over deep O/S level functionality but in a controlled manner. The lowest possible level commands may also be evoked but in a controlled manner and only based on the contents of an untampered custom command.

Therefore, the triggering user cannot dig deeper than 33-L20 and has no right to call sensitive commands, however by the action of calling a custom command to which they are allowed access, the contents of the custom command file can be run at an elevated rights state without compromising the security of the system, with only the calling and potentially the result of the custom command being available to the triggering client 33-800.

Figure 34:
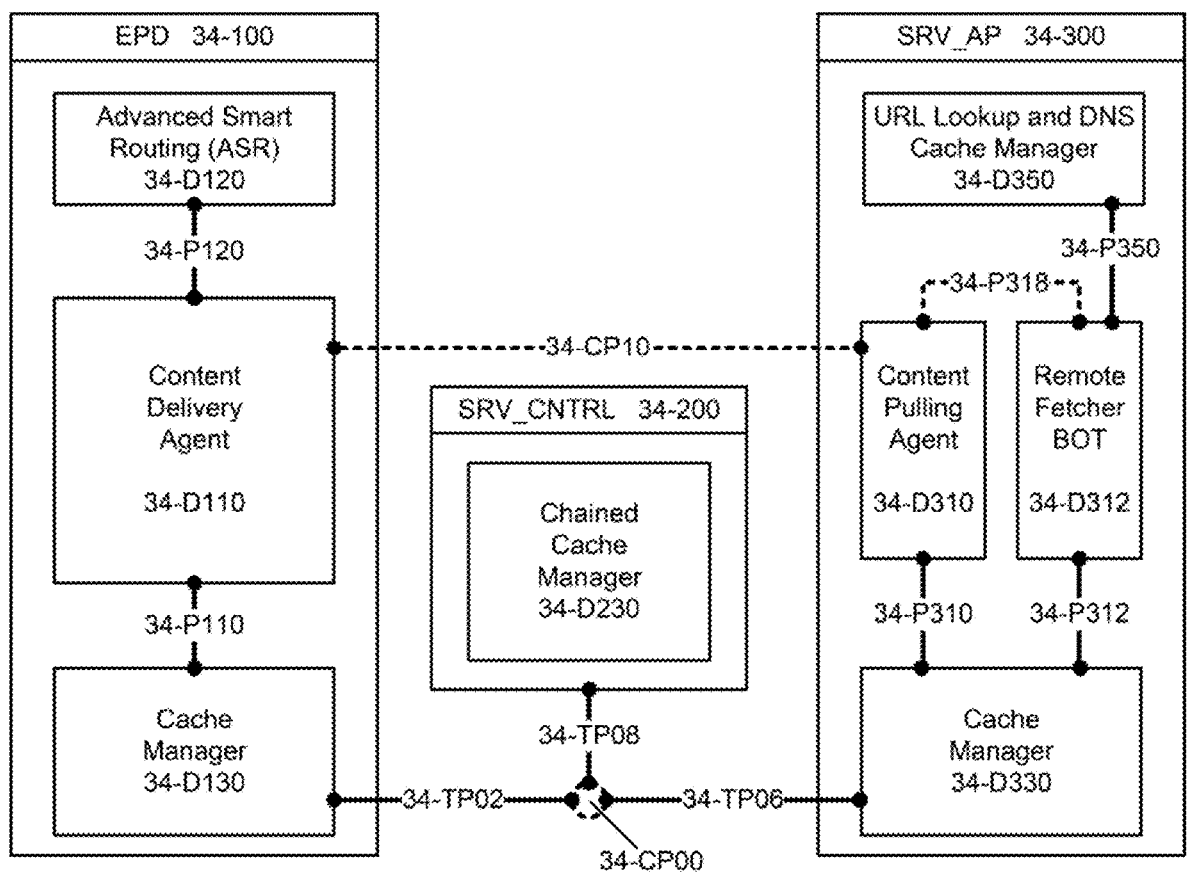
FIG. 34 is a simplified description of the modules on related devices in a geographic destination mechanism within a global virtual network (GVN) in accordance with certain embodiments of the disclosed subject matter.

FIG. 34 is a simplified description of the modules on related devices in a geographic destination mechanism within a global virtual network (GVN) in accordance with certain embodiments of the disclosed subject matter. It describes interaction between content delivery agent (CDA) 34-D110 and the content pulling agent (CPA) 34-D310.

While the CDA 34-D110 and CPA 34-D310 and associated modules are designed to run independently, there exists a flow of information between them which trigger operations of each.

For example, the ASR module 34-D120 on the EPD 34-100 will be able to advise the CDA 34-D110 that a URL is to be fetched from the remote region where the SRV_AP 34-300 is located. The CDA 34-D110 will communicate with the CPA 34-D310 via path 34-CP10 that it desires the geographic destination mechanism to fetch this content and all associated content at that URL from the remote region.

The CPA 34-D310 instructs the remote fetcher BOT (RFBOT) 34-D312 to do a look-up at 34-D350 to find the exact target server and to have the RFBOT 34-D312 fetch that content. CPA 34-D310 parses the content for embedded links to more included content which it then asks the RFBOT 34-D312 to fetch.

The subsequently pulled content is inventoried by the CPA 34-D310 for two purposes. First is to send the manifest and the retrieved data to the cache manager 34-D330, as well as a copy of the manifest back to the CDA 34-D110.

This collaboration is useful because the CDA 34-D110 is able to coordinate with the cache manager 34-D130 to expect the receipt of the fetched data and can compare the data received against the manifest created by the CPA 34-D310. There are efficiency gains realized by this controlled approach as well as security advantages because the received data must match the manifest or red flags could trigger scrutiny of either possible malfunction or malicious man-in-the-middle type of data alteration attack.

The SRV_CNTRL 34-200 is useful as a neutral channel for information conveyance between devices, and also for holistic management of the chained caches on various devices.

Figure 35:
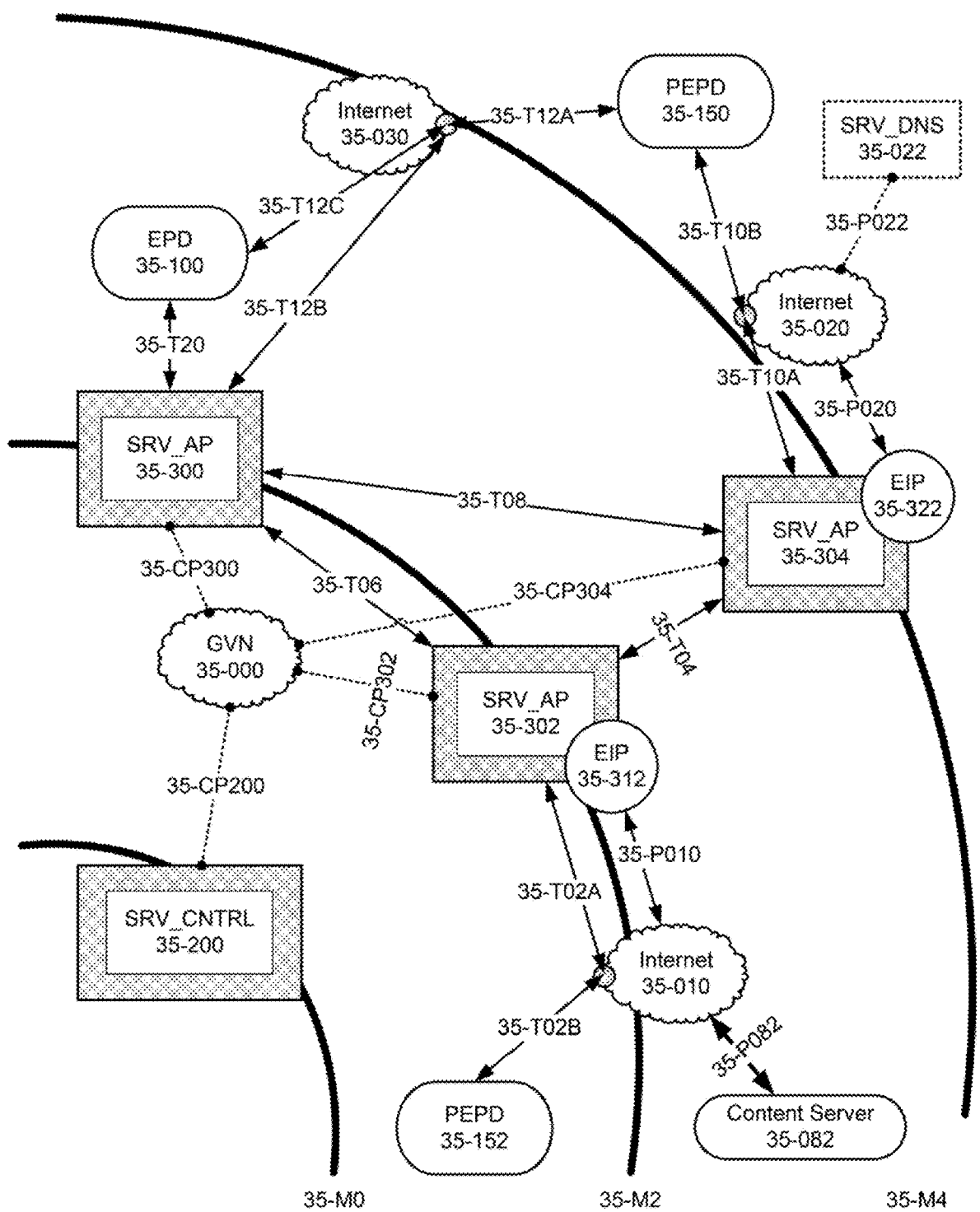
FIG. 35 illustrates, in accordance with certain embodiments of the disclosed subject matter, a few ways how a portable end point device (PEPD) might connect to a global virtual network (GVN) or similar topology.

FIG. 35 illustrates, in accordance with certain embodiments of the disclosed subject matter, a few ways how a portable end point device (PEPD) such as 35-150 or 35-152 might connect to a global virtual network (GVN) 35-000 or similar topology. In this example, the PEPD 35-150 has multiple connection options to three different devices. First to two different access point servers (SRV_AP) 35-304 via paths 35-T10B to 35-T10A in a region close to it, as well as to SRV_AP 35-300 in another region via paths 35-T12A to 35-T12B. A third option for PEDP 35-150 is to EPD 35-100 via 35-T12A to 35-T12C.

The PEPD may connect to as many SRV_AP servers as its resources and its rights via a server availability mechanism permit. However, for a PEPD 35-150 to connect to an EPD 35-100, they must have a relationship between them such as what would exist if both belonged to the same distributed end point area cluster (DEPAC) and rights were granted for the PEPD to connect to that EPD.

Figure 36:
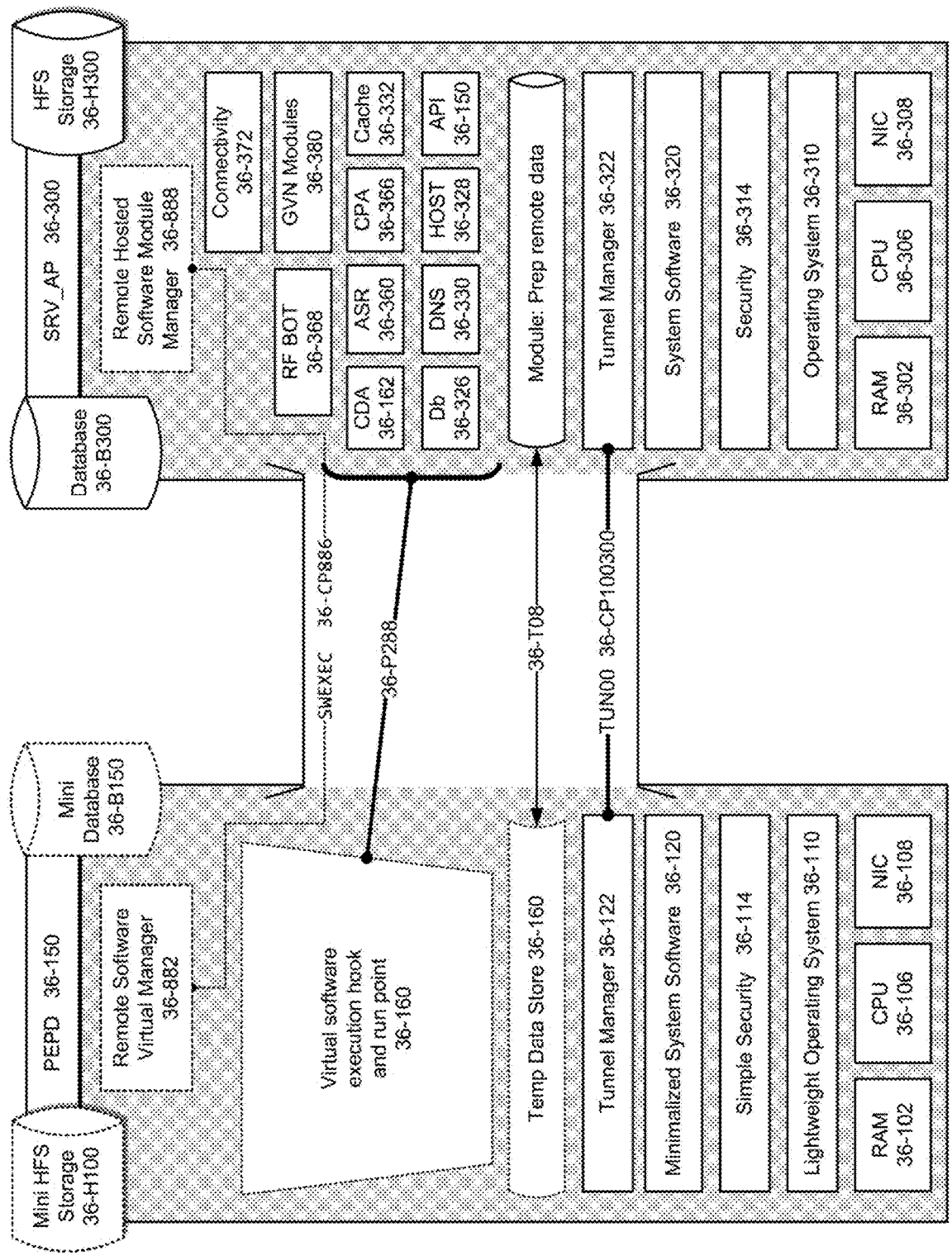
FIG. 36 illustrates, in accordance with certain embodiments of the disclosed subject matter, the relationship between a portable end point device (PEPD) and an access point server (SRV_AP) 36-300.

FIG. 36 illustrates, in accordance with certain embodiments of the disclosed subject matter, the relationship between a portable end point device (PEPD) 36-150 and an access point server (SRV_AP) 36-300. It further describes some of the modules on each of the aforementioned devices. The PEPD 36-150 will typically have a comparatively smaller amount of physical resources such as processing power 36-106, RAM 36-102, storage 36-H100, and other system attributes. An SRV_AP 36-300 can be a cloud based dynamic virtualized instance offering huge amounts of RAM 36-302, processing power 36-306, storage 36-H300, and other resources.

The PEPD 36-150 will typically have a minimal operating system 36-110, simple security suite 36-114, minimalized system software 36-120 and generally a small footprint. This barebones approach ensures that there exists a balance between functionality required and other related factors such as cost, battery consumption, physical size, and more.

One solution is for a virtual software container 36-160 to be available on the PEPD 36-150 which is able to either download and run software locally, or to act as a hook point for a symbolic link between local system and software run on a remote location such as on the SRV_AP 36-300.

This arrangement is possible and secured by a tunnel TUN00 36-CP100300 between the two devices through which not only data traffic can flow through but also software commands, queries, results, and other functionality which can be remotely run.

There exist several advantages to this approach as mentioned but others may also exist.

Figure 37:
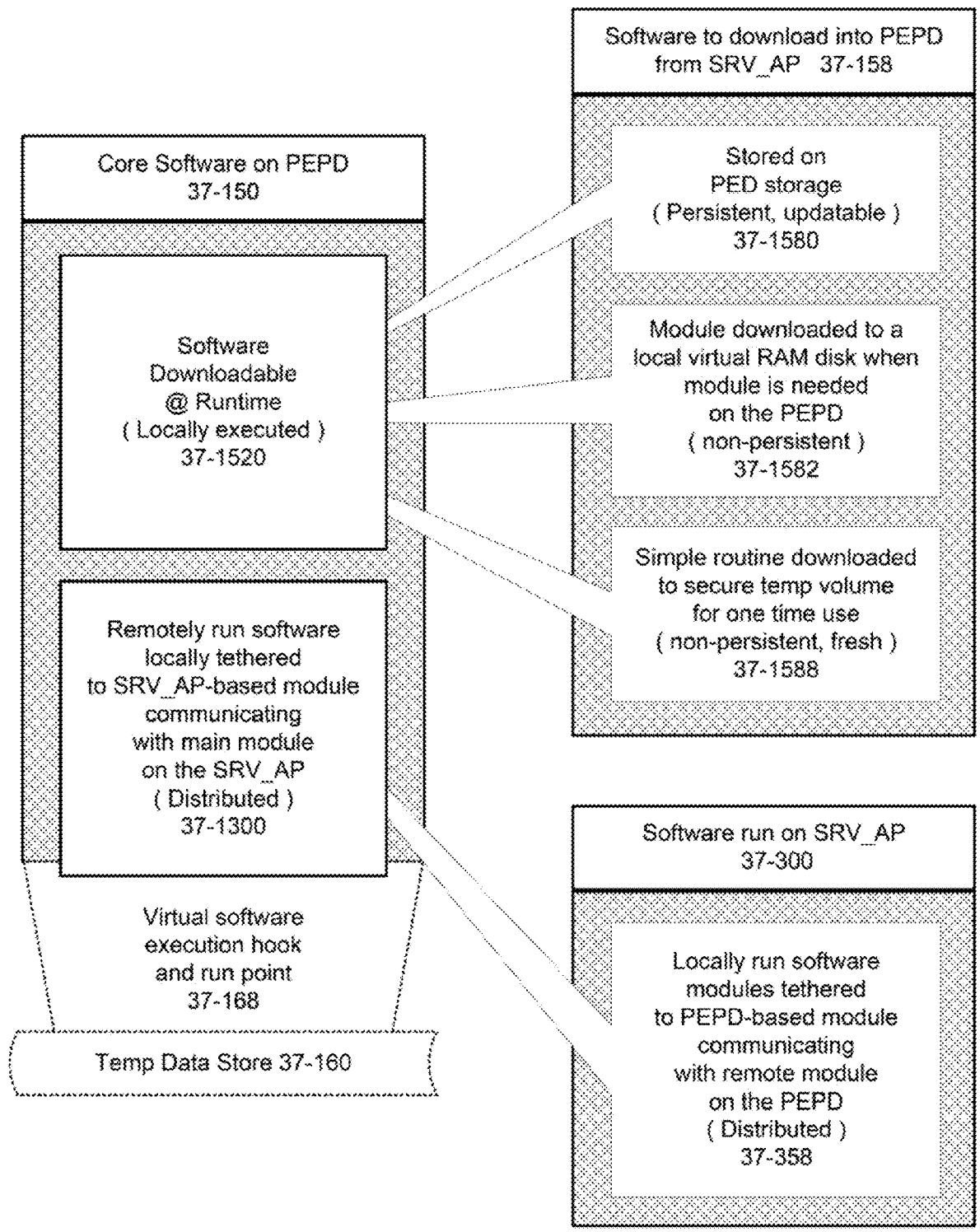
FIG. 37 illustrates, in accordance with certain embodiments of the disclosed subject matter, some of the different types of extensible software that may be run on a portable end point device (PEPD) where the software is stored on a remote device such as an access point server (SRV_AP) to be sent from the SRV_AP to the PEPD.

FIG. 37 illustrates, in accordance with certain embodiments of the disclosed subject matter, some of the different types of extensible software that may be run on a portable end point device (PEPD) 37-150 where the software is stored on a remote device such as an access point server (SRV_AP) 37-300 to be sent from 37-158 to the PEPD 37-150.

The first type is core software stored and running on the PEPD 37-150 such as software downloaded and locally executed 37-1520. Another type is remotely run distributed software 37-1300 which tethers the PEPD 37-150 to an SRV_AP 37-300 where the software is run.

There exist many advantages to this mechanism, including efficient use of PEDP resources, as well as ensuring that the most recent version of software is up and running.

Another element is the protection of the intellectual property of the producer of the software due to the fact that some physically lives in one location and run with results used by a software hook point in another location. In such a topology, both devices would have to be accessed to have visibility to the complete framework, codebase, and run-time attributes.

Figure 38:
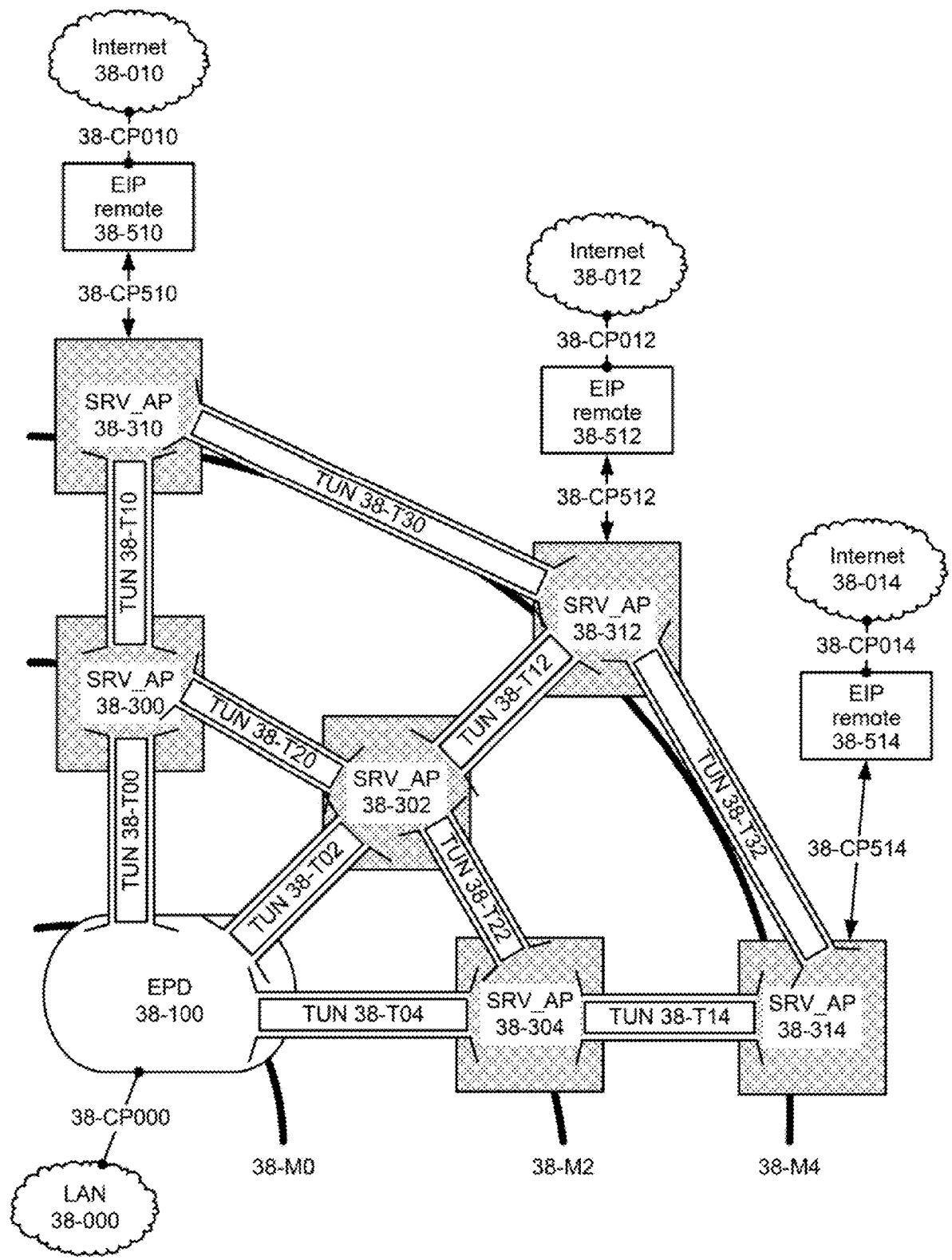
FIG. 38 illustrates, in accordance with certain embodiments of the disclosed subject matter, multiple tunnels between devices within a global virtual network (GVN) across multiple regions.

FIG. 38 illustrates, in accordance with certain embodiments of the disclosed subject matter, multiple tunnels between devices within a global virtual network (GVN) across multiple regions. The EPD 38-100 is in one location 38-M0. SRV_APs in region 38-M2 include SRV_AP 38-300, SRV_AP 38-302, and SRV_AP 38-304. SRV_APs in region 38-M4 SRV_AP 38-310, SRV_AP 38-312, and SRV_AP 38-314. Advanced smart routing (ASR) is used to manage routing over the multiple tunnels and paths between the EPD 38-100 and the various SRV_AP devices. ASR can mitigate the risk of looping, wrong geographic destination routing, ASR remote redirect backtrack, broken links between SRV_APs, regions, and other problems.

Figure 39:
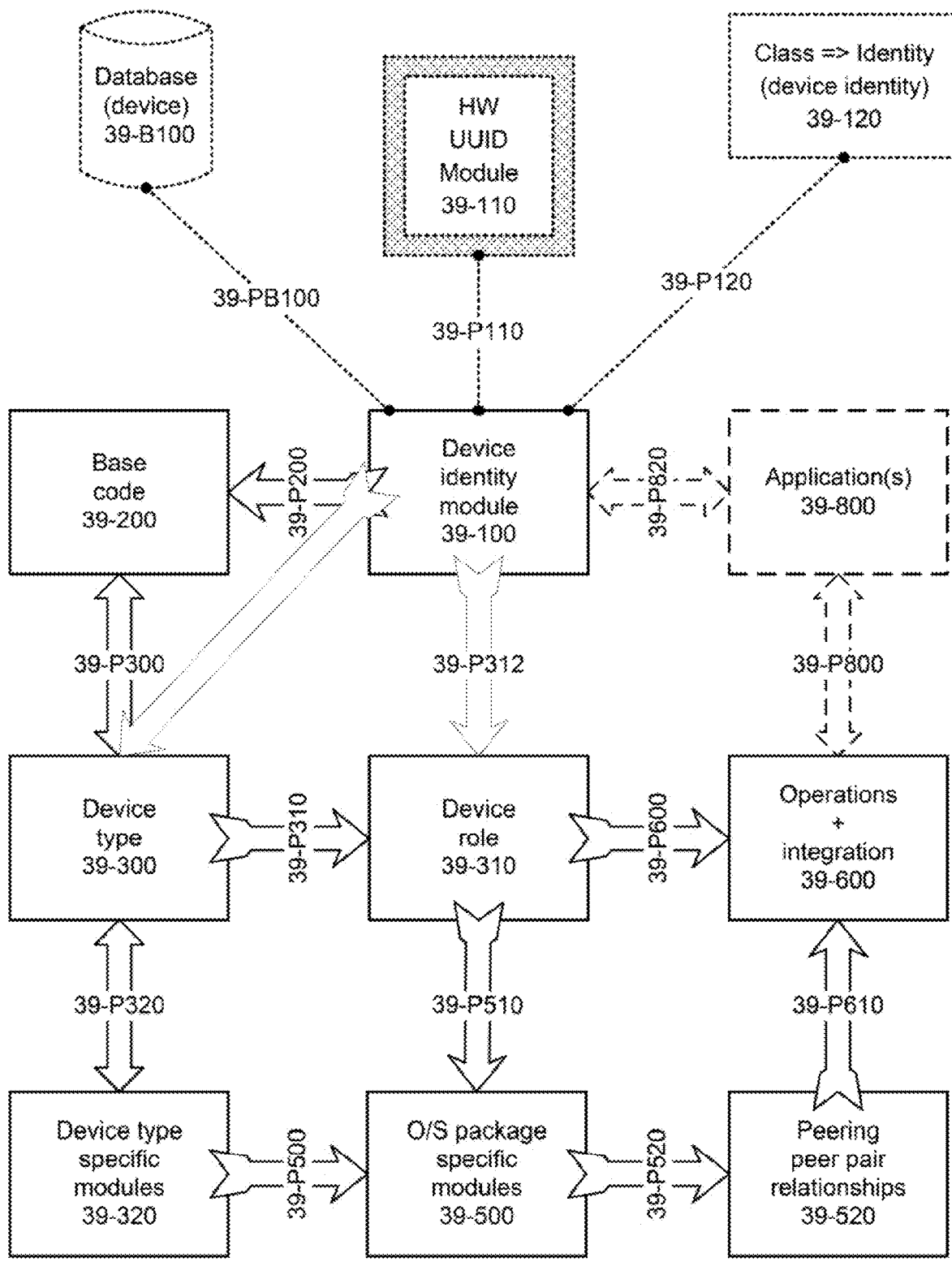
FIG. 39 illustrates, in accordance with certain embodiments of the disclosed subject matter, the framework for a common code base to be utilized by various types of devices, with each having their own attributes/type and identity.

FIG. 39 illustrates, in accordance with certain embodiments of the disclosed subject matter, the framework for a common code base to be utilized by various types of devices, with each having their own attributes/type and identity.

A hardware UUID 39-110 utilized by a device identity module 39-100, related to device related records stored in a database 39-B100, and calling an identity class 39-120 sets up many different contextual relationships for that specific device.

Within the scope of a common code framework, by a device knowing about its own identity from a few sources via 39-100, it can glean many things such as its role 39-310, its type 39-300, which elements of the base code pertain to it 39-200, which applications it should load and execute 39-800.

Knock on logical next steps are that by knowing device type 39-300, device type specific modules 39-320 can be loaded, and these along with device role 39-310, can trigger O/S specific modules to be loaded 39-500 to sustain operations for that type of device.

Device type 39-300 and role 39-310 also have impact on peering peer pair relationships 39-520, as well as on operations and integration 39-600.

Once the environment specific to that device is operational, applications 39-800 can be run contextually for that specific device.

It should be evident to readers with sufficient skill in this area.

Figure 40:
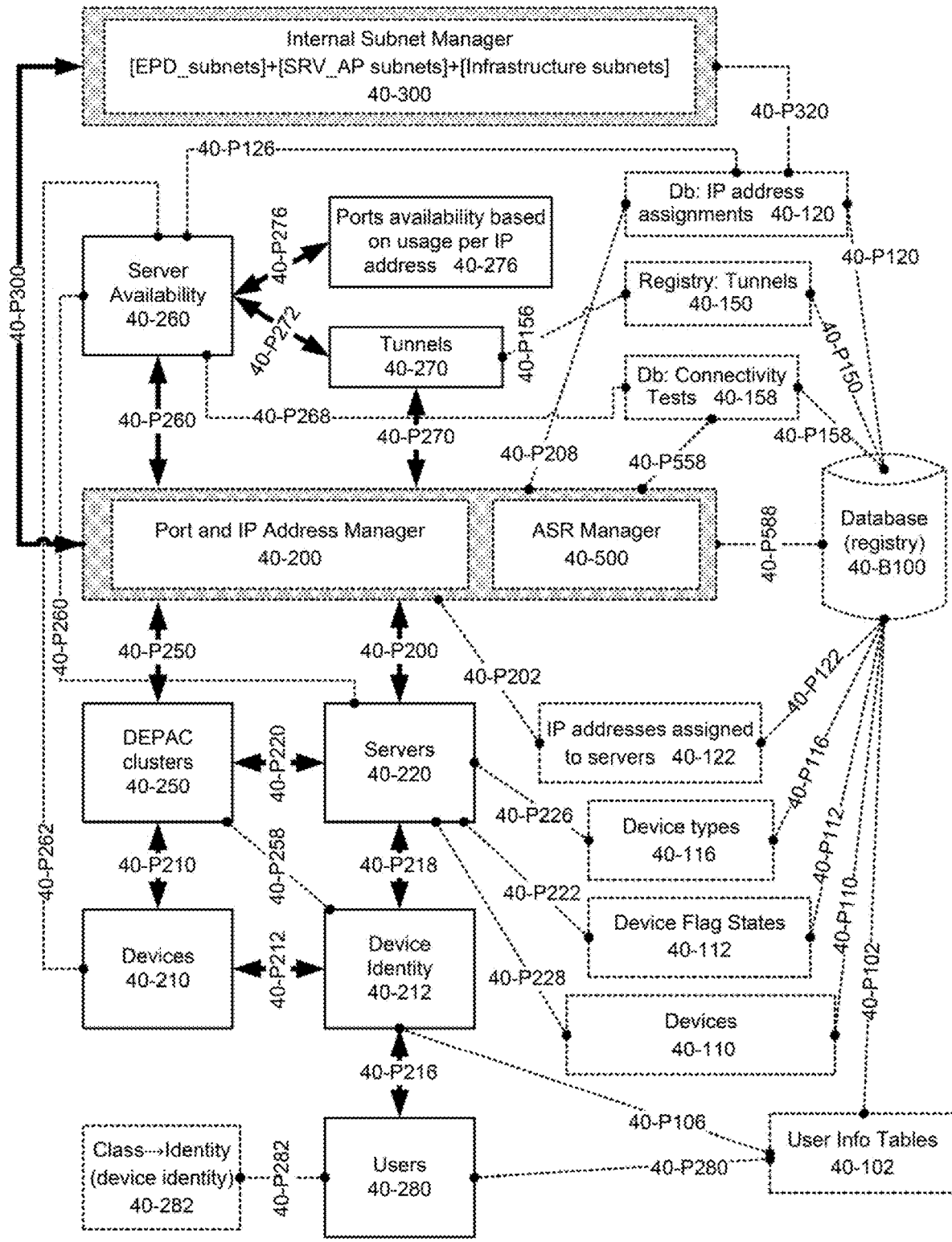
FIG. 40 illustrates, in accordance with certain embodiments of the disclosed subject matter, the relationships, interaction, and relevance of data to various devices within a global virtual network (GVN).

FIG. 40 illustrates, in accordance with certain embodiments of the disclosed subject matter, the relationships, interaction, and relevance of data to various devices within a global virtual network (GVN).

The Port and IP Address Manager 40-200 will use various data about tunnels 40-270, about servers 40-220, and other factors to assign resources for server availability 40-260 to then utilize and dole out to various devices.

There are logical relationships between data such as a list of Devices 40-110, and Servers 40-220, and how modules interact with each other to use this information.

Internal Subnet Manager [EPD_subnets]+ [SRV_AP subnets]+ [Infrastructure subnets] 40-300 uses this information to both calculate subnet ranges which could be used while avoiding conflicts and also "reserving" ranges to ensure no future conflicts; both in automatic settings and also in messaging to administrators regarding use.

The global virtual network (GVN) relies on various devices which work together to weave together a network type over the top (OTT) of the Internet. A registry 40-B100 keeps track of devices, of their relationships, their specifications, their type, and other factors. Core elements of the system include modules and managers that work together to construct and efficiently manage the GVN construct.

The advanced smart routing (ASR) Manager 40-500 looks at both the base internet connectivity as well as the network within the GVN layer OTT the internet. In order for automated systems to operate efficiently and effectively, Port and IP Address Manager 40-200 and Internal Subnet Manager 40-300 interact with various other modules.

Server Availability 40-260 looks at the tunnels 40-270, their IP and port use 40-276, reviews connectivity tests 40-158, both current and historical, calculates port availability based on usage per IP Address, the IP addresses assigned to servers 40-220, devices 40-210, and other factors to manage how server resources are utilized and assigned.

The server availability module's main benefit is to catalog the resources usage, IP addresses and ports of access point servers (SRV_AP) and to look at which devices 40-210 such as end point devices (EPD) that would like to connect to SRV_AP's to build tunnels (TUNs) 40-270 with them. The server availability module calculates and compiles a custom-made list of IP Addresses and Ports which are contextually designed to provide best options for EPD's to utilize. The tunnel registry 40-150 allows Server Availability 40-260 to review Db: Connectivity Tests 40-158 and based on current and historical conditions to weigh and rank best connectivity options for both tunnels 40-270 to be built and for routing via ASR 40-500.

Distributed end point administrative clusters (DEPAC) 40-250 are an extension of the construct of a GVN. DEPACs allow for the linking of the local area network (LAN) and personal area network (PAN) subnets behind EPD and portable end point devices (PEPD) 40-210 into a broader connected network by joining the subnets together 40-300. The Internal subnet manager needs to positively know about EPD subnets, SRV_AP subnets for tunnels, and other related infrastructure subnets 40-300, so that when it assigns new ones and stiches an edge of one subnet with another one into as broader fabric, by knowing about ones currently in use, it ensures that there are no conflicts of overlapping assignments of subnets.

The Db of IP address assignments 40-120 provides the information to be used by the internal subnet manager 40-300. The DEPAC clusters 40-250 have member devices 40-210 and each device has an identity 40-212 unique to it.

There are also relationships between Users 40-280, and devices 40-210 based on device identity 40-212 governed by an identity class or similar logic 40-282. Users can therefore administer DEPAC clusters 40-250.

The described topology allows for automatic and manually assisted construct of tunnels 40-270, with efficient routing thanks to ASR Manager 40-500, and other factors.

If a device is malfunctioning, needs to be updated, is oversubscribed, or is in another state which is not optimal, a device flag 40-112 for that device can be set to something other than "available" so that the Server Availability module 40-260 can know that that device is not available to be assigned to new server availability lists which would be published to other devices to utilize.

Other benefits are that analysis of historical use can be compared with current conditions and AI algorithms used to make decisions pertaining to routing, to resource allocation, and other factors.

Centralized real-time monitoring of connectivity, resources use, and other factors is made possible by accessing the data in the database registry 40-B100 and displaying it in a GUI.

Administration is made easier by automated systems which utilize information provided by GVN modules and managers to build and manage elements of the construct.

Deep analysis is possible for traffic flow, paths as set by ASR, server availability 40-260 and other modules not displayed here. This not only facilitates visibility on past and current use, but can serve as a basis for predictive cognitive analytics of how a future connectivity will operate.

Figure 41:
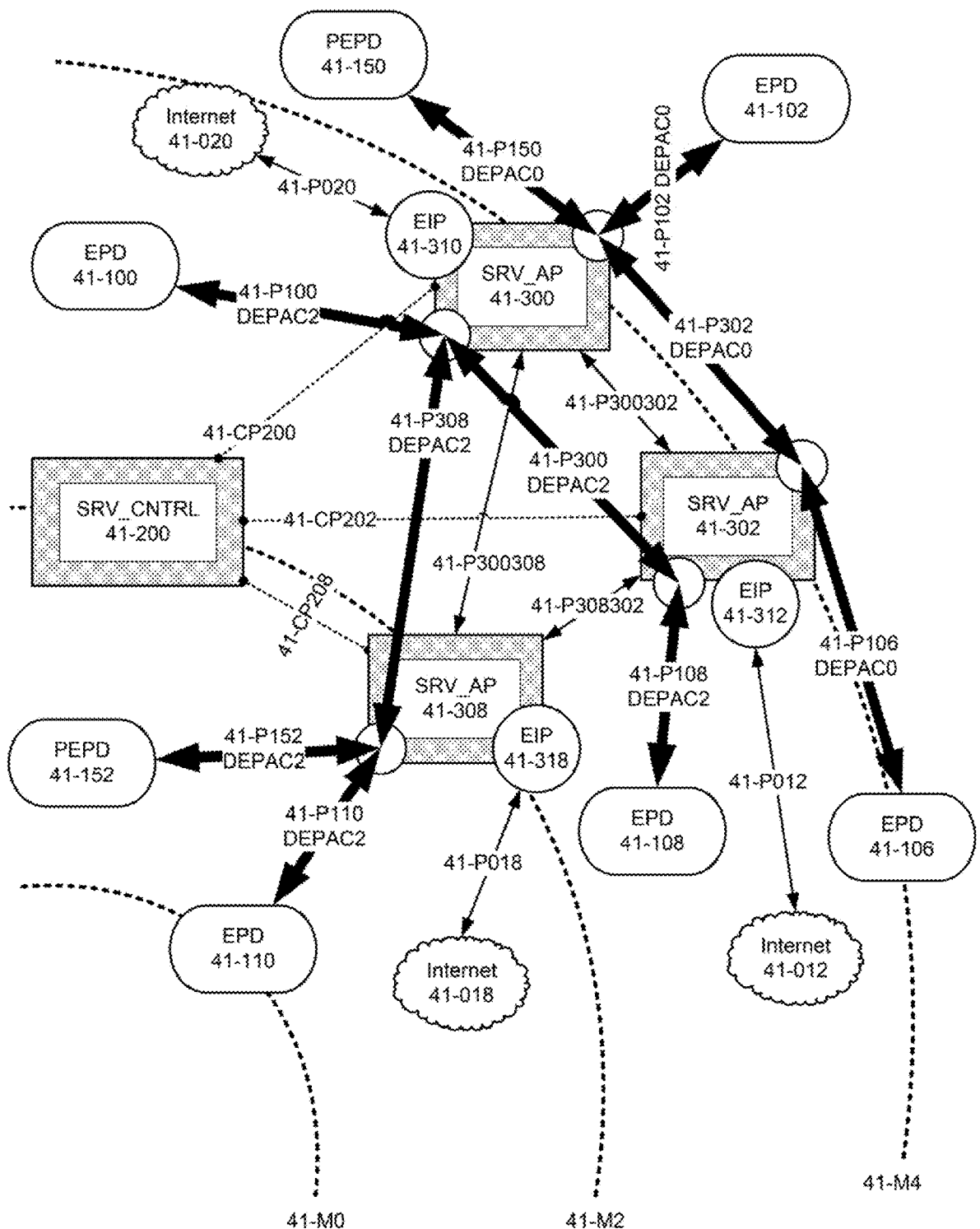
FIG. 41 illustrates, in accordance with certain embodiments of the disclosed subject matter, the topology of a global virtual network (GVN) over the top (OTT) of the Internet and various devices operating within it.

FIG. 41 illustrates, in accordance with certain embodiments of the disclosed subject matter, the topology of a global virtual network (GVN) over the top (OTT) of the Internet and various devices operating within it. Some examples of devices include end point devices (EPD) such as EPD 41-110, portable end point devices (PEPD) such as 41-152, access point servers (SRV_AP) such as 41-308, and central control server (SRV_CNTRL) such as 41-200, and more.

There are also egress ingress points (EIP) such as 41-318 between a GVN device such as SRV_AP 41-308 and the Internet such as 41-018.

In FIG. 41, there also exists another layer representing two independent distributed end point administrative clusters DEPAC0 and DEPAC2.

The members of DEPAC0 are PEPD 41-150, EPD 41-102, and EPD 41-106.

The members of DEPAC2 are EPD 41-100, PED 41-152, EPD 41-110, and EPD 41-108.

DEPAC members connect to each other through existing GVN pathways and only connect subnets together and link internal tunnels joining local area networks (LANs) and personal area networks (PANs) into a wider wide area network (WAN).

Figure 42:
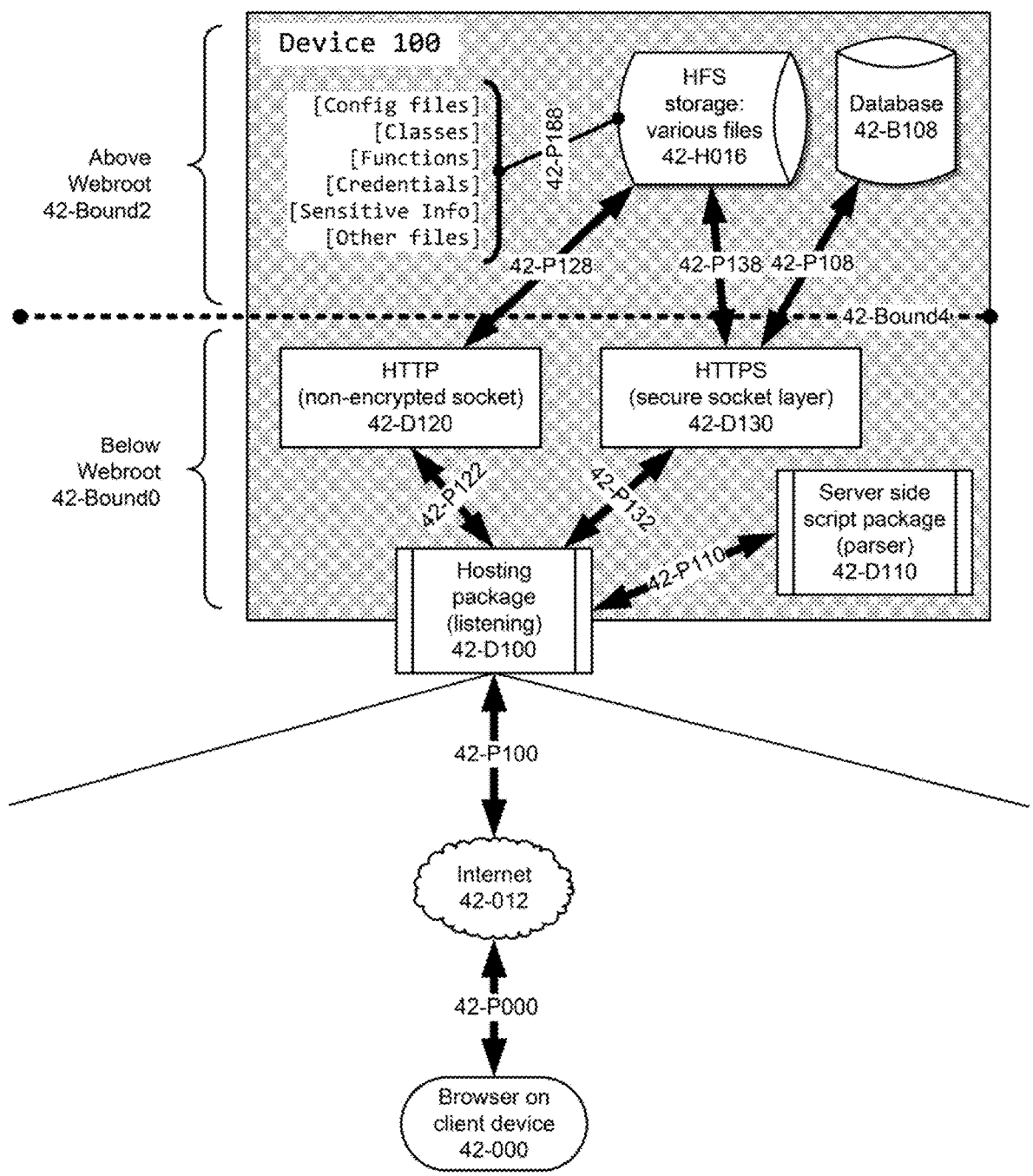
FIG. 42 illustrates, in accordance with certain embodiments of the disclosed subject matter, code both above the web root and below the web root.

FIG. 42 illustrates, in accordance with certain embodiments of the disclosed subject matter, code both above the web root 42-Bound2 and below the web root 42-Bound0.

The bare minimum of code should be stored in files within folders which are directly accessible from the open internet below the web root 42-Bound0.

Sensitive files including configuration file, classes, functions, credentials, sensitive info, and other files are stored above the web root 42-Bound2.

While it may be argued that the server side script package (parser) 42-D110 should process the sensitive code within files when they are retrieved, there are instances when a malfunction or misconfiguration or hacking could allow the file to be downloaded which gives direct visibility to the embedded code which should have been executed.

The only server side code included in the files stored below should be relative links to files above the web root 42-Bound2.

The terms above and below refer to file paths such as:
/volume/folder/instance/code/secure/*** secure folders and paths here
/volume/folder/instance/code/public/http/ALL_ here_is_on_open_internet_HTTP
/volume/folder/instance/code/public/https/ALL_ here_is_on_open_internet_HTTPS The web root(s) in the above examples are:
/volume/folder/instance/code/public/http/
/volume/folder/instance/code/public/https/

Anything above those is only accessible from within the server, not reachable via internet. And all files and folders within the http and https folders are reachable.

Figure 43:
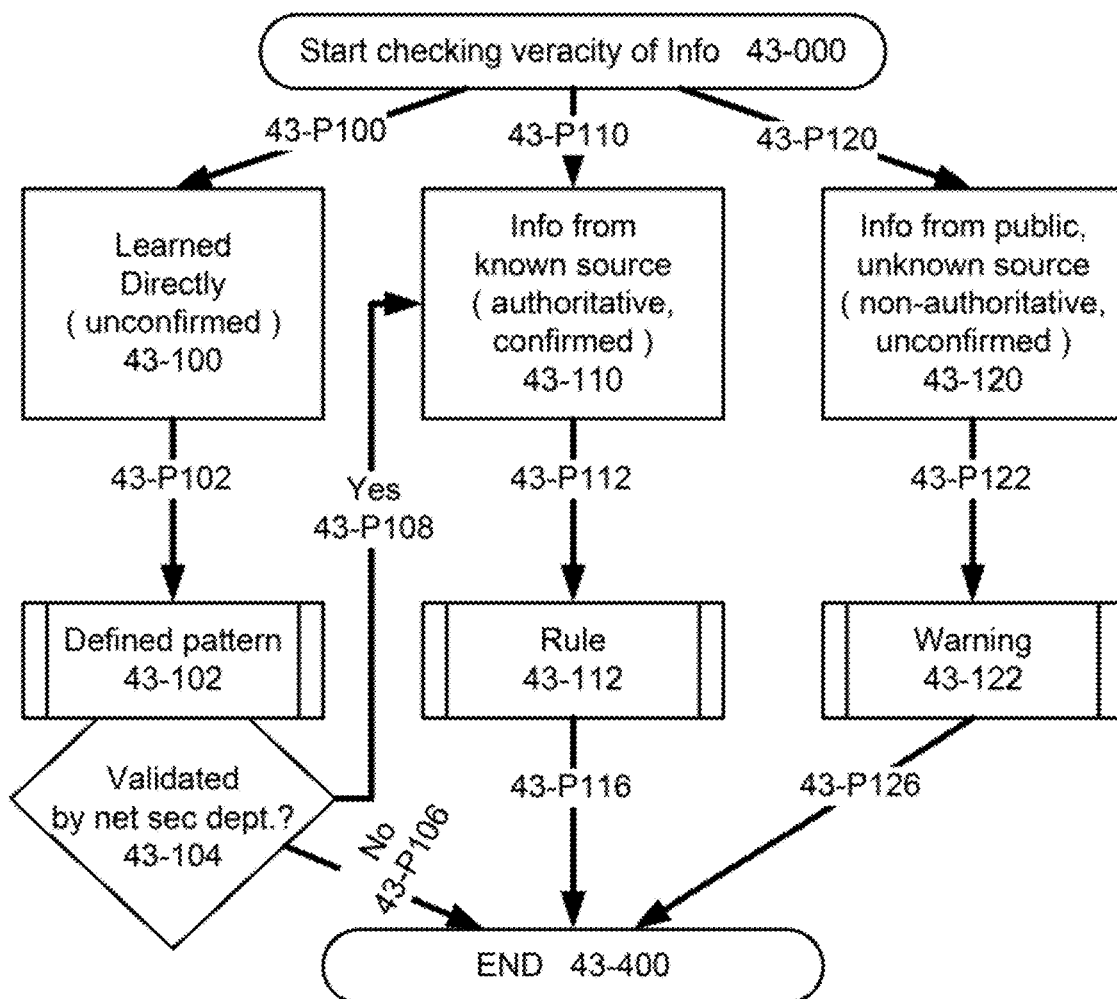
FIG. 43 illustrates, in accordance with certain embodiments of the disclosed subject matter, algorithms incorporating information from external sources with artificial intelligence (AI) knowledge learned internally.

FIG. 43 illustrates, in accordance with certain embodiments of the disclosed subject matter, algorithms incorporating information from external sources with AI knowledge learned internally.

The step Start checking veracity of Info 43-000 does so by source and type of info.

Defined patterns 43-102 can be validated by 43-P108 to become rules. Warnings 43-122 based on information from others may either be disregarded or they too could become rules 43-112.

Figure 44:
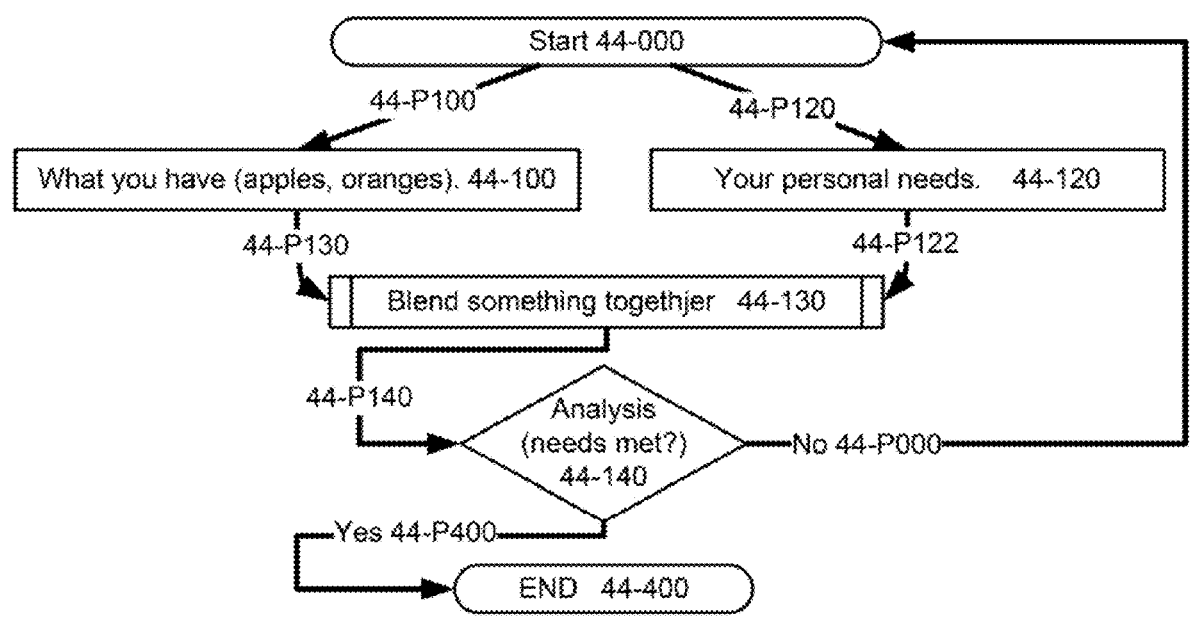
FIG. 44 illustrates, in accordance with certain embodiments of the disclosed subject matter, a simplified representation of an approach to designing a smarter algorithm by taking into account factors that one has and balancing against one's personal needs.

FIG. 44 illustrates, in accordance with certain embodiments of the disclosed subject matter, a simplified representation of an approach to designing a smarter algorithm by taking into account factors that one has and balancing against one's personal needs. In this "juices" example, the "blend something together 44-130" step can be described as a process which is important to focus on to achieve the desired result. The "analysis of needs met 44-140" determines if best result has been achieved if the process should run again with slightly different inputs and methods to get closers to desired result.

In some embodiments, based on haves and needs for best income, during the process elements may be utilized which are not incorporated in the product of the final process but still have an impact on the result. To extend the juice example out, a citrus peel can cheer a person up (e.g., the maker of the juice) when peeling the fruit but it is ultimately discarded and not used. Another example is that apple and orange are both good for one's health but citrus may not be ideal for someone with an acidity condition.

Key point is for an algorithm to be flexible and to take into account various conditions, processes, inputs, and outputs taking a holistic approach to evaluation.

Figure 45:
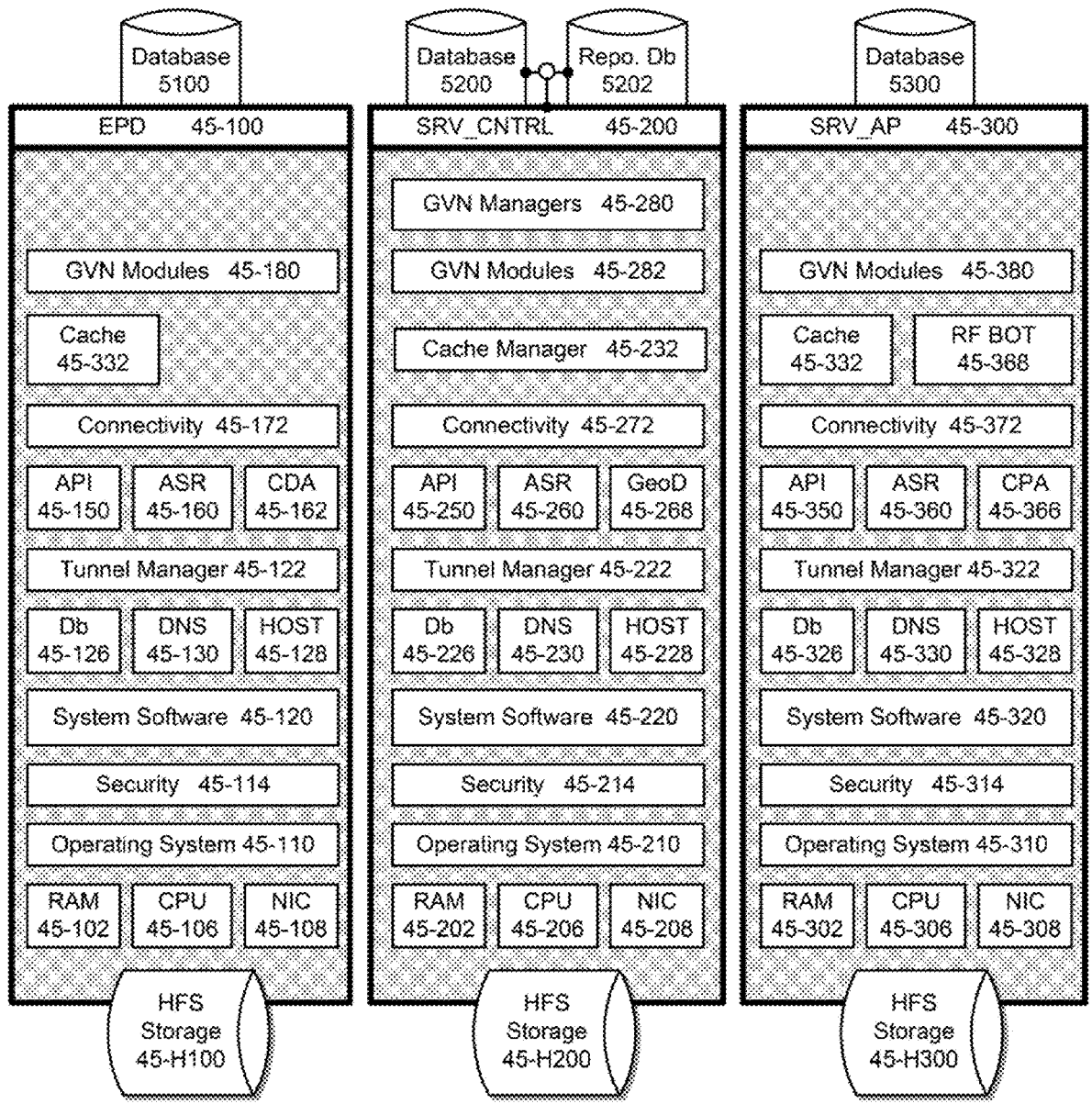
FIG. 45 illustrates, in accordance with certain embodiments of the disclosed subject matter, some system modules and components for an end point device (EPD), central control server (SRV_CNTRL), and an access point server (SRV_AP).

FIG. 45 illustrates, in accordance with certain embodiments of the disclosed subject matter, some system modules and components for an end point device EPD 45-100, central control server SRV_CNTRL 45-200, and an access point server SRV_AP 45-300. This figure also illustrates database 5100 on EPD 45-100, database 5200 on SRV_CNTRL 45-200, repository database 5202 on SRV_CNTRL 45-200, and database 5300 on SRV_AP 45-300. The figure is hierarchical, with lowest level hardware devices at the bottom, and subsequent systems, components, modules and managers built on top of lower layers. Files and data are stored on the Hierarchical File System (HFS) attached storage devices 45-H100 on EPD 45-100, 45-H200 on SRV_CNTRL 45-200, and 45-H300 on SRV_AP 45-300. The components illustrated in these systems diagrams all operate independently but may also rely on information about other devices that they interact with.

RAM stands for random access memory, CPU for central processing unit (which can also include sub-processors), NIC for network interface card, Db for database software, DNS for domain name system, HOST for hosting software, API for application programming interface, ASR for advanced smart routing, GeoD for geodestination, GVN for global virtual network, CDA for content delivery agent, CPA for content pulling agent, and RF BOT for remote fetcher bot. There may be additional modules, managers, systems, or software components.

Figure 46:
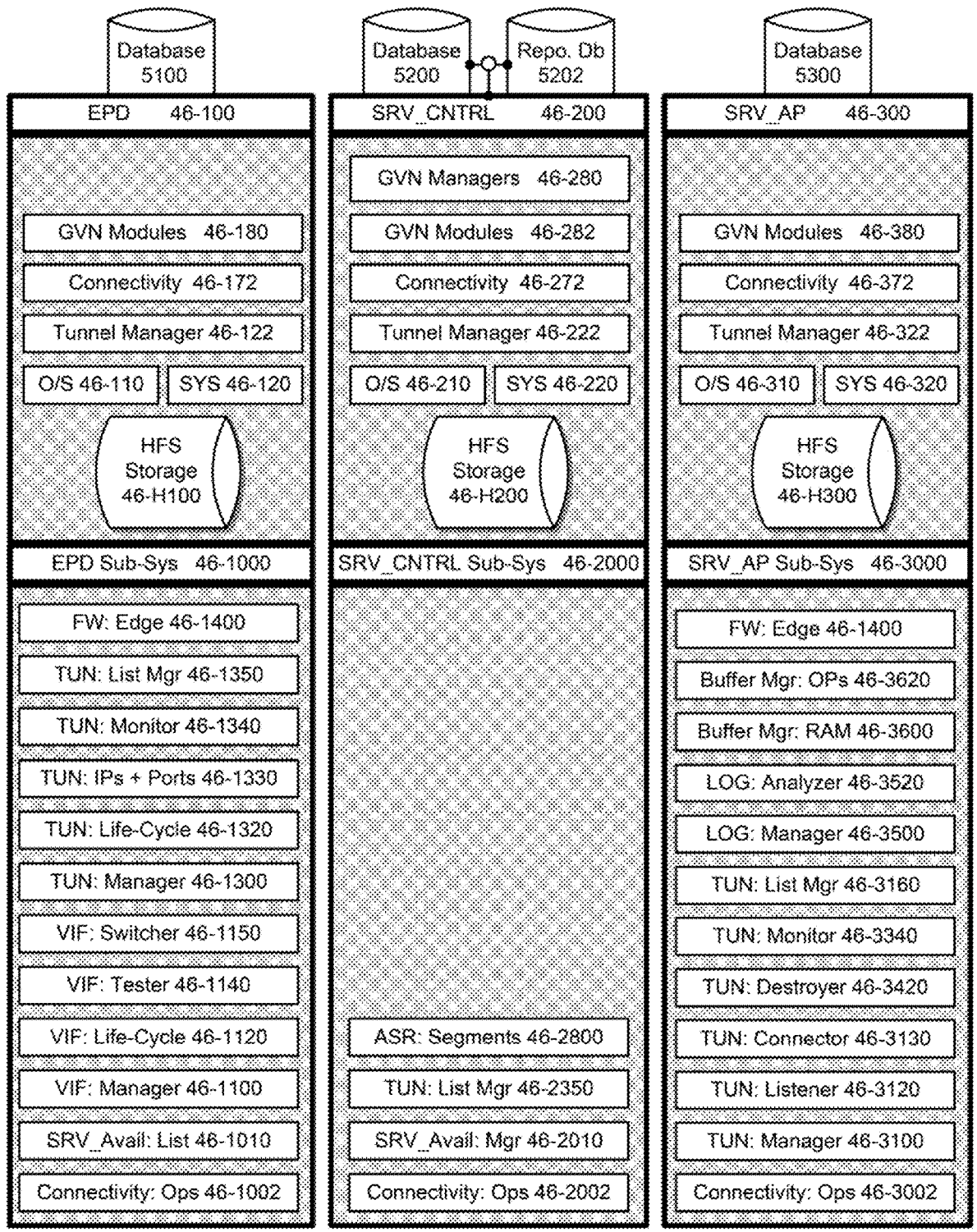
FIG. 46 illustrates, in accordance with certain embodiments of the disclosed subject matter, some system modules and components for an end point device (EPD), central control server (SRV_CNTRL), and an access point server (SRV_AP).

FIG. 46 illustrates, in accordance with certain embodiments of the disclosed subject matter, some system modules and components for an end point device EPD 46-100, central control server SRV_CNTRL 46-200, and an access point server SRV_AP 46-300. This figure further identifies subsystems for each device such as EPD sub-sys 46-1000 for EPD 46-100, SRV_CNTRL Sub-sys 46-2000 for CNTRL 46-200, and SRV_AP sub-sys 46-3000 for SRV_AP 46-300. Subsystems have been identified by function and are indicated with prefixes including FW for firewall related subsystems, TUN for tunnel related subsystems, VIF for virtual interface related subsystems, SRV_Avail for the server availability list and related subsystems, BUFF Mgr for buffer management and related subsystems, LOG for the logging module and related subsystems, and CONNECTIVITY for general connectivity operations.

Figure 47:
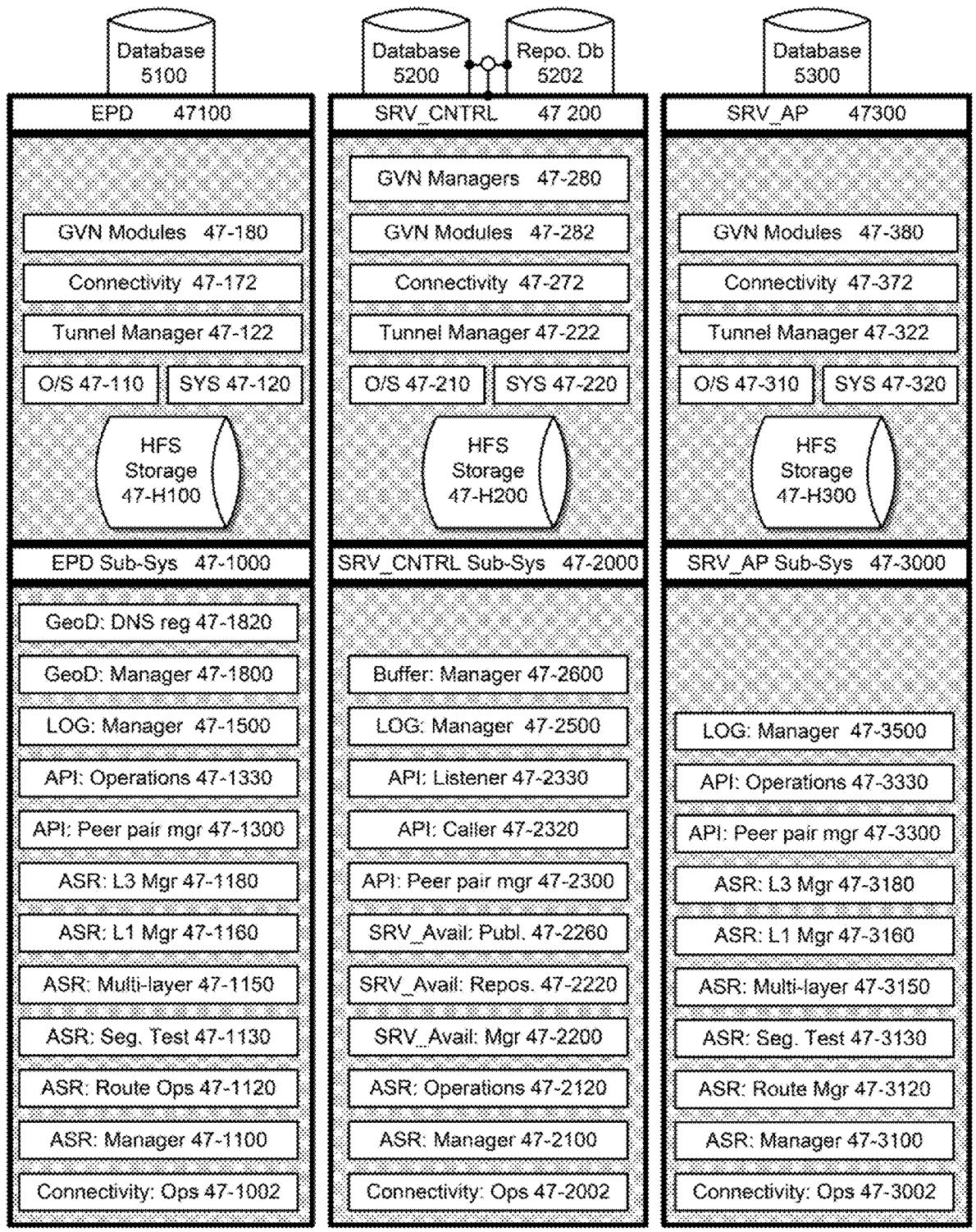
FIG. 47 illustrates, in accordance with certain embodiments of the disclosed subject matter, some system modules and components for an end point device (EPD), central control server (SRV_CNTRL), and an access point server.

FIG. 47 illustrates, in accordance with certain embodiments of the disclosed subject matter, some system modules and components for an end point device EPD 47100, central control server SRV_CNTRL 47 200, and an access point server SRV_AP 47300. Subsystems have been identified by function and are indicated with prefixes including Connectivity for general connectivity operations, ASR for advanced smart routing, API for application programming interface, LOG for the logging module and related subsystems, GeoD for the geodestination module and related subsystems, SRV_Avail for server availability list and related subsystems, Buffer for buffer management and related subsystems.

Figure 48:
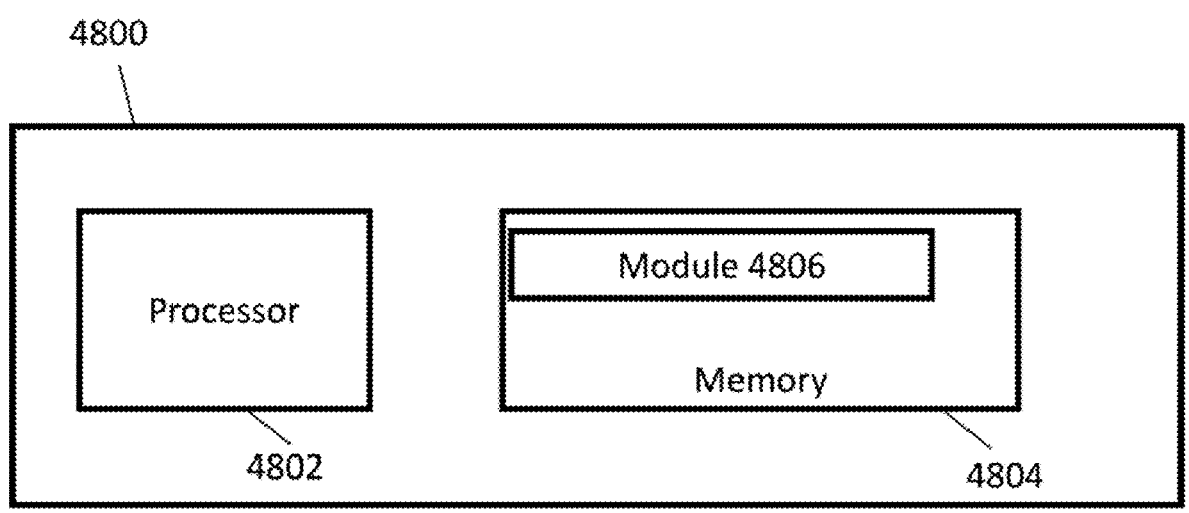
FIG. 48 illustrates a block diagram of an exemplary computing device according to certain embodiments of the disclosed subject matter.

FIG. 48 illustrates a block diagram of an exemplary computing device 4800 according to certain embodiments of the disclosed subject matter. In some embodiments, the computing device 4800 can be any suitable device disclosed in the current invention. The computing device 4800 can include at least one processor 4802 and at least one memory 4804. The processor 4802 can be hardware that is configured to execute computer readable instructions such as software. The processor 4802 can be a general processor or be an application specific hardware (e.g., an application specific integrated circuit (ASIC), programmable logic array (PLA), field programmable gate array (FPGA), or any other integrated circuit). The processor 4802 can execute computer instructions or computer code to perform desired tasks. The memory 4804 can be a transitory or non-transitory computer readable medium, such as flash memory, a magnetic disk drive, an optical drive, a programmable read-only memory (PROM), a read-only memory (ROM), a random access memory (RAM), or any other memory or combination of memories.

In some embodiments, the memory 4804 includes a module 4806. The processor 4802 can be configured to run the module 4806 stored in the memory 4804 that is configured to cause the processor 4802 to perform various steps that are discussed throughout the disclosed subject matter.

Figure 49:
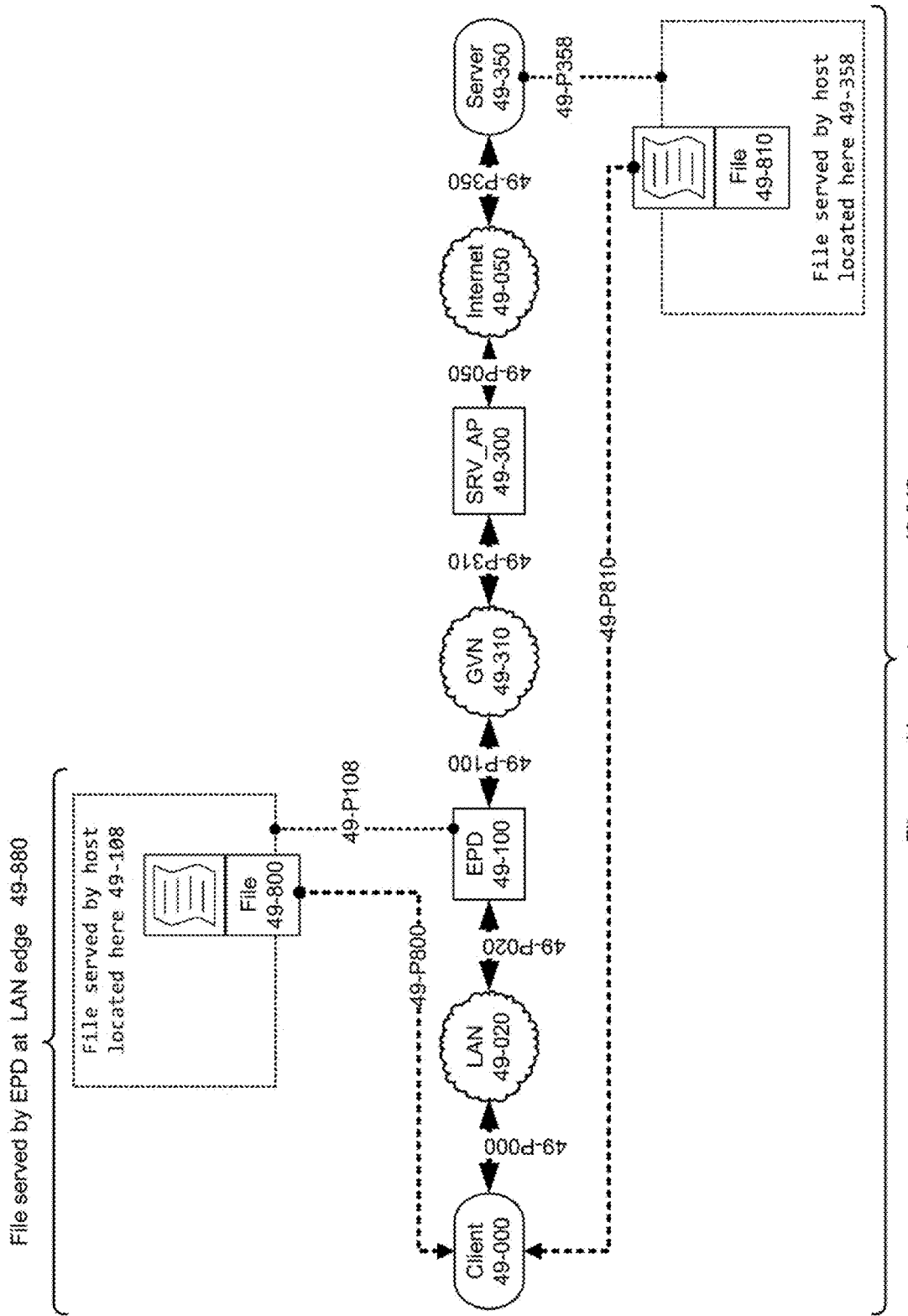
FIG. 49 illustrates a process of the downloading of a file in a LAN as well as the downloading of a file from the Internet in accordance with certain embodiments of the disclosed subject matter.

FIG. 49 illustrates a process of the downloading of a file in a LAN as well as the downloading a file from the Internet in accordance with certain embodiments of the disclosed subject matter. It compares and contrasts the file served by EPD at LAN edge 49-880 to file served by remote server 49-840.

Downloading a file within a LAN 49-880 offers total control over firewalls, filtering, as well as relatively high bandwidth (BW), ultra-low latency, a small number of hops, and other advantages.

Downloading from a remote server on the open internet has very little to no control over the path in the middle and there can also be filtering from firewalls or constrictions due to middle devices.

By optimizing the traffic in the middle, many issues get resolved. However, the download BW is still constricted by the last mile connection or the smallest peering point or network segment.

Therefore, the download of file 49-810 from a remote server 49-350 from a remote internet 49-050 will in most cases be slower than downloading a file 49-800 from the LAN 49-020.

Figure 50:
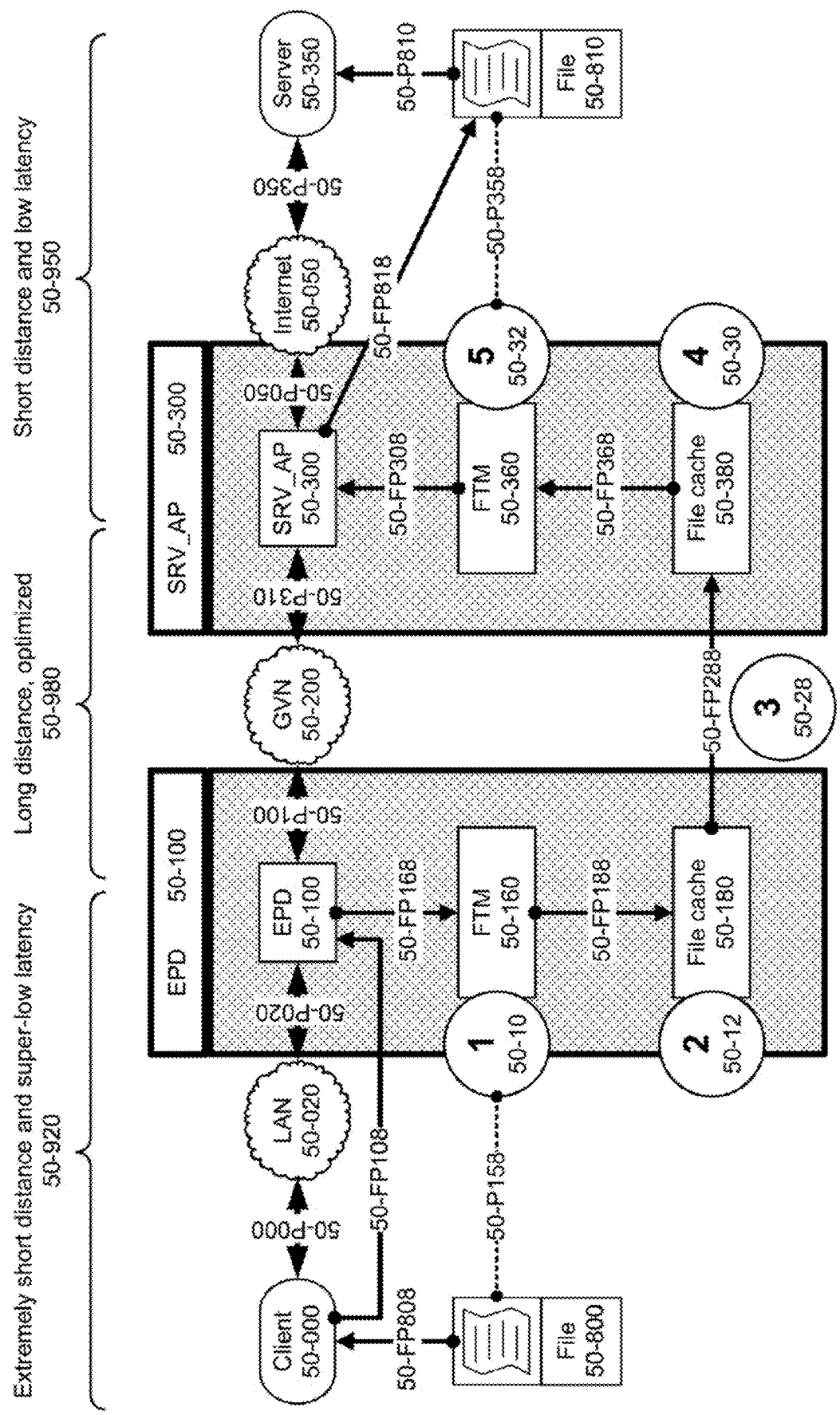
FIG. 50 illustrates the operation of a file transfer manager (FTM) on an end point device (EPD) and of an FTM on an access point server (SRV_AP) in accordance with certain embodiments of the disclosed subject matter.

FIG. 50 illustrates the operation of a file transfer manager (FTM) 50-160 on an end point device (EPD) 50-100 and of an FTM 50-360 on an access point server (SRV_AP) 50-300 in accordance with certain embodiments of the disclosed subject matter.

The client 50-000 initiates the upload transfer of a file 50-800 to the server 50-350 via the path 50-P000 to LAN 50-020 to EPD 50-100 which routes the traffic through a global virtual network (GVN) 50-200 over an optimized, long distance 50-980 to SRV_AP 50-300 to 50-P050 to the Internet in the remote region 50-050 and on to the server 50-350 via path 50-P350. The server 50-350 accepts the connection from client 50-000 and begins the process of receiving the file in multi-part attachments sent within a stream of packetized payloads.

For files larger than a certain size set by a threshold parameter variable, the original upload stream of file 50-800 from the client 50-000 is detected at step 1 50-10 by the FTM 50-160 and this file stream is then captured and pulled into the file cache 50-180 on the EPD 50-100. As this network path is an extremely short distance with super-low latency 50-920, the remaining data in the file upload completes uploading very quickly thus reducing the upload time from the client's perspective. This has the advantage of freeing the client up. The FTM 50-160 maintains the stream of the upload to server 50-350 and sends this data from file cache 50-180 while receiving and after having already received the complete file, it continues the upload on behalf of the client until the upload is complete.

At step 1 50-10, the original stream is detected, and only after the server accepts the connection and opens up a valid socket is the stream deemed as valid.

At step 2 50-12, the upload stream is redirected into the local file cache 50-180 to accumulate there at the high rate of speed of the LAN 50-020. It will also continue to be sending the upload steam to server 50-350 via the optimized GVN topology, including transit at step 3 50-28 to the file cache 50-380 on the SRV_AP 50-300 in the remote region in close proximity to the target server 50-350.

The FTM 50-360 on SRV_AP 50-300 maintains the connection and sends the file 50-810 to the server 50-350 as fast as it can via path 50-P350. Step 5 50-32 notes that this is where the connection is kept alive and healthy, and where the file 50-810 will egress the GVN at a short distance and low latency 50-950 between the SRV_AP 50-300 and the server 50-350.

Figure 51:
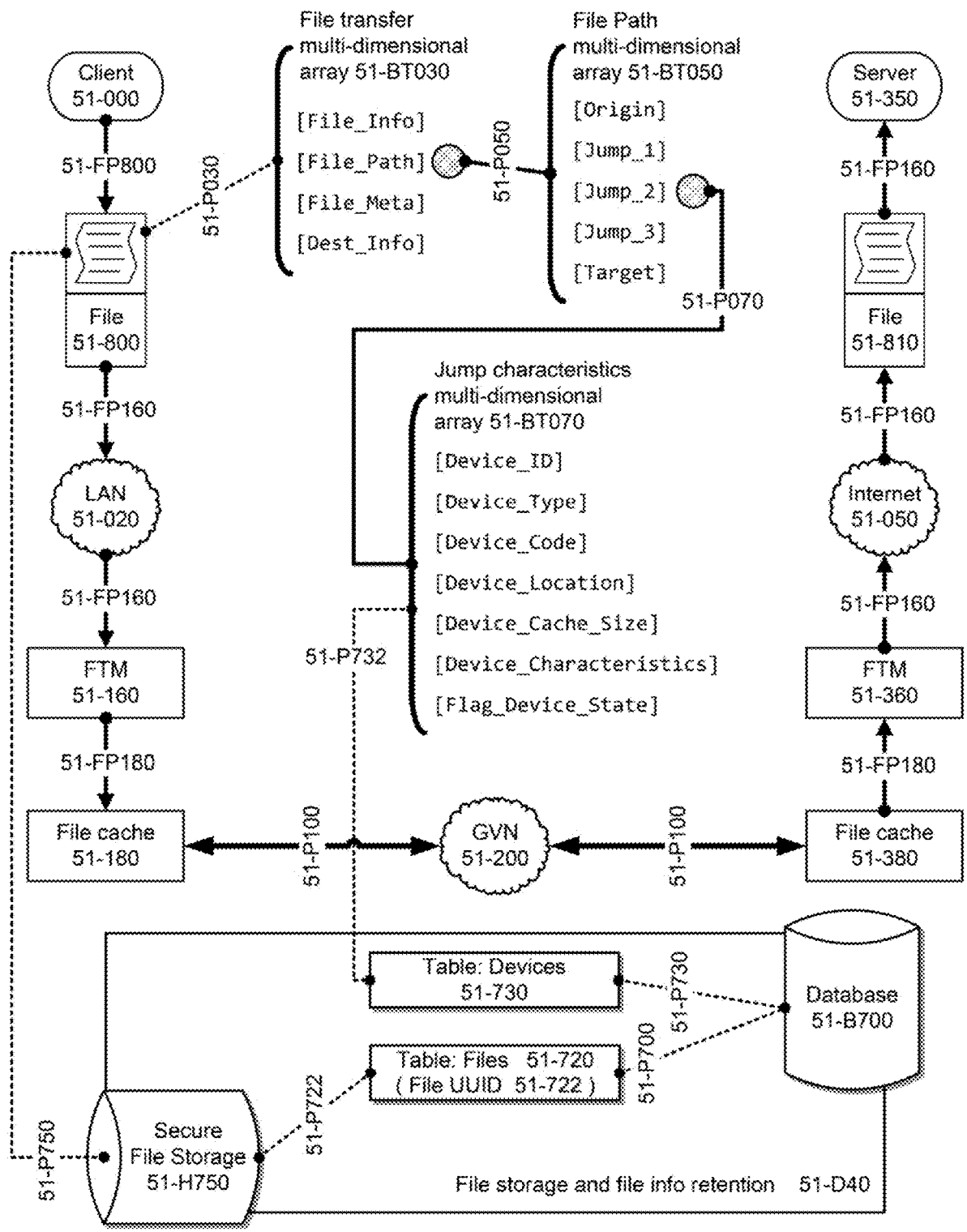
FIG. 51 illustrates, in accordance with certain embodiments of the disclosed subject matter, the relationship between the physical storage of a file on a secure file storage volume, the saving of information about the file into a relational database (DB), and data relationships between files, file information, and steps in a file transfer process.

FIG. 51 illustrates, in accordance with certain embodiments of the disclosed subject matter, the relationship between the physical storage of a file on a secure file storage volume 51-H750, the saving of information about the file into a relational database (DB) such as 51-B700, and data relationships between files, file information, and steps in a file transfer process. When a file is sent from a client 51-000 to a server 51-350 via an upload stream capture, and chained caching of the file by saving it in a file cache 51-180 close to the source file, pushing the file to the next file cache 51-380, and then saved to the server 51-350 governed by file transfer manager (FTM) 51-360. A multi-dimensional array 51-BT030 describing info about the file (File_Info), the path through the GVN that the file should take (File_Path), as well as Meta data (File_Meta), and destination information (Dest_Info). The destination info includes target device type, credentials if required, and other information.

The sub-array for file path multi-dimensional array 51-BT050 includes information about the origin, the target, as well as the intermediary hops.

There is a sub-array describing the characteristics of each hop 51_BT-070 includes information about the device, its type, a code or hostname for it, and other information. This sub-array is also linked to table: devices 51-730.

The table: Files 51-720 contains information about the file, including a universal unique identifier for the file 51-722. The file name on the physical storage can be the UUID 51-722 with a symbolic link via table: files 51-720 of the UUID to the file info record including the name of the file.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. In addition, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A network system operating a virtual network over the top of one or more underlying packet networks, the network system comprising:
   a plurality of endpoint devices;
   a plurality of access point servers including two or more access point servers granted access to the virtual network; and a set of one or more control servers configured to
- maintain a central device registry of information for each endpoint device and access point server that is allowed to access the virtual network,
- establish respective secure management tunnels with each of the endpoint devices and each of the access point servers that are granted access to the virtual network, and
- for each of multiple devices of the endpoint devices that are granted access to the virtual network,
  - dynamically determine, based at least on information for a particular device of the multiple devices and information for one or more of the access point servers, a ranked list, for that particular device, of peer access point servers selected from the access point servers that are granted access to the virtual network, and
  - configure that particular device, over the secure management tunnel established with that particular device, with the ranked list of peer access point servers and tunnel configuration information to build virtual network tunnels to the peer access point servers;

wherein the multiple devices of the endpoint devices are each configured to
- automatically seek establishment of a secure management tunnel with the set of one or more control servers,
- upon establishment of the secure management tunnel with the set of one or more control servers, configure themselves based on a configuration supplied over the secure management tunnel and comprising the ranked list of peer access point servers and tunnel configuration information, and
- join the virtual network by establishing one or more tunnels, over the top of the one or more underlying packet networks, to one or more of the peer access point servers from the configuration.

2. The network system of claim 1, wherein one or more of the plurality of access point servers comprises a respective cloud-based virtual access point server instance.

3. The network system of claim 2, wherein the respective cloud-based virtual access point server instance is instantiated by the set of one or more control servers based on a load factor for the virtual network.

4. The network system of claim 1, wherein one or more functions of one or more of the plurality of endpoint devices executes on a respective server instance deployed in a cloud.

5. The network system of claim 4, wherein the one or more functions comprise a virtual network routing function.

6. The network system of claim 5, wherein, for a particular one of the plurality of endpoint devices, the virtual network routing function manages routing of traffic for that endpoint device over multiple tunnels and paths established between that endpoint device and its peer access point servers.

7. The network system of claim 6, wherein the virtual network routing function selects between the multiple tunnels and paths based at least in part on current and/or historical connectivity conditions.

8. The network system of claim 4, wherein the one or more functions comprise a firewall.

9. The network system of claim 1, wherein the set of one or more control servers collect, over respective ones of the secure management tunnels, virtual network historical connectivity condition information for particular ones of the plurality of endpoint devices and/or the plurality of access point servers.

10. The network system of claim 9, wherein the virtual network historical connectivity condition information comprises a part of the information used to dynamically determine the ranked list of peer access point servers for a particular endpoint device.

11. The network system of claim 1, wherein the information for a particular device and the information for one of the access point servers each comprise location information.

12. The network system of claim 1, wherein, for at least one of the multiple devices, the ranked list of peer access point servers comprises a list of less than all of the access point servers that are currently active in the virtual network.

13. The network system of claim 1, wherein at least one given endpoint device of the plurality of endpoint devices operates a firewall for traffic passing through that given endpoint device.

14. The network system of claim 13, wherein at least one peer access point server for the given endpoint device operates a second firewall for traffic communicated through a tunnel established with that given endpoint device.

15. The network system of claim 1, wherein at least one of the multiple devices configured to join the virtual network by establishing the one or more tunnels to the one or more of the peer access point servers from the configuration joins the virtual network by, at least in part, establishing a plurality of the one or more tunnels to at least one of the peer access point servers for that device.

16. The network system of claim 15, wherein the at least one of the multiple devices is further configured to establish at least one of the plurality of the one or more tunnels to the at least one of the peer access point servers as a standby tunnel that later can be made operational as needed.

17. The network system of claim 1, wherein the multiple devices are further configured to repetitively test network metrics both at a level of the one or more underlying packet networks and for connectivity established via the virtual network tunnels to peer access point servers, and determine best connectivity based at least on the tested network metrics.

18. The network system of claim 17, further comprising the multiple devices sharing the tested network metrics over their respective secure management tunnels with the set of one or more control servers.

19. The network system of claim 18, the set of one or more control servers further configured to use the tested network metrics to calculate one or more best paths across the virtual network from one of the plurality of endpoint devices to another of the plurality of endpoint devices, the calculated one or more best paths comprising at least a part of the information used to determine at least one of the ranked lists of peer access point servers.

20. The network system of claim 1, further comprising first and second firewalls deployed at different perimeters along at least one path across the virtual network, the first and second firewalls each configured to securely share firewall and threat information with the set of one or more control servers, the set of one or more control servers further configured to operate the first and second firewalls to cooperatively protect devices accessing the virtual network through the endpoint devices from threats.

* * * * *